(12) United States Patent
Alhadeff et al.

(10) Patent No.: US 8,499,241 B2
(45) Date of Patent: *Jul. 30, 2013

(54) VIRTUAL COMMUNITY FOR INCENTIVIZED VIEWING OF MULTIMEDIA CONTENT

(75) Inventors: Laurent Daniel Alhadeff, New York, NY (US); Richard Adam Smullen, New York, NY (US)

(73) Assignee: Beezag Inc., New York, NY (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/829,636

(22) Filed: Jul. 2, 2010

(65) Prior Publication Data
US 2010/0325646 A1    Dec. 23, 2010

Related U.S. Application Data

(63) Continuation-in-part of application No. 12/544,233, filed on Aug. 20, 2009, which is a continuation-in-part of application No. 12/485,955, filed on Jun. 17, 2009.

(60) Provisional application No. 61/223,010, filed on Jul. 3, 2009.

(51) Int. Cl.
*G06F 3/00* (2006.01)
*G06F 3/048* (2013.01)

(52) U.S. Cl.
USPC ........... 715/719; 715/716; 715/835; 715/810; 715/962; 705/14.1; 705/14.4; 705/14.49

(58) Field of Classification Search
USPC ............... 715/700, 703, 716, 719, 733, 764, 715/765, 780, 781, 810, 835, 846, 864, 962; 705/1.1, 14.1, 14.12, 14.4, 14.49; 345/169, 345/173
See application file for complete search history.

(56) References Cited

U.S. PATENT DOCUMENTS

| | | | |
|---|---|---|---|
| 6,446,044 B1 | 9/2002 | Luth et al. | |
| 8,234,218 B2 * | 7/2012 | Robinson et al. | 705/54 |
| 2006/0129458 A1 * | 6/2006 | Maggio | 705/14 |
| 2006/0224452 A1 | 10/2006 | Ng | |
| 2006/0282319 A1 * | 12/2006 | Maggio | 705/14 |
| 2007/0130001 A1 * | 6/2007 | Jung et al. | 705/14 |
| 2007/0260523 A1 * | 11/2007 | Schadt et al. | 705/14 |
| 2008/0168497 A1 * | 7/2008 | Mitchem | 725/42 |
| 2008/0189174 A1 | 8/2008 | Moore | |
| 2008/0195466 A1 | 8/2008 | Wright | |
| 2008/0201156 A1 * | 8/2008 | Abhyanker | 705/1 |
| 2008/0250450 A1 | 10/2008 | Larner et al. | |

(Continued)

*Primary Examiner* — Xiomar L Bautista
(74) *Attorney, Agent, or Firm* — Ash Tankha; Lipton, Weinberger & Husick

(57) ABSTRACT

A computer implemented method and system for creating a virtual community network for incentivized multimedia content viewing is provided. A first viewer receives the multimedia content for viewing on a client device from a server provided in a networked environment. The first viewer refers the multimedia content to one or more second viewers in the networked environment for viewing and further referrals. The server controls access to the multimedia content and confirms viewing of the multimedia content by the first viewer, the second viewers, and nth viewers from further referrals using a random challenge. The server generates response reports based on viewing of the multimedia content. The server credits the first viewer, the second viewers, the nth viewers, etc. with one or more items of value based on referring of the multimedia content, multimedia content view confirmation, and/or registration of the second viewers, the nth viewers, etc, with the server.

26 Claims, 50 Drawing Sheets

U.S. PATENT DOCUMENTS

| | | | |
|---|---|---|---|
| 2008/0295127 A1* | 11/2008 | Zmuda | 725/23 |
| 2009/0089838 A1* | 4/2009 | Pino et al. | 725/40 |
| 2009/0234730 A1 | 9/2009 | Lee | |
| 2009/0259532 A1 | 10/2009 | Bergstraesser et al. | |
| 2009/0271309 A1* | 10/2009 | Gordon et al. | 705/37 |
| 2012/0110620 A1* | 5/2012 | Kilar et al. | 725/34 |

* cited by examiner

BEEZAG. WATCH. REWARD. SOCIALIZE.

WELCOME BACK, SCOTT
, LOG OUT

MY BEEZAG

VIDEOS

04/07/09 — 12

SCOTT
HARROWER
EDIT PROFILE >

TELEPHONE: LADY GAGA

CURRENT
POINTS 27
OFFER LOCKER

2/8 EXPIRING
SOON

FACEBOOK CONNECT

YOU ARE CONNECTED TO BEEZAG THROUGH
FACEBOOK.
FOLLOW THESE STEPS TO REFER YOUR
FRIENDS:
SEND INVITATIONS TO YOUR FRIENDS TO
JOIN INBOX DOLLOARS USING THE BUTTON
TO YOUR RIGHT
POST YOUR INBOX DOLLARS CASH EARNING
SUCCESS TO YOUR WALL AND FRIENDS
NEWS FEEDS BY CLICKING ON THE BLUE
CONNECT BUTTON
GET 10% OF YOUR FRIENDS' QUALIFIED
EARNINGS WHEN THEY JOIN INBOXDOLLARS
THROUGH YOUR POSTS OR INVITATIONS.

INVITE A FRIEND

VIDEOS

REDEEM REWARDS

HOW TO GET POINTS

INVITE A FRIEND

WHAT I'VE TOLD
BEEZAG

HELP & FAQS

UNMATCHED(8

OFFERS

RECENTLY VIEWED

MOST POPULAR (5)

SHARED

VIEW ALL ˅

TELEPHONE
EXPIRES:
04/07/10
POINTS 12

STARBUCKS
EXPIRES: 12/15/09
POINTS 7

BUDWEISER BEER
EXPIRES: 01/15/09
POINTS 8

PHILIPS
EXPIRES: 02/01/10
POINTS 5

MY BEEZAG — REWARD. SOCIALIZE.

WELCOME BACK, SCOTT, LOG OUT

VIDEOS

SCOTT HARROWER
EDIT PROFILE
CURRENT POINTS
OFFER

04/07/09  12

TELEPHONE: LADY GAGA http://www.twitter.com/login ▼ Google

TWITTER

2/8

VIDEOS
REDEEM REWARDS
HOW TO GET POINTS
INVITE A FRIEND
WHAT I'VE T BEEZAG
HELP & FAQS

WATCH THE NEW LADY GAGA VIDEO ONLY ON BEEZAG.COM!
HTTP://BEEZAG.COM/13892

HOME

PHOTON7: HTTP://WWW.YOUTUBE.COM/WATCH?V=7KNN04

PHOTON7 HTTP://WWW.YOUTUBE.COM/WATCH?V=7WKBUTZ23FE

RINGO
1 TWEET
6 FOLLOWING
9 FOLLOWERS 0 LISTED

HOME

@RINGO
DIRECT MESSAGES 2
FAVORITES
RETWEETS

SEARCH

TELEPHONE
EXPIRES: 04/07/10
POINTS 12

STARBUCKS
EXPIRES: 12/15/09
POINTS 7

BUDWEISER BEER
EXPIRES: 01/15/09
POINTS 8

PHILIPS
EXPIRES: 02/01/10
POINTS 5

```
#include <iostream>
#include "bzChallengeGenerator.h"

using namespace std;

int main(int argc, char* argv[])
{
        bzChallengeGenerator generator;
        generator.ContentType(bzChallengeGenerator::NUMBERS); // use
        numbers
        generator.ContentDisplaySize(20); // number will be displayed in a 20x20
        pixel square generator.VideoDisplayHeight(240); // video frame height is 240 pixels
        generator.VideoDisplayWidth(320); // video frame width is 320 pixels
        generator.VideoDuration(30); // video playing time is 30 secs bzChallenge c;
        int begin;
        begin = 0;
        cout << "Let's see how many we can randomly generate in sequence" <<
        endl;
        do
        {
                c = generator.Generate(begin);
                cout << c << endl;
                begin = c.Offset() + c.Duration();
        }
        while (begin <= (int)(generator.VideoDuration() -
bzChallengeGenerator::s_contentDuration));
        cout << "Let's generate a challenge for each 10 sec segment" << endl;
        cout << generator.Generate(0, 10) << endl;
        cout << generator.Generate(10, 20) << endl;
        cout << generator.Generate(20, 30) << endl;
        cout << endl << "Press RETURN to continue...";
        char x;
        cin.get(&x, 1);
        return 0;
}
```

FIG. 16A

```
#include <time.h>
#include "bzChallengeGenerator.h"

const char* bzChallengeGenerator::s_content[] =
{
        "0123456789",
        "ABCDEFGHJKLMNPQRTUVWXYZ",  // letters resembling numbers
omitted: I O S
        "!@#$%^&*+-"
};
bzChallengeGenerator::bzChallengeGenerator(void)
{
        assert(s_contentDuration > 0);

m_contentType = NUMBERS;
        m_contentDisplaySize = 0;

m_videoDisplayWidth = 0;
        m_videoDisplayHeight = 0;
        m_videoDuration = 0;

// seed the rand() random number generator using the time
        time_t t;
        time(&t);
        srand((int)t);
}
bzChallengeGenerator::~bzChallengeGenerator(void)
{
}
```

FIG. 16B

```
bzChallenge bzChallengeGenerator::Generate(int begin, int end) const
{       begin = (begin < 0) ? 0 : begin;
        assert(begin <= (int)m_videoDuration);
        end = (end < 0) ? m_videoDuration : end;
        assert(end <= (int)m_videoDuration);
        int duration = end - begin;
        // validate parameters
        assert(duration >= s_contentDuration);
        assert(m_videoDisplayWidth >= m_contentDisplaySize);
        assert(m_videoDisplayHeight >= m_contentDisplaySize);
        bzChallenge c;
        int contentLen = strlen(s_content[m_contentType]);
        assert(contentLen > 0);
        // randomly select a character within the content type array
        c.m_content = s_content[m_contentType][RangedRand(0, contentLen - 1)];
        // randomly select an offset between begin and end, allowing time to display
the content
        c.m_offset = RangedRand(begin, end - s_contentDuration);
        // save the duration
        c.m_duration = s_contentDuration;
        // randomly select a horizontal position along the video width allowing space
to display the content
        c.m_xPosition = RangedRand(0, m_videoDisplayWidth -
m_contentDisplaySize);
        // randomly select a vertical position along the video width allowing space to
display the content
        c.m_yPosition = RangedRand(0, m_videoDisplayHeight -
m_contentDisplaySize);;
        return c;
}
int bzChallengeGenerator::RangedRand(int from, int to)
{
        return rand() % (to - from + 1) + from;
}
```

FIG. 16C

```
pragma once
#include <assert.h>
#include "bzChallenge.h"
class bzChallengeGenerator
{
public:
        bzChallengeGenerator(void);
        ~bzChallengeGenerator(void);

enum ContentTypeEnum // type of characters to display
        {
                NUMBERS = 0,
                LETTERS = 1,
                SYMBOLS = 2
        };
        // constant duration to display character during challenge (secs)
        static const unsigned int s_contentDuration = 3;

ContentTypeEnum ContentType() const { return m_contentType; }
        void ContentType(ContentTypeEnum c) { m_contentType = c; } unsigned int ContentDisplaySize() const { return m_contentDisplaySize; }
        void ContentDisplaySize(unsigned int n) { assert(n > 0);
m_contentDisplaySize = n; } unsigned int VideoDisplayWidth() const { return m_videoDisplayWidth; }
        void VideoDisplayWidth(unsigned int n) { assert(n > 0);
m_videoDisplayWidth = n; } unsigned int VideoDisplayHeight() const { return m_videoDisplayHeight; }
        void VideoDisplayHeight(unsigned int n) { assert(n > 0);
m_videoDisplayHeight = n; } unsigned int VideoDuration() const { return m_videoDuration; }
        void VideoDuration(unsigned int n) { assert(n > 0); m_videoDuration = n; }
        // this static method returns a random integer in the close interval [from, to]
        static int RangedRand(int from, int to);
```

FIG. 16D

```
        // this method generates a random challenge given the properties specified
        bzChallenge Generate(int begin = -1, int end = -1) const;
private:
        // content type arrays
        static const char* s_content[];

// type of content to select character from
        ContentTypeEnum m_contentType; // type of characters to display in video
as challenge
        // character display area to be overlaid on image; square in pixels
        unsigned int m_contentDisplaySize; // display area (square) within video
frame to display char, in pixels
        // width of video display area
        unsigned int m_videoDisplayWidth;
        // height of video display area
        unsigned int m_videoDisplayHeight;
        // video's playing time
        unsigned int m_videoDuration;
};
```

FIG. 16E

```
#include "bzChallenge.h"

using namespace std;

std::ostream& operator<<(std::ostream& os, const bzChallenge& c)
{
        os << "Display '" << c.Content() << "' at offset " << c.Offset() << " secs for " << c.Duration() << " secs ";
        os << "at location (" << c.XPosition() << ", " << c.YPosition() << ")";

return os;
} bzChallenge::bzChallenge(void)
{
        m_content = 0;
        m_contentDisplaySize = 0;
        m_offset = 0;
        m_duration = 0;
        m_xPosition = 0;
        m_yPosition = 0;
} bzChallenge::~bzChallenge(void)
{
}
```

FIG. 16F

```
pragma once include <iostream>
//
// This class represents the challenge result returned by the Challenge Generator
//
class bzChallenge
{
friend class bzChallengeGenerator; // only this class can poke values public:
        bzChallenge(void);
        ~bzChallenge(void);

char Content() const { return m_content; }
        unsigned int Offset() const { return m_offset; }
        unsigned int ContentDisplaySize() const { return m_contentDisplaySize;
}
        unsigned int Duration() const { return m_duration; }
        unsigned int XPosition() const { return m_xPosition; }
        unsigned int YPosition() const { return m_yPosition; } private:
        char m_content; // content character to display
        unsigned int m_contentDisplaySize; // char display area in pixels
(square)
        unsigned int m_offset; // offset in secs into video when to display
        unsigned int m_duration;  // how long to display char
        unsigned int m_xPosition; // pixel position along width
        unsigned int m_yPosition; // pixel position along height
};

std::ostream& operator<<(std::ostream& os, const bzChallenge& c);
```

FIG. 16G

RUN #1

LET'S SEE HOW MANY WE CAN RANDOMLY GENERATE IN SEQUENCE
DISPLAY "3" AT OFFSET 19 SECS FOR 3 SECS AT LOCATION (233, 8)
DISPLAY "2" AT OFFSET 26 SECS FOR 3 SECS AT LOCATION (29, 134)
LET'S GENERATE A CHALLENGE FOR EACH 10 SEC SEGMENT
DISPLAY "7" AT OFFSET 0 SECS FOR 3 SECS AT LOCATION (89, 16)
DISPLAY "2" AT OFFSET 15 SECS FOR 3 SECS AT LOCATION (58, 171)
DISPLAY "9" AT OFFSET 26 SECS FOR 3 SECS AT LOCATION (151, 109)

RUN #2

LET'S SEE HOW MANY WE CAN RANDOMLY GENERATE IN SEQUENCE
DISPLAY "6" AT OFFSET 10 SECS FOR 3 SECS AT LOCATION (60, 90)
DISPLAY "5" AT OFFSET 21 SECS FOR 3 SECS AT LOCATION (108, 116)
DISPLAY "3" AT OFFSET 26 SECS FOR 3 SECS AT LOCATION (274, 215)
LET'S GENERATE A CHALLENGE FOR EACH 10 SEC SEGMENT
DISPLAY "5" AT OFFSET 6 SECS FOR 3 SECS AT LOCATION (36, 119)
DISPLAY "6" AT OFFSET 10 SECS FOR 3 SECS AT LOCATION (150, 220)
DISPLAY "1" AT OFFSET 20 SECS FOR 3 SECS AT LOCATION (11, 43)

FIG. 17

VIRTUAL COMMUNITY FOR INCENTIVIZED VIEWING OF MULTIMEDIA CONTENT

CROSS REFERENCE TO RELATED APPLICATIONS

This application claims the benefit of provisional patent application No. 61/223,010 titled "Virtual Community For Incentivized Viewing Of Multimedia Content", filed on Jul. 3, 2009 in the United States Patent and Trademark Office.

This application is a continuation-in-part application of the patent application Ser. No. 12/544,233 titled "Multimedia Content Viewing Confirmation" filed on 20 Aug. 2009, which is a continuation-in-part application of patent application Ser. No. 12/485,955 titled "Multimedia Content Viewing Confirmation" filed on Jun. 17, 2009 in the United States Patent and Trademark Office.

The specifications of the above referenced applications are incorporated herein by reference in their entirety.

BACKGROUND

The computer implemented method and system disclosed herein, in general, relates to a viewer response system. More particularly, the computer implemented method and system disclosed herein relates to supplying multimedia content to a client device of a viewer, confirming that the entire multimedia content has been viewed by the viewer, and creating a virtual community network for incentivized viewing of multimedia content.

Media service providers can reach viewers of their media services through a wide spectrum of technologies and devices such as general packet radio service (GPRS), 3G or other internet enabled cellular phones, a notebook computer, a tablet computing device or other devices, computers with connection to the internet, televisions with digital set top boxes, etc. Using this outreach, media service providers earn revenue from product and service companies seeking to advertise their products and services through the media services. However, the efforts of media service providers to advertise products and services may not achieve optimum results as the viewers may not view or may not be interested in viewing the multimedia content, for example, a video of the advertised products or services. This in turn reduces the outreach of companies seeking to advertise their products and services to potential customers through media services, and may lead to reduced revenue for both the companies that advertise their products and services through the media service providers, and for the media service providers. Also, product and service companies cannot confirm whether the viewers viewed the advertisements, since the advertisements are delivered to remote devices. Current viewer measurement systems only provide passive viewer measurement based on whether the advertisement is played on the devices or not, but not based on whether the viewers have attentively viewed the advertisement.

Moreover, viewers are typically skeptical about viewing content from unknown sources. The viewers may disregard multimedia content provided by unknown sources. Therefore, there is a need for a computer implemented method and system that enables viewers to refer the multimedia content to other viewers, for example, in an online social network, and that provide incentives to viewers that refer the multimedia content and other viewers whom the multimedia content is referred to, for viewing the multimedia content, and creating a virtual community network.

Therefore, there is a long felt but unresolved need for a computer implemented method and system that allows the media service providers to confirm that a viewer viewed multimedia content such as advertisements on a client device, and that encourages the viewer to provide confirmation that the viewer viewed the multimedia content that in turn reflects the interest of the viewer in the advertisements. Furthermore, there is need for a user-friendly computer implemented method and system that encourages the viewer to refer the multimedia content to other viewers for viewing, and creating a virtual community network for incentivized viewing of multimedia content by cascading referrals for the incentivized viewing of the multimedia content.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for confirming that a viewer viewed the entire multimedia content on a client device, and for providing an incentive to the viewer to view the entire multimedia content. As used herein, the term "viewer" refers to a person viewing the multimedia content. The viewer is, for example, a first viewer, one or more second viewers, one or more third viewers, and so on to one or more nth viewers, members and non-members of a virtual community network created in a networked environment. The computer implemented method and system can be used for confirming that a viewer viewed the entire multimedia content that is, for example, commercial, educational, and entertaining in nature.

In the computer implemented method and system disclosed herein, viewing of the multimedia content is confirmed using a challenge-response mechanism. The multimedia content for viewing is available, for example, as streaming content or downloaded content, and comprises content on demand. A multimedia content owner, for example, an advertiser, uploads multimedia content on a server of a media service provider or provides a reference to the location of the multimedia content to the server. The client device of a viewer receives the multimedia content, for example, an advertisement, a commercial message, an educational clip, an entertainment clip, etc., from the server and plays the multimedia content on a display screen of the client device, for example, in an audiovisual format. As used herein, the client device is, for example, an internet-enabled mobile device, a tablet computer, a computer with a web browser, a set top box capable of delivering interactive multimedia content, an internet protocol enabled device on an internet connection, etc. The client device is capable of receiving the multimedia content in different multimedia content formats, for example, hypertext markup language 5 (HTML5) format, Windows® audio video format, and other proprietary and non-proprietary formats.

The computer implemented method and system disclosed herein creates a virtual community network for incentivized viewing of multimedia content by cascading referrals for the incentivized viewing of the multimedia content. As used herein, "incentivized viewing" refers to offering incentives, for example, items of value, credits, and other compensation to viewers for viewing the multimedia content. Also, as used herein, "cascading referrals" means referral of the multimedia content by a first viewer to one or more second viewers, and referral of that multimedia content by one or more of the second viewers to one or more third viewers, and so on to referral of the multimedia content to one or more nth viewers. The computer implemented method disclosed herein provides the server in a networked environment. In an embodiment, the server transmits a list of the multimedia content preselected by a first viewer to a client device of the first viewer. The first viewer receives the multimedia content on the client device from the server for viewing. The first viewer refers the multimedia content to one or more second viewers in the networked environment for viewing and further referrals. The further referrals comprise referral of the multimedia content by one or more of the second viewers to one or more third viewers, and referral of the multimedia content by one or more of the third viewers to one or more nth viewers. The viewers, for example, the second viewers, the third viewers, and so on to the nth viewers, who view the multimedia content based on the referral from the first viewer are herein referred to as "subsequent viewers". The subsequent viewers are, for example, members and non-members of the created virtual community network. The second viewers may receive the multimedia content referred by the first viewer based on one or more preferences selected by the second viewers, or based on the first viewer's own decision to share the multimedia content based on the first viewer's own discretion. One or more of the second viewers may then refer the multimedia content to one or more third viewers and this referral may continue to referrals of the multimedia content to one or more nth viewers. The server confirms viewing of the multimedia content by the first viewer and any number of the second viewers, the third viewers and so on to the nth viewers using a random challenge. The server generates a response report for each of the cascading viewers, that is, the first viewers, the referred second viewers, the referred third viewers and so on to the referred nth viewers based on the viewing of the multimedia content by the first viewer and any number of the cascading viewers. The server compensates one or more of the cascading viewers, that is, the first viewer, the second viewers, the third viewers and so on to the nth viewers by crediting the cascading viewers with one or more items of value based on, for example, referring of the multimedia content, accessing of the referred multimedia content, confirming the viewing of the multimedia content from the response report, and registration into the created virtual community network. The referring of the multimedia content for viewing, and crediting the cascading viewers, that is, the first viewer, the second viewers, the third viewers, and so on to the nth viewers with one or more items of value creates the virtual community network for incentivized viewing of the multimedia content.

The server registers the cascading viewers' addresses, for example, electronic mail (email) address or mobile phone numbers and information of their corresponding client devices for periodically receiving reports on the multimedia content from the server. In an embodiment, the server provides the cascading viewers with, for example, an option for triggering playback of premium multimedia content in exchange for one or more items of value accrued by the cascading viewers and allowing the premium multimedia content to play.

The server controls levels of referring of the multimedia content. The server generates a referral report comprising information on the referrals of the multimedia content made by the first viewer to the second viewers, the second viewers to the third viewers and so on to the nth viewers in the networked environment, and accessing of the referred multimedia content by the cascading viewers.

The server credits one or more of the cascading viewers by depositing one or more items of value to their accounts and debiting a fee from one or more multimedia content owners, if the response report confirms the viewing of the multimedia content by the cascading viewers. The items of value comprise, for example, one or more of points, points redeemable for cash, points redeemable for additional items of value, scores, scores redeemable for cash, scores redeemable for additional items of value, cash, discounts, access to premium multimedia content, units of virtual currency, and any combination thereof.

Viewing of the multimedia content by the cascading viewers, that is, the first viewer, the second viewers, the third viewers and so on to the nth viewers herein collectively referred to as a "viewer" is confirmed using, for example, a random challenge. In an embodiment, the random challenge is presented to the viewer by overlaying the random challenge on the multimedia content. The random challenge is one or more of random in content, presented at random times during and/or after the play of the multimedia content, and presented at random physical locations on the multimedia content. The random challenge comprises, for example, one or more of a random number, a random icon, a random shape, a product logo, a service logo, a random color, a random mathematical equation, and a random target on the display screen of the client device for the viewer to interact therewith using touch or a pointing device. In an embodiment, the random challenge content is unrelated to the multimedia content. The random challenge changes for each multimedia content viewing. The random challenge is presented at one or more times during and/or after the multimedia content is played. The duration of play of the multimedia content is determined and the random challenge is presented during and/or after the play duration of the multimedia content.

One or more responses are invoked from the viewer for one or more presented random challenges. If one or more of the responses entered by the viewer for the presented random challenges is correct, the response confirms that the multimedia content has been viewed by the viewer. The presentation of the random challenge to the viewer may be repeated if the response from the viewer to the presented random challenge is incorrect. A response report is generated based on the response from the viewer. The generated response report is transmitted to the server for confirming that the multimedia content has been viewed. In an embodiment, the response report is generated on the server.

In another embodiment, the random challenge is presented by interrupting the play of the multimedia content after an interrupt time period. The interrupt time period is less than duration of the multimedia content. A timer is provided to begin counting the interrupt time period at the start of the play of the multimedia content. When the timer reaches the interrupt time period, the play of the multimedia content is interrupted to present the random challenge to the viewer.

The random challenge is presented in different forms such as a visual overlay on the multimedia content, or a child window cascading with the content rendering window, or parent window. For example, the random challenge comprises one or more random numbers presented at different points in time when the multimedia content is being played. The correct response in this example comprises reproduction of the random numbers by entering the random numbers into the client device. In an embodiment, the random challenge comprises, for example, a random pair of geometrical shapes, a random mathematical equation, a random icon, a product logo or a service logo, a color, a target on a touch screen, etc., overlaid at random physical positions on the multimedia content. The correct response may comprise a selection of an option representing a pair of geometrical shapes from an options list, entering the result of the mathematical equation into the client device, selection of an option representing an icon from an options list, selection of an option representing a product logo or a service logo from an options list, selection of an option representing a color from an options list, selection of or interaction with a target or response region on a touch screen, etc. respectively. In another embodiment, one or more random challenges are presented at different time intervals during the play of the multimedia content or at the conclusion of the play of the multimedia content.

The random challenge appears randomly on a multimedia player frame within the display screen of the client device. For example, the random challenge appears randomly on any four corners of the multimedia player frame. The random challenge also appears at a number of unique positions within the multimedia player frame based on physical coordinates selected within the multimedia player frame. The random challenge may also appear immediately outside a boundary of the multimedia player frame and scrolls in an upward direction or a downward direction on either side of the multimedia player frame. The random challenge also scrolls in a rightward direction or a leftward direction above or below the multimedia player frame.

Viewing of the multimedia content is confirmed if the viewer provides the correct response to the random challenge within a response time-out period, after the random challenge is presented. For example, a timer is provided to determine the time lapsed between the presentation of the random challenge and the submission of the response on the client device.

The response for a random challenge is invoked at any time during and/or after the multimedia content is played. For example, the viewer may be prompted to enter a response to the random challenge during the play of the multimedia content, or during and also at the end of the play of the multimedia content, or after the multimedia content is played. A response report is generated based on the response from the viewer. The response determines whether the viewer viewed the multimedia content. The generated response report is transmitted to the server for confirming that the multimedia content has been viewed. In an embodiment, the response report is generated on the server. The server compensates the viewer by crediting the viewer with one or more items of value if the response report confirms that the viewer viewed the multimedia content and provided a correct response to the presented random challenge.

In an embodiment, the client device downloads the multimedia content when the client device is connected to the server. In this embodiment, when the connection to the server is inactive, the client device renders the downloaded multimedia content in an off-line mode, performs a challenge-response interaction with the viewer, and generates and stores the response report. The off-line mode is triggered when the connection to the server is inactive. When a connection to the server is created via, for example, satellite, a wireless network, the internet, etc., the response report is transmitted to the server over the connection. In another embodiment, the client device renders the multimedia content transmitted by the server as streaming multimedia content. In this embodiment, when the connection to the server is active, the client device renders the multimedia content in an online mode and performs a challenge-response interaction with the viewer. The response report generated after completing the challenge-response interaction is transmitted to the server over the active connection.

In an embodiment, the viewer is credited with an item of value, for example, cash, if the response report confirms the multimedia content was viewed by the viewer, and the multimedia content owner is debited a fee. When the viewer successfully responds to one or more of the random challenges, the correct or partially correct response to the random challenge indicates a confirmation that the multimedia content has been viewed. In an embodiment, the viewer is eligible for an item of value even when one or more responses entered by the viewer are incorrect. In an embodiment, the viewer is eligible for an item of value for each correct response to a random challenge presented. Offering an item of value for a confirmed view provides an incentive to the viewer to view the entire multimedia content and respond to the random challenge presented during and/or after the play of the multimedia content. In another embodiment, the incentive is in the form of a redeemable credit score accumulated by the viewer over time. The credit score is redeemed, for example, with money, gifts, or any other item of value. The server is configured to receive the response report sent by the client device, and directs a payment module to credit an account of the viewer, for example, with a predetermined amount of money for a confirmed viewing of the multimedia content.

In an embodiment, the cascading viewers, that is, the first viewer, the second viewers, the third viewers and so on to the nth viewers may refer the multimedia content to the members and non-members of the created virtual community network by, for example, posting one or more referrals of the multimedia content on the server and/or one or more social networking platforms for referring the multimedia content to other members of the created virtual community network and non-members of the created virtual community network. In another embodiment, the cascading viewers may, for example, forward the multimedia content to members and non-members of the created virtual community network via the server and/or social networking platforms. The referrals posted on the server and/or the social networking platforms redirects the cascading viewers, the other members, and non-members of the virtual community network to the multimedia content for viewing. Furthermore, the server tracks viewing activities of the cascading viewers for determining compensation and controlling levels of referring of the multimedia content.

In another embodiment, the members and non-members of the created virtual community who receive the referred multimedia content directly from any of the second viewers may be considered third viewers. The viewing activities and other credit earning activities by those third viewers results in credits both to the second viewers who directly referred those third viewers, and also results in credits to the first viewer who originally referred the second viewers. The size of the credits given to the first viewer, the second viewers, and the third viewers, in this case, may be the same or may vary. In a typical embodiment, the size of the credits diminishes for each additional cascading referral, so that the third viewers referred by the second viewers earn the most credit, the second viewers referred by the first viewer earn less credit than the third viewers, and the first viewer earns less credit than the second viewers. This referral chain may extend to an arbitrarily long referral network, to a set of fourth viewers, fifth viewers, and so on to nth viewers.

In another embodiment, the cascading viewers, that is, the first viewer, the second viewers, the third viewers and so on to the nth viewers post one or more referrals of the multimedia content on the server and/or the social networking platforms for registering non-members into the created virtual community network. Furthermore, the server promotes registration of non-members into the created virtual community network by, for example, allowing access of the multimedia content to only members, offering a predetermined number of free previews of the referred multimedia content, allowing access of complete multimedia content to only members, etc. The server credits one or more of the cascading viewers with one or more items of value, if the non-members register into the created virtual community network.

In another embodiment, the server controls access to the referred multimedia content based on registration of the subsequent viewers with the server. The server may provide, for example, a predetermined number of free previews of the multimedia content to the subsequent viewers, members of the virtual community network, non-members of the virtual community network, etc. The server may, for example, restrict the access of the multimedia content to non-members for promoting registration of the non-members into the virtual community network. Furthermore, the server may provide, for example, multimedia content of diminished value to non-members for promoting non-members to register into the virtual community network for accessing the complete multimedia content from the server.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIGS. 16A-16G exemplarily illustrate a C++ implementation of a challenge generator.

FIG. 17 exemplarily illustrates a sample output after executing test cases established for the challenge generator.

DETAILED DESCRIPTION OF THE INVENTION

Figure 1:
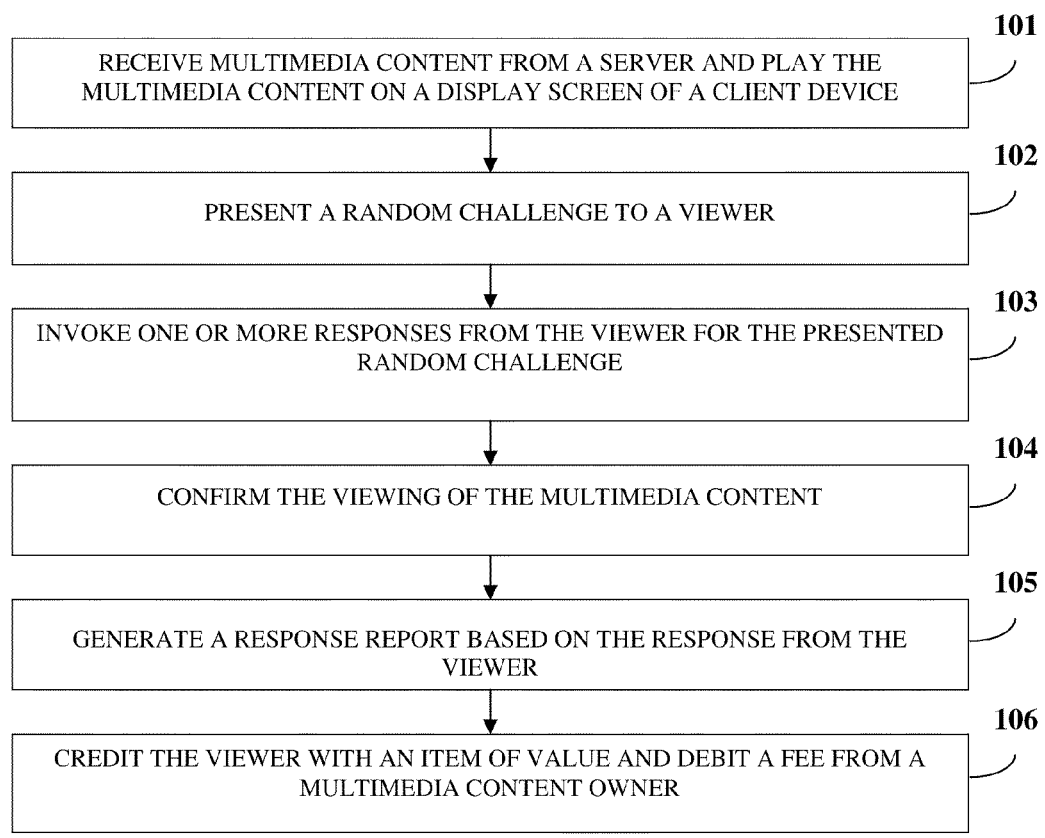
FIG. 1 illustrates a first embodiment of a computer implemented method for confirming that a viewer viewed multimedia content on a client device.
Figure 6:
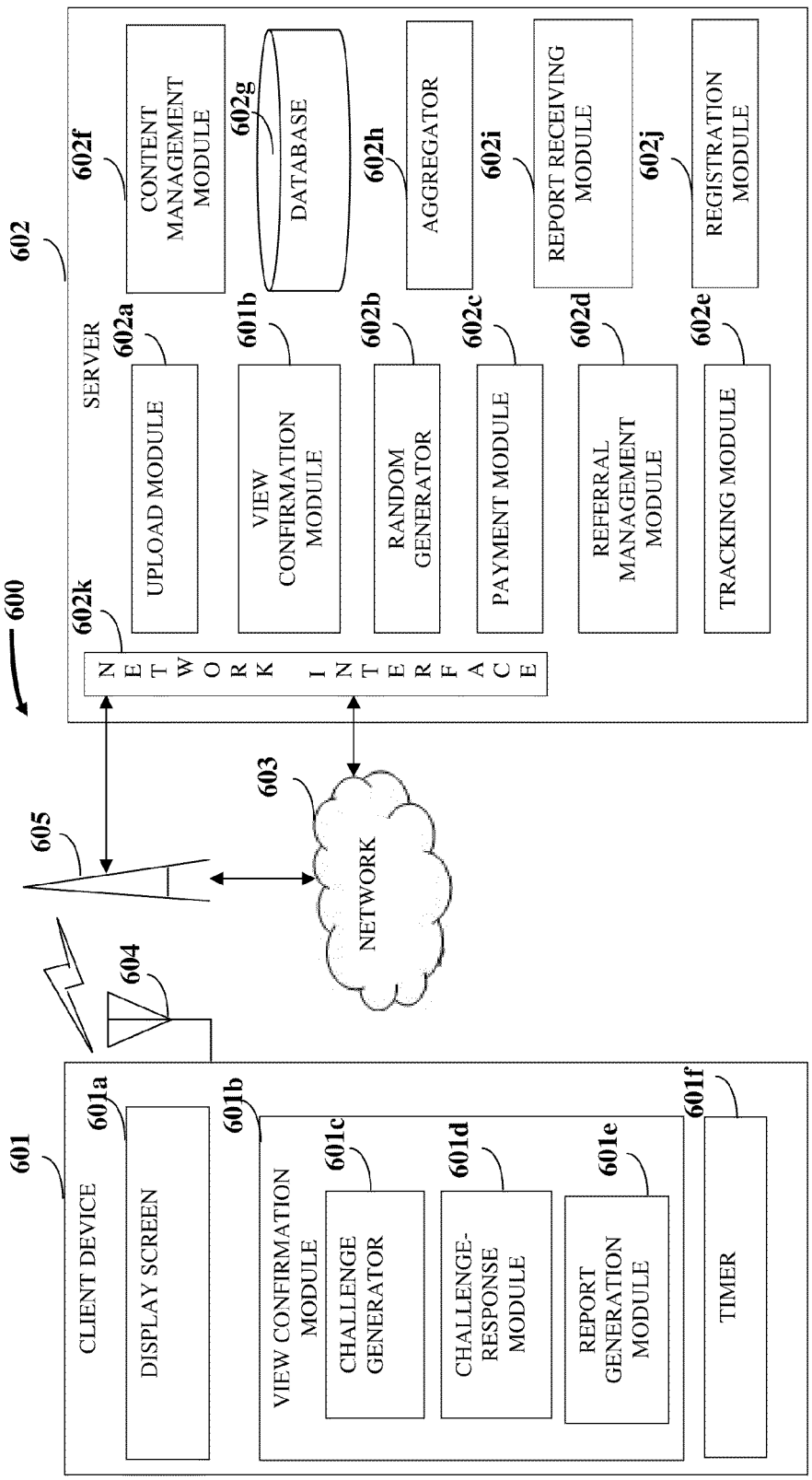
FIG. 6 illustrates a computer implemented system for creating a virtual community network for incentivized viewing of multimedia content by cascading referrals for the incentivized viewing of the multimedia content.

FIG. 1 illustrates a first embodiment of a computer implemented method for confirming that a viewer viewed multimedia content on a client device. As used herein, the term "multimedia content" refers to content in different combined and individual formats, for example, text, audio, video, audio-visual, still images, animations, and rich content formats. The multimedia content for viewing is available, for example, as streaming content or downloaded content and comprises content on demand. In an embodiment, the multimedia content is provided from a predetermined list compiled from a database 602g of a server 602, illustrated in FIG. 6, driven by the preselected preferences of the viewer. Also, as used herein, the term "viewer" refers to a person viewing the multimedia content and collectively comprises a first viewer, one or more second viewers, one or more third viewers, and so on to one or more nth viewers, members of a virtual community network, and non-members of the virtual community network. The first viewer, the second viewers, the third viewers, and so on to the nth viewers are herein referred to as "cascading viewers". As used herein, the term "virtual community network" refers to a social network of persons or users, for example, viewers, who interact through specific media to pursue mutual interests and goals. The virtual community network disclosed herein comprises viewers who refer multimedia content to other viewers for incentivized viewing of multimedia content. The computer implemented method and system 600 disclosed herein is used for promoting the viewing of multimedia content, for example, an advertisement clip of a product and/or service by providing an incentive to the viewer to view the multimedia content. The computer implemented system 600 disclosed herein is illustrated in FIG. 6. The computer implemented method and system 600 can be used, in general, for confirming that the viewer has viewed the multimedia content that is commercial, educational, and entertaining in nature.

In the computer implemented method disclosed herein, viewing of the multimedia content is confirmed using a challenge-response mechanism, which requires active input actions from the viewer. The challenge-response is incorporated within the multimedia content available for consumption by the viewer on a client device 601 capable of connecting to a network 603 and capable of rendering multimedia content formats.

The client device 601 possessed by the viewer is capable of creating a client-server relationship with a server 602 via a network 603 as illustrated in FIG. 6. The client device 601 may also download a client software module, for example, a view confirmation module 601b over the network 603 for making service requests to the server 602, while the server 602 addresses the service requests. The network 603 is, for example, a cellular network, the internet, a local area network, or any other network created using available networking protocols.

A multimedia content owner, for example, an advertiser, uploads multimedia content, for example, an advertisement, a commercial message, an educational clip, an entertainment clip, etc. on the server 602 of a media service provider. As used herein, "multimedia content owner" refers to an entity that generates multimedia content. Also, as used herein, "media service provider" refers to a service entity that provides the service of distributing the multimedia content, confirming that a viewer viewed the multimedia content uploaded or referenced by the multimedia content owner on the server 602, and creating a virtual community network for incentivized viewing of multimedia content. The client device 601 of the viewer receives 101 the multimedia content from the server 602 and plays the multimedia content on a display screen 601a of the client device 601, for example, in an audiovisual format. As used herein, the "client device" refers to, for example, an internet-enabled mobile device, laptops, tablet computing devices, a computer with a web browser, and a set top box capable of delivering interactive multimedia content, etc. The client device 601 is capable of receiving the multimedia content in different multimedia content formats, for example, hypertext markup language 5 (HTML5) format, Windows® audio video format, and other proprietary and non-proprietary formats. A random challenge is presented 102 to the viewer by, for example, overlaying the random challenge on the multimedia content. The random challenge comprises, for example, one or more of a random number, a random icon, a random shape, a product logo, a service logo, a random color, a random mathematical equation, and a random target on the display screen 601a of the client device 601 for the viewer to interact therewith using touch or a pointing device. The random challenge is overlaid at different positions on the multimedia content. The random challenge is overlaid using technologies, for example, hypertext markup language 5 (HTML5), Adobe® Flash or other video creation standards. Streams comprising the random challenge and the multimedia content are either integrated at the server level or combined at a web browser on the client device 601 of the viewer. The random challenge and the multimedia content may arrive at the client device 601 of the viewer as a single integrated stream or as two independent streams that are combined in real time at the client device 601.

The content of the random challenge is, for example, numbers, letters, shapes, phrases, etc., from a predefined set. The random challenge is one or more of random in content, presented at random times during and/or after the play of the multimedia content, and presented at random physical locations on the multimedia content. In an embodiment, the random challenge content is unrelated to the multimedia content. In another embodiment, the multimedia content is transmitted independently of the random challenge, that is, a multimedia content file may not be accompanied by a particular random challenge. In this case, the random challenge may be randomly selected from a set of random challenge files and then overlaid on the multimedia content. Moreover, the same random challenge can be reused with different multimedia content files. Furthermore, the random challenge and the multimedia content may be interchangeably used with other multimedia content and random challenges respectively.

In an embodiment, the challenge is a pseudorandom challenge. A pseudorandom challenge involves the random selection of a limited set of challenge icons from a fixed data set, displayed at random times with certain defined boundaries, and at random physical placements within a display screen 601a. For example, the pseudorandom challenge involves a random selection of a number between 0 and 9; a random selection of a shape among, for example, a circle, a square, a triangle; a random selection of a letter within the alphabet, etc. Furthermore, the pseudorandom challenge comprises random placement of the randomly selected content, both in terms of time and space within the multimedia content. The pseudorandom placement of the challenge can define time boundaries. For example, a first challenge occurs between second "X" and second "Y" of the multimedia selected for play, while a second challenge occurs within 10 seconds of the end of the play. The two-dimensional space defined by the display screen 601a within which the challenge occurs can also be pseudorandom within fixed parameters. For example, the pseudorandom challenge appears in one of the four corners of the display screen 601a, each time a pseudorandom challenge is displayed, at a pseudorandom time.

In an embodiment, the randomness of the challenge content for space is implemented as follows. The placement of the challenge is made random by overlaying the challenge content at different locations in or around the multimedia content. The purpose of randomizing the placement of the challenge content is to prevent, for example, "ad blindness". "Ad blindness" as used herein results when the viewer focuses on a single physical spot or area within a multimedia player frame 1302. As used herein, the multimedia player frame 1302 is a graphical output component of any media player application that plays the multimedia content in a defined region within the display screen 601a of the client device 601 as exemplarily illustrated in FIG. 13. The random challenge appears randomly on the multimedia player frame 1302 within the display screen 601a of the client device 601. In an example, a challenge icon flashes randomly within one of the four corners of the multimedia player frame 1302 when a video is played. The viewer is encouraged to watch the entire video and not focus solely on a single physical spot or area on the video, since the location of the challenge icon is random. This allows the viewer to more completely view the content of the video to absorb the content of the video being played amidst the challenge-response interaction.

Figure 13:
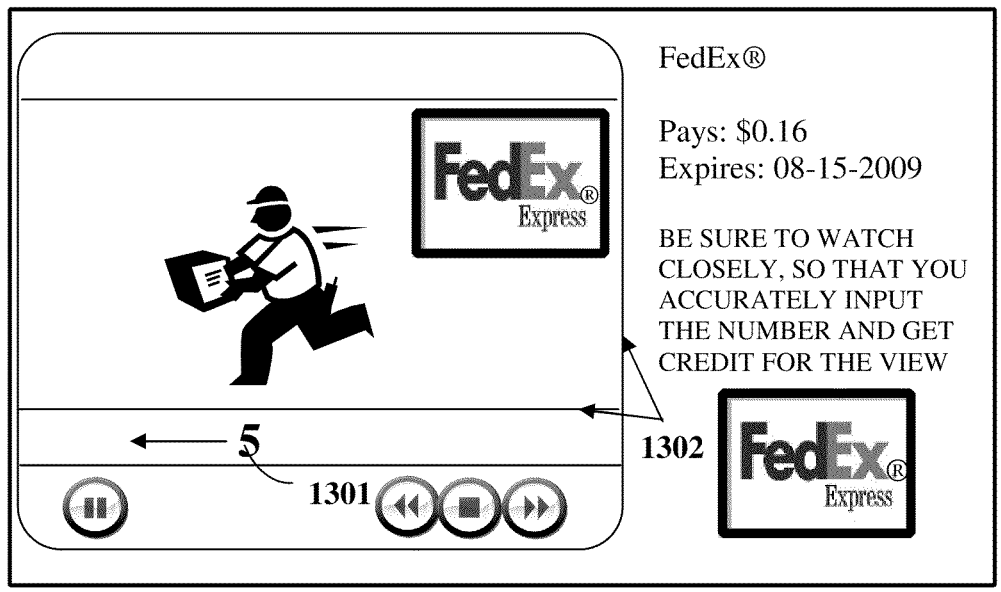
FIG. 13 exemplarily illustrates a screenshot for a scrolling random challenge.

In another example, the random challenge appears immediately outside a boundary of the multimedia player frame 1302. The challenge icon, for example, scrolls in an upward direction or a downward direction on either side of the video immediately outside the boundary of the actual multimedia player frame 1302, or scrolls in a rightward direction or a leftward direction of the multimedia player frame 1302 in a region above or below the video, as exemplarily illustrated in FIG. 13. FIG. 13 exemplarily illustrates a screenshot for a scrolling random challenge icon, for example, the numeral "5" 1301 moving in a leftward direction below the video. The direction in which the challenge icon scrolls as well as the position of the challenge icon relative to the multimedia player frame 1302 are random. For example, the challenge icon scrolls vertically up or vertically down in a region immediately left of the multimedia player frame 1302. In another example, the challenge icon scrolls horizontally right or left in a region immediately above the multimedia player frame 1302. The viewer is therefore required to watch the entire multimedia player frame 1302 in order to respond to the challenge icon. In another embodiment, the challenge icon scrolls diagonally within the multimedia player frame 1302 from one corner to the other.

In another example, the challenge icon is randomly displayed at any location within the multimedia player frame 1302. Physical coordinates, for example, X and Y coordinates for display of the challenge icon within the multimedia player frame 1302 are randomly selected by a challenge generator 601*c* of a view confirmation module 601*b*. In this manner, the challenge icon can appear at a number of unique positions in the multimedia player frame 1302 depending on the possible combinations of the X and Y coordinates selected within the multimedia player frame 1302.

In an embodiment, the client device 601 receives a list of multimedia content from the server 602 for selection by the viewer. The multimedia content selected by the viewer is rendered on the display screen 601*a* of the client device 601, and the duration of play of the selected multimedia content is determined. A random challenge may be randomly selected from a set of random challenge files stored in the database 602*g* and then presented at one or more points in time by overlaying the random challenge on the multimedia content. A random challenge is presented at one or more points in time by overlaying the random challenge on the rendered multimedia content. For example, the random challenge is presented for N seconds, after L seconds elapse with an audio-video clip of duration M seconds, wherein L is less than M. The random challenge is presented at one or more times during and/or after the multimedia content is played. The random challenge changes for each multimedia content viewing.

One or more responses are invoked 103 from the viewer for the presented random challenge. A response may be invoked from the viewer during or at the end of play of the multimedia content. The response entered by the viewer determines whether the viewer has viewed the multimedia content. The response is used for confirming 104 the viewing of the multimedia content. The viewer may enter a response to the random challenge during the play of the multimedia content, and optionally during and after the multimedia play, and optionally after the multimedia play. A response report is generated 105 based on the response from the viewer. The response report verifies the correctness of the response to the random challenge entered by the viewer and confirms viewing of the multimedia content. The generated response report is transmitted to the server 602 confirming that the viewer viewed the multimedia content. In an embodiment, the response report is generated on the server 602.

In an embodiment, the presentation of the random challenge to the viewer is repeated if the response from the viewer for the presented random challenge is incorrect. The steps of rendering the viewer selected multimedia content, presenting a random challenge, invoking a response, and generating a response report may be repeated for other multimedia content in the list depending on the selection of the viewer.

The random challenge is presented in different forms, for example, a visual overlay on the multimedia content, or a child window cascading with the content rendering window. For example, the random challenge is presented as a graphical user interface (GUI) widget. In another example, the random challenge is a short audio message introduced briefly into the visual-only media content. The randomness in the challenges is due to the randomness in visual elements presented in the challenges as well as the responses that the challenges elicit during or after the multimedia content is played. For example, the random challenge comprises one or more random numbers flashed at different points in time when a multimedia content is being played. The correct response in this example comprises reproduction of the random numbers by entering the random numbers into the client device 601. The response is verified by comparing the numbers entered by the viewer with the numbers flashed in the multimedia content. The random challenge further comprises, for example, one or more random geometrical shapes presented at different points in time, a random mathematical equation, a random icon, a product logo or a service logo, a color, a target on a touch-sensitive screen that the viewer has to touch, a target that is pointed at by a pointing device, etc. In these examples, the correct response comprises a selection of an option representing the geometrical shapes from an options list, entering the result of the mathematical equation into the client device 601, selection of an option representing the icon from an options list, selection of an option representing the product logo or the service logo from an options list, selection of an option representing the color from an option list, selection or interaction with the target on a touch-sensitive screen, selection or interaction with the target pointed at by a pointing device, etc., respectively.

In an embodiment, one or more random challenges are presented at one or more times or at different time periods, during or after the multimedia content is played. For example, the first challenge is presented half way through the play of a multimedia clip and the second challenge is presented at the end of the multimedia clip.

The viewer is requested to provide a response to the random challenge on the client device 601 within a predetermined period of time, after the random challenge is presented. A response for a random challenge is deemed valid if the viewer provides the correct response within a response timeout period, after the random challenge is presented. A timer 601*f* is provided to determine the time lapsed between the presentation of the random challenge and the submission of the response.

In an embodiment, the viewer is credited 106 with an item of value, for example, cash, if the response report confirms that the viewer viewed the multimedia content, while the multimedia content owner is debited a fee for the service provided to the multimedia content owner by the media service provider. The viewer is credited with an item of value if the response report verifies that the response to the random challenge entered by the viewer is correct. When the viewer's response to the random challenge is correct or partially correct where more than one random challenge is presented to the viewer, the correct response to the random challenge confirms that the viewer viewed the multimedia content. In an embodiment, the viewer is optionally eligible for an item of value even when one or more responses entered by the viewer are incorrect. In an embodiment, where the number of random challenges presented is more than one, the viewer is eligible for an item of value for each correct response.

Compensating the multimedia content viewer by crediting the viewer with an item of value for a confirmed view provides an incentive to the viewer to view the entire multimedia content and respond to the random challenge that is presented during or after the play of the multimedia content. In an embodiment, the incentive is in the form of a redeemable credit score accumulated by the viewer over time. For example, offering an incentive to respond to the random challenge presented within an advertisement clip generates interest in a potential buyer to view the entire advertisement clip, thereby promoting the product or service advertised in the multimedia content. In an embodiment, the incentive is in the form of a redeemable credit score accumulated by the viewer over time. The credit score is redeemed with, for example, money, gifts, or any other items. The server 602 is configured to receive the response report sent by the client device 601, and directs a payment module 602c to credit an account of the viewer with an item of value, for example, a predetermined amount of money for the confirmed view. In an embodiment, the response report is generated on the server 602.

The response for a random challenge is invoked at any random point in time during or after the multimedia content is played. For example, the viewer is prompted to enter a response to the random challenge at the end of the duration of the multimedia content. The random challenge may appear once or multiple times when the multimedia content is played on the viewer's client device 601. The viewer may be prompted to answer the random challenge either during or immediately following the completion of the multimedia content. In an example, the multimedia content is an audio-video file with a duration of 20 seconds. During the playing of the video, the numerals 7 and 9 are each flashed for 2 seconds, for example, at the $10^{th}$ and $15^{th}$ second respectively, after the start of the play of the video for the observation of the viewer. At the completion of the audio-video file, an answer box appears prompting the viewer to enter the numbers flashed during the audio-video, in order to register a correct response and therefore a confirmation of the view.

In another example, a video is played to the viewer, during which a pair of geometrical shapes, for example, a circle followed by a square appear in subsequent frames of the video. The geometrical shapes are overlaid at random positions on the video and appear independent of the video, or appear as part of the video. At the completion of the video, a pull down answer menu appears with several shape pairs as options. The viewer selects the correct shape pair from the options in the menu to register a correct response. In another example, a video is played in the primary window of the user interface and a child window appears either cascaded with or alongside the parent window. The companion window displays a mathematical equation such as (3+3=?) as the challenge. The video is paused momentarily or for a response time-out period within which the viewer is required to enter the correct answer, in this case 6. In an embodiment, the viewer is required to submit the correct response in order to resume playing of the video or avoid termination of the video. In another example, a color is flashed in the foreground or the background when the video clip is being played. The viewer is required to either enter a description of the color or select the color from an options list to register a correct response.

In an embodiment, the random challenge comprises a target or a response region that appears on a touch-sensitive screen of, for example, an IPhone® or an IPad® of Apple Inc., an Android implemented device or other touch-sensitive internet connected devices. The target or the response region appears on the touch-sensitive screen during the playing of a video. As used herein, the target or the response region is a viewer selectable area, randomly overlaid during the play of the multimedia content, with which the viewer interacts within a response time-out period to register a valid response. The response is invoked in real-time and involves the viewer, for example, touching a region on the touch-sensitive screen where the target or the response region appears. For example, a commercial on baseball is displayed on the touch-sensitive screen. During the play of the commercial, various baseball team logos are randomly displayed, each for 2 to 3 seconds. The viewer can confirm viewing of the commercial by touching the touch-sensitive screen when and where the logos appear. In an embodiment, the challenge and response interactions are implemented using GUI widgets. The challenge presented to the viewer is to pinpoint a position on the parent window where a child window, for example, a modal window, appears at a random position during the playing of the video in the parent window. A modal window is a child window that requires the viewer to interact with the child window before the viewer can return to the flow of the parent window. The challenge further comprises selecting the pinpointed position within a response time-out period. The selection of the pinpointed position is performed, for example, using a touch stylus on a touch-sensitive screen, or using a pointing device and a corresponding pointer on the display screen 601a. In this example, the user interface is a touch-sensitive screen or a pointing device in conjunction with a regular screen, respectively. The child window presenting the challenge may comprise a button that has to be selected by the viewer within the response time-out period to register a valid response.

In another example, the viewer is required to complete more than one challenge-response interaction, that is, locate and select more than one random target or response region at different time periods, during the play of a video. For example, during the playing of a video in the parent window, a first button appears for 5 seconds at half-way through the video, while a second button appears for 5 seconds at the end of the video. The viewer is required to locate and select both the buttons within the relevant response time-out periods to register a valid response. If the viewer has not correctly selected either of the targets or both the targets within the relevant response time-out periods, the viewer is prompted to replay the video and complete the challenge. In another example, the targets or the response regions, for example, one or more buttons appear immediately outside the boundary of the multimedia player frame 1302, during the play of a video. The viewer is required to locate and select the buttons within the relevant response time-out periods to register a valid response.

In an embodiment, the random challenge content is either visual or aural. In case of the random challenge being aural, the random challenge content is in a non visual alphanumeric form. If the random challenge content is aural in nature, the random challenge content is, for example, alphanumeric or indicative of a logo, icon, symbol, shape, picture, etc. If the random challenge content is visual, the random challenge content is, for example, in the form of a logo, icon, symbol, shape, picture, etc. The response for the random challenge requires the viewer to enter the random challenge content, or to select the correct option from the presented options. The response can also be registered manually or orally. For example, the viewer has to perform a manual action such as depressing a button, operating a pointing device or touching a screen, or utter words or sounds to register a response.

Consider an example where the challenge content is visually presented to the viewer. The challenge content, for example, a logo, an icon, a symbol, a shape, a picture, etc. is displayed for 5 seconds within a first child window during the play of an advertisement in a parent window or content rendering window. A second child window displays a message or a prompt such as "Provide the symbol above at the end of the advertisement" or "Select the symbol previously displayed". Consider another example where the challenge content is aurally presented to the viewer during the play of an advertisement. A speech synthesizer provides an audible sound indicative of the challenge content, and also prompts the viewer to remember and submit the challenge content at the end of the advertisement by a message, for example, "Enter the two digits that you heard". The viewer submits the response by selecting the correct option indicative of the challenge content presented. The viewer also submits the response by depressing the appropriate alphanumeric keys of an input means of the client device 601. In another example, the viewer submits the response by uttering or orally articulating the challenge content, which is processed by suitable voice recognition software in the client device 601 or the server 602. In an embodiment, the viewer is required to submit the correct response within a response time-out period.

In the event that the viewer enters an incorrect response, or enters the response after the elapse of the response time-out period, a challenge-response module 601*d* of the view confirmation module 601*b* displays an error message or a prompt message, prompting the viewer to restart or replay the multimedia content. For example, the prompt message: "You have not entered the required digits in the time allocated, or you have entered the incorrect digits. Would you like to replay the advertisement?" is displayed, inviting the viewer to select either a "Yes" option, or a "No" option. If the viewer chooses to replay the multimedia content, the multimedia content is replayed and the procedure is repeated with another challenge-response sequence. If the viewer chooses not to replay the multimedia content, the response report is generated indicating the incorrect response in the previous attempt, and the play of the multimedia content is terminated.

Figure 2:
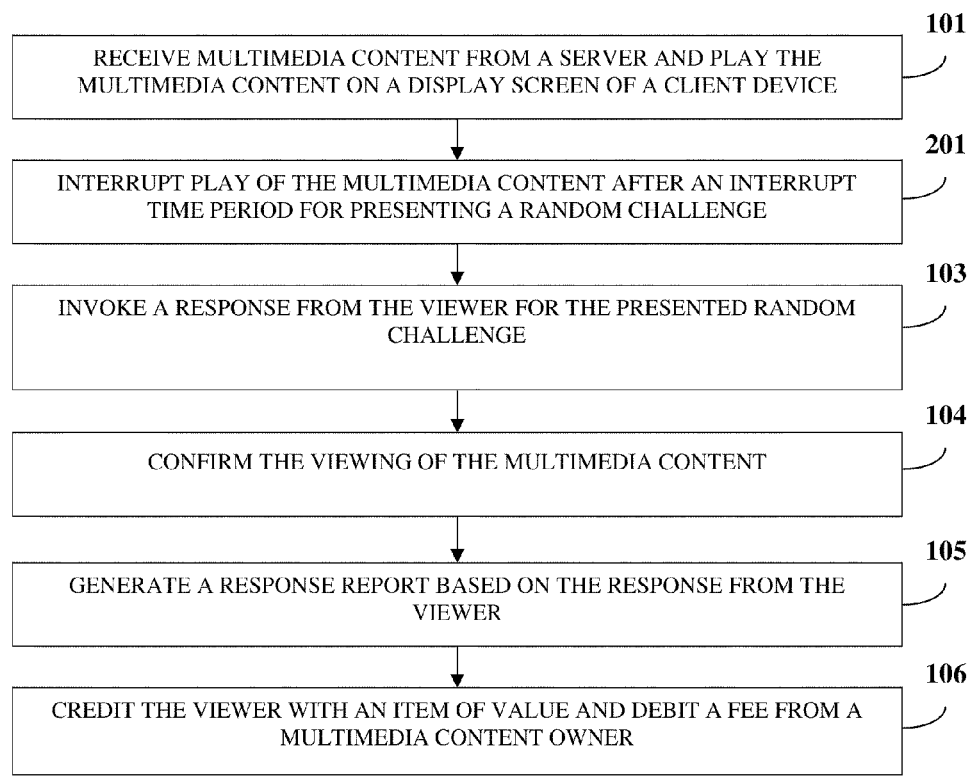
FIG. 2 illustrates a second embodiment of the computer implemented method for confirming that a viewer viewed multimedia content on a client device.

FIG. 2 illustrates a second embodiment of the computer implemented method for confirming that a viewer viewed multimedia content on a client device 601. One or more multimedia content owners upload multimedia content on the server 602 of the media service provider. In an embodiment, the multimedia content owners upload multimedia content on, for example, a third party content server, a network of servers, a server that belongs to the multimedia content owners, etc. In this embodiment, the multimedia content owner transmits, for example, a tag or a reference to the location of the uploaded multimedia content to the media service provider administering the server 602. The server 602 then invokes transmission of the multimedia content to the viewer from the tagged or referenced location, for example, from the third party content server. The server 602 invokes a real time transmission of the multimedia content to the viewer via, for example, the third party content server by delivering browser executable code such as JavaScript code to the viewer's web browser. The viewer's web browser automatically executes the JavaScript code, fetches the multimedia content from the referenced location, and displays the multimedia content to the viewer.

The client device 601 of a viewer receives 101 the multimedia content, for example, an advertisement, a commercial message, an educational clip, an entertainment clip, etc. and plays the multimedia content on a display screen 601*a* of the client device 601, for example, in an audiovisual format. The play of the multimedia content is interrupted 201 after an interrupt time period for presenting a random challenge. The interrupt time period is less than the duration of the multimedia content. In an embodiment, the server 602 interrupts 201 the play of the multimedia content on the client device 601 after an interrupt time period for presenting a random challenge. In another embodiment, the client device 601 interrupts the play of the multimedia content on the client device 601 after an interrupt time period for presenting a random challenge. The random challenge content is generated and displayed at random on the multimedia content. In another embodiment, the random challenge is presented to the viewer by overlaying the random challenge on the multimedia content as the multimedia content is playing on the display screen 601*a* of the client device 601 as disclosed in the detailed description of FIG. 1. In this embodiment, the random challenge is overlaid or played on the multimedia content or in close proximity to the multimedia content. A response is invoked 103 from the viewer for the presented random challenge. The response entered by the viewer determines whether the viewer has viewed the multimedia content. The response is used for confirming 104 the viewing of the multimedia content. A response report is generated 105 based on the response from the viewer. The response report verifies the correctness of the response to the random challenge and confirms viewing of the multimedia content by the viewer. The viewer is credited 106 with an item of value, if the response report confirms that the viewer viewed the multimedia content, while the multimedia content owner is debited a fee. In an embodiment, the viewer is credited only for the correct responses provided by the viewer and verified by the response report.

In an embodiment, the item of value provided to the viewer is the ability to view premium multimedia content, for example, a sports broadcast, a movie, a television show, etc. In this embodiment, the multimedia content owner is debited a fee similar in value to the value of the premium multimedia content. In an embodiment, the amount by which the multimedia content owner's debited fee exceeds the item of value credited to the viewer is retained by the media service provider as profit. In other embodiments, there may be additional complementary revenue sources where the media service provider provides for the items of value credited to the viewer. In another embodiment, the media service provider administering the server 602 credits the viewer with one or more items of value based on the response report confirming that the viewer provided correct responses to the random challenges.

In an embodiment, the items of value earned by the viewer are a number of units of virtual currency similar to, for example, frequent flyer miles earned in the airline industry. The viewer may exchange the number of units of virtual currency at a future time for rewards such as viewing premium multimedia content, cash, etc. The use of the virtual currency embodiment allows the value earning process and the value redemption process to be separated over time across hours, days, weeks, and so on. In the intervening time, the number of units of virtual currency earned by the viewer is accumulated in an electronic wallet (e-wallet) associated with the viewer's account on the server 602 or with any other third party trusted by the media service provider and the viewer.

If the viewer provides incorrect responses to the server 602 or provides a response after an elapsed response time-out period, the challenge-response module 601*d* prompts the viewer to restart or replay the multimedia content. If the viewer chooses to replay the multimedia content, the multimedia content is replayed and another random challenge is presented to the viewer. If the viewer chooses not to replay the multimedia content, the response report is generated indicating the incorrect responses provided by the viewer in the previous attempt, and the play of the multimedia content is terminated. The viewer is compensated for only the correct responses as indicated by the response report confirming viewing of the multimedia content.

In an embodiment, the client device 601 receives a list of multimedia content from the server 602 for selection by the viewer as disclosed in the detailed description of FIG. 1. The multimedia content selected by the viewer is rendered on the client device 601 and the duration of the selected multimedia content is determined. The rendering of the multimedia content is interrupted after an interrupt time period for presenting a random challenge. The interrupt time period is less than the duration of the rendered multimedia content. For example, an audio-video clip of duration M seconds is interrupted, L seconds after the audio-video clip commences, for presenting a random challenge. The steps of rendering the viewer selected multimedia content, interrupting the multimedia content clip for presenting a random challenge, invoking a response, and generating a response report may be repeated for other multimedia content in the list depending on the selection of the viewer. In an embodiment, the interrupted multimedia content is not resumed until a correct response is submitted for the random challenge by the viewer.

The interrupt time period is generated using a random generator 602b of the server 602. A timer 601f is provided on the client device 601 to begin counting the interrupt time period at the start of the play of the multimedia content. When the timer 601f reaches the interrupt time period, the play of the multimedia content is interrupted at a random time to present the random challenge to the viewer on the client device 601.

Figure 3:
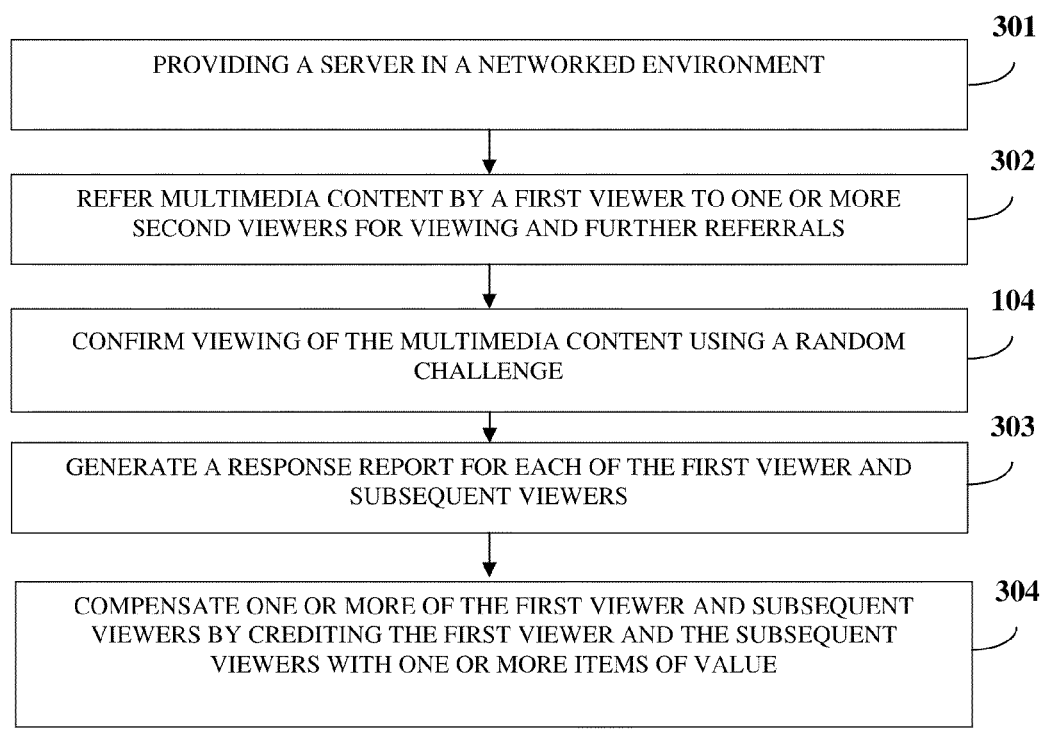
FIG. 3 illustrates a computer implemented method for creating a virtual community network for incentivized viewing of multimedia content by cascading referrals for the incentivized viewing of the multimedia content.

FIG. 3 illustrates a computer implemented method for creating a virtual community network for incentivized viewing of multimedia content by cascading referrals for the incentivized viewing of the multimedia content. The computer implemented method disclosed herein provides 301 the server 602 in a networked environment. The server 602 may be administered by, for example, a media service provider. A first viewer receives the multimedia content on a client device 601 from the server 602 for viewing. The client device 601 is capable of receiving the multimedia content in different multimedia content formats, for example, hypertext markup language 5 (HTML5) format, the Windows® audio video format, and other proprietary and non-proprietary formats. In an embodiment, the server 602 transmits a list of the multimedia content preselected by the first viewer to the client device 601 of the first viewer or based on the first viewer's preferences stored on the server 602. The server 602 provides the multimedia content on a display screen 601a of the client device 601 of the first viewer for viewing, based on, for example, a request for the multimedia content from the first viewer. The first viewer registers with the server 602 and becomes a member of the virtual community network. The first viewer refers 302 the multimedia content to one or more second viewers in the networked environment for viewing and further referrals. The further referrals comprise, for example, referral of the multimedia content by one or more of the second viewers to one or more third viewers, and referral of the multimedia content by one or more of the third viewers to one or more nth viewers. The first viewer, the second viewers, the third viewers, and so on to the nth viewers are herein referred to as "cascading viewers". Also, for purposes of illustration, the viewers, for example, the second viewers, the third viewers, and so on to the nth viewers, who view the multimedia content based on the referral from the first viewer are herein referred to as "subsequent viewers". The subsequent viewers are, for example, members or non-members of the created virtual community network.

The server 602 confirms 104 viewing of the multimedia content by the first viewer and the subsequent viewers using a random challenge that is, for example, one or more of random in content, presented at random times during and/or after play of the multimedia content, and presented at random physical locations on the multimedia content as disclosed in the detailed description of FIGS. 1-2. The server 602 generates 303 a response report for each of the first viewer and the subsequent viewers based on the viewing of the multimedia content by the first viewer and the subsequent viewers respectively.

The server 602 compensates 304 one or more of the first viewer and the subsequent viewers by crediting one or more of the first viewer and the subsequent viewers respectively with one or more items of value, if the response report confirms viewing of the multimedia content by the first viewer and the subsequent viewers. The items of value comprise, for example, one or more of points, points redeemable for cash, points redeemable for additional items of value, scores, scores redeemable for cash, scores redeemable for additional items of value, cash, discounts, access to premium multimedia content, units of virtual currency, and any combination thereof. The cascading viewers are allowed to view premium multimedia content based on the items of value accrued by the cascading viewers. In another example, the first viewer and the subsequent viewers are provided with an option for triggering playback of premium multimedia content in exchange for the items of value accrued by the first viewer and the subsequent viewers, and allowing the premium multimedia content to play. Referring of the multimedia content for the viewing, and crediting one or more of the first viewer and the subsequent viewers with one or more items of value creates the virtual community network for the incentivized viewing of the multimedia content.

The first viewer and the subsequent viewers create the virtual community network for incentivized viewing of multimedia content by referring the multimedia content, wherein the first viewer and the subsequent viewers become members of the virtual community network. For purposes of illustration, the detailed description refers to a first viewer and subsequent viewers; however the scope of the computer implemented method and system 600 disclosed herein may be extended to include an almost unlimited number of viewers and predetermined multiple levels of viewers. The viewers may refer multimedia content in the form of one or more videos to other viewers for referring and receiving items of value. The first viewer may be credited with one or more items of value for referring the videos to one or more second viewers who in turn refer the videos to one or more third viewers, and so on to nth viewers. In an embodiment, as the virtual community network expands by multiple referrals, the initial viewers accumulate items of value for all subsequent referrals. The server 602 tracks the viewing activities of the viewers for further referrals. The server 602 controls the levels of referrals and the accumulation of items of value by the cascading viewers.

The server 602 credits the first viewer and the subsequent viewers by, for example, depositing one or more items of value to their accounts on the server 602 and debiting a fee from one or more multimedia content owners, if the response report confirms the viewing of the multimedia content by the first viewer and the subsequent viewers. For example, the items of value are credited to an electronic wallet (e-wallet) accounts associated with the first viewer and the subsequent viewers. As disclosed above, the cascading viewers comprising the first viewer and the subsequent viewers, that is, the second viewers, the third viewers, and so on to the nth viewers are herein also collectively referred to as the "viewer" or "viewers".

In an embodiment, the multimedia content owner provides the items of value for confirming that the viewer has viewed the multimedia content. The multimedia content owner is debited a pre-agreed upon fee for each confirmation. In another embodiment, the media service provider administering the server 602 provides the items of value for confirming that the viewer has viewed the multimedia content. The media service provider may allow the viewer to view premium grade multimedia content as compensation. In another embodiment, the viewer pays for viewing premium multimedia content. In this embodiment, the viewer is debited a fee while the server 602 credits the multimedia content owner providing the premium multimedia content a fee equal or less in value to the value of the premium multimedia content. In case, the credited fee is less than the debited fee, the difference may be considered as profit to the media service provider. Furthermore, the server 602 deposits one or more items of value to the first viewer for referring the premium multimedia content to one or more subsequent viewers. The server 602 may credit the first viewer with a portion of the fee debited from the subsequent viewers.

The multimedia content is streamed to the client devices 601 using a network protocol that supports streaming media. For example, the network protocol comprises a user datagram protocol, a real time streaming protocol, a real time transport protocol, and a real time transport control protocol. These network protocols are used for controlling streaming media sessions between the server 602 and the client device 601. Also, the delivery of the streaming multimedia content is via different modes of transmission, for example, unicast, multicast, or peer to peer transmissions. In an embodiment, the multimedia content is received by the client device 601 from the server 602 as a progressive download. The multimedia content may be cached in segments on an intermediate system, for example, a "store and forward" system. For example, the server 602 transmits the multimedia content to the "store and forward" system, which stores the multimedia content and then sends the stored multimedia content to the client device 601. The "store and forward" system may also send the multimedia content to one or more "store and forward" systems prior to sending the multimedia content to the client device 601. In an embodiment, the server 602 transmits the multimedia content to an intermediate system, where the intermediate system transmits the multimedia content to the client device 601 at predetermined intervals of time.

The streams comprising the random challenge and the multimedia content are either integrated at the server 602 or combined at a web browser on the client device 601 of a viewer. The random challenge and the multimedia content may arrive at the client device 601 of the viewer as a single integrated stream or as two independent streams that are combined in real time at the client device 601. The random challenge and the multimedia content may also be stored in the client device 601 for simultaneous viewing at a time selected by the viewer. In an embodiment, the random challenges are stored in a database 602g. The server 602 retrieves the stored random challenges and presents the retrieved random challenges with the multimedia content to the viewer. In another embodiment, a single random challenge may be used with more than one multimedia content.

The first viewer and the subsequent viewers may refer the multimedia content to other viewers in the networked environment, the members of the created virtual community network, and the non-members of the created virtual community network. The first viewer and the subsequent viewers, for example, post one or more referrals of the multimedia content on the server 602 and/or one or more social networking platforms for referring the multimedia content to other members of the created virtual community network and non-members of the created virtual community network. Furthermore, the first viewer and the subsequent viewers may post the referrals of the multimedia content on the server 602 and/or the social networking platforms for registering non-members into the created virtual community network. In an embodiment, the referrals posted on the server 602 and/or the social networking platforms redirect the subsequent viewers, for example, the second viewers, the third viewers, the nth viewers, the members, and the non-members of the created virtual community network to the multimedia content for viewing. In another embodiment, the first viewer and the subsequent viewers may refer the multimedia content by, for example, forwarding the multimedia content to other members of the created virtual community network, and non-members of the created virtual community network via the server 602 and/or the social networking platforms.

In embodiment, the second viewers receive the multimedia content referred by the first viewer based on one or more preferences selected by the second viewers, or based on the first viewer's own decision to share the multimedia content based on the first viewer's own discretion. One or more of the second viewers may then refer the multimedia content to one or more third viewers and this referral may continue to referrals of the multimedia content to one or more nth viewers. In this embodiment, the preferences are, for example, a category of the multimedia content, for example, educational multimedia content, sports related multimedia content, etc. In an example, the second viewers set filters on the server 602 to receive sports related multimedia content. The server 602 monitors the multimedia content referred by the first viewer to the second viewers and transmits sports related multimedia content to the second viewers.

The server 602 credits one or more of the first viewer and the subsequent viewers with one or more items of value based on, for example, the referring of the multimedia content, accessing of the referred multimedia content, confirming the viewing of the multimedia content, and registration of non-members into the created virtual community network. For example, the server 602 credits one or more of the first viewer and the subsequent viewers for viewing of the multimedia content referred by the first viewer and the subsequent viewers respectively. The server 602 further credits the first viewer and/or the subsequent viewers for referring the multimedia content to the subsequent viewers. The first viewer and the subsequent viewers are further credited with the items of value if the non-members register into the created virtual community network based on the referrals made by the first viewer and the subsequent viewers.

The referrals for the multimedia content cascade through to other members of the created virtual community network and non-members of the created virtual community network via the subsequent viewers. For example, the second viewers refer the multimedia content to one or more third viewers and non-members. The second viewers are credited with an item of value for referring the multimedia content to the third member viewers, while the first viewer may also be credited with an item of value for the referrals made by the second viewers. One or more response reports are generated when the multimedia content is viewed by the third viewers. One or more of the third viewers, the second viewers, and the first viewer are credited with an item of value, if the response reports confirm that the multimedia content has been viewed by the third viewers, and so on. This creates a multi-level referral system or a virtual multi-level marketing system in the created virtual community network or a social networking environment, wherein the cascading viewers are credited for viewing the multimedia content. In an embodiment, the server 602 controls the levels of the referring of the multimedia content. The levels of referrals may be controlled by, for example, the media service provider administering the server 602. The server 602 generates a referral report comprising information on the referrals of the multimedia content made by the first viewer to the subsequent viewers in the networked environment, and accessing of the referred multimedia content by the subsequent viewers. The server 602 generates multiple referral reports based on the levels of referrals.

Consider an example of two-level referral system. A first viewer receives the multimedia content from the server 602 on a display screen 601a of a client device 601 for viewing.

The server 602 generates a first response report when the first viewer views the multimedia content. The server 602 credits the first viewer a first predetermined compensation or an item of value if the first response report confirms that the first viewer viewed the multimedia content. The confirmation that the first viewer has viewed the multimedia content on the client device 601 is achieved using a challenge-response interaction with the first viewer. The first viewer refers the multimedia content to one or more second viewers in the networked environment. One or more second response reports are generated when the second viewers view the multimedia content. The second viewers and/or the first viewer are credited with a second predetermined compensation, if the second response reports confirm that the second viewers have viewed the multimedia content.

In an embodiment, only the first viewer is credited with a predetermined compensation, if the second response reports confirm that the second viewers viewed the multimedia content. In another embodiment, only the second viewers are credited with a predetermined compensation, if the second response reports confirm that the second viewers viewed the multimedia content. In another embodiment, both the first viewer and the second viewer are credited with a predetermined compensation, if the second response reports confirm that the second viewers viewed the multimedia content. Furthermore, the predetermined compensation of the first viewer and the second viewers is in the form of points or scores that are redeemable for cash, special discounts on products or services, access to premium multimedia content from the server 602, etc. In another embodiment, the first viewer and/or the second viewers are also credited with items of value for referring the multimedia content to other viewers and for enrolling other viewers to the virtual community network.

Figure 4:
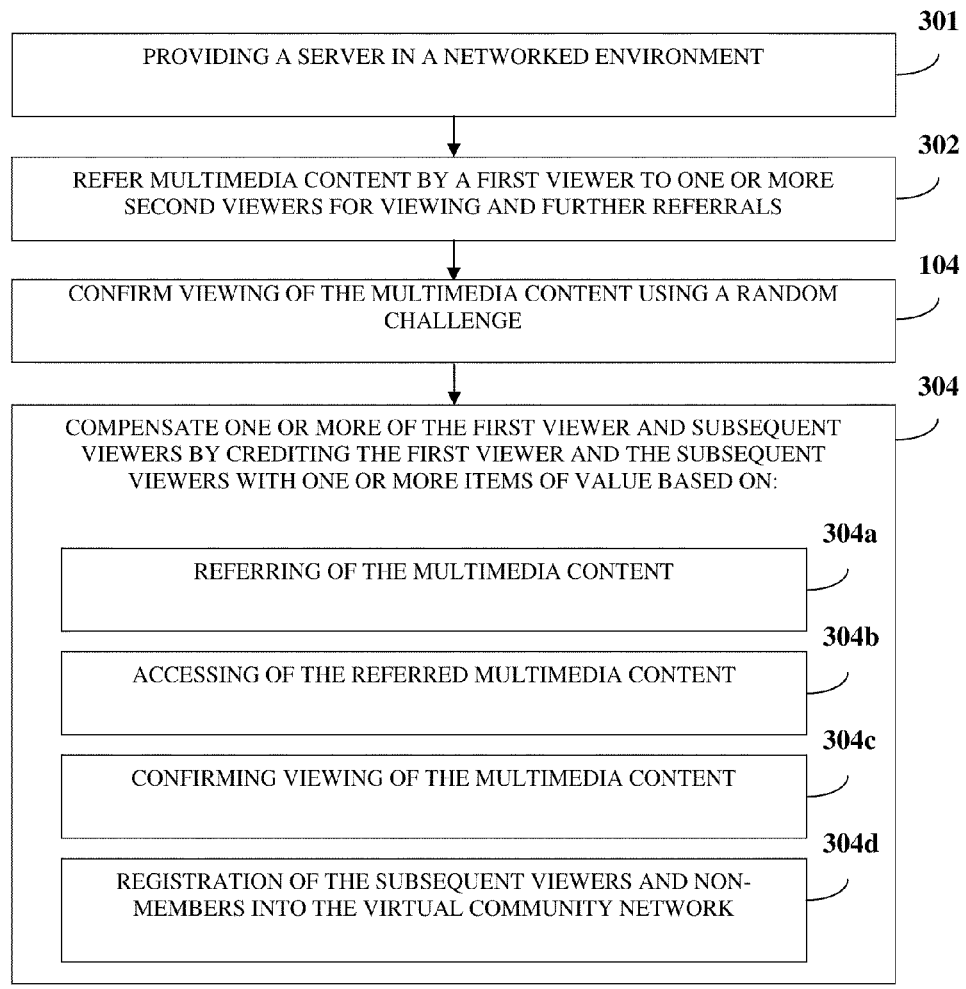
FIG. 4 illustrates an embodiment of the computer implemented method for creating a virtual community network for incentivized viewing of multimedia content by cascading referrals for the incentivized viewing of the multimedia content.

FIG. 4 illustrates an embodiment of the computer implemented method for creating a virtual community network for incentivized viewing of multimedia content by cascading referrals for the incentivized viewing of the multimedia content. The computer implemented method provides 301 the server 602 in the networked environment. A first viewer receives the multimedia content on a client device 601 from the server 602 for viewing. The first viewer refers 302 the multimedia content to one or more second viewers in the networked environment for viewing and further referrals as disclosed in the detailed description of FIG. 3. Viewing of the multimedia content is confirmed 104 using, for example, the random challenge as disclosed in the detailed description of FIGS. 1-2. The server 602 compensates 304 one or more of the first viewer and subsequent viewers by crediting the first viewer and the subsequent viewers with one or more items of value based on, for example, referring 304*a* of the multimedia content, accessing 304*b* of the referred multimedia content, confirming 304*c* the viewing of the multimedia content, and registering 304*d* of the subsequent viewers and non-members into the virtual community network.

The examples enumerated herein disclose different methods of crediting the cascading viewers, that is, the first viewer, the second viewers, the third viewers, and so on to the nth viewers, for viewing and referring of the multimedia content. In a first example, only the first viewer is credited with one or more items of value based on confirming the viewing of the referred multimedia content by the second viewers. In a second example, the second viewers are credited with one or more items of value based on the response report confirming viewing of the multimedia content by the second viewers. In a third example, the first viewer is credited with one or more items of value based on the response report confirming viewing of the multimedia content by the first viewer. The first viewer refers the multimedia content to the second viewers. A referral report may be generated for the referring of the multimedia content. The first viewer is credited with the items of value based on the response report and the referral report confirming viewing and referring of the multimedia content by the second viewers. Furthermore, the second viewers are credited with the items of value based on the response report confirming viewing of the multimedia content. In a fourth example, the second viewers refer the referred multimedia content to one or more third viewers, for example, members of the virtual community network, non-members of the virtual community network resulting in, for example, a multi-level referral system. A referral report is generated based on the referring of the multimedia content by the second viewers. In this example, the first viewer is credited with the items of value based on the confirming of viewing and referring of the multimedia content by one or more of each of the first viewer, the second viewers, or the third viewers. Therefore, the first viewer yields value for viewing of the multimedia content by the second viewers and/or the third viewers at any level of the multi-level referral system. The second viewers are credited with the items of value based on confirming of viewing and referring of the multimedia content by the third viewers.

Furthermore, each of the first viewer and the subsequent viewers is credited with items of value if they encourage non-members to register in the created virtual community network. The cascading viewers, that is, the first viewer, the second viewers, the third viewers, and so on to the nth viewers, are therefore credited with items of value for referring the multimedia content, forwarding the multimedia content or a link directing other viewers to the multimedia content, accessing the multimedia content, confirming that the referred multimedia content has been viewed, and registration of non-members of the created virtual community network with the server 602 to consume the referred multimedia content. The server 602 may credit the items of value to one or more viewers in one or more levels in the multilevel referral system based on predetermined criteria, for example, number of referrals, confirmation of viewing with a correct response, number of registrations generated, etc.

Figure 5:
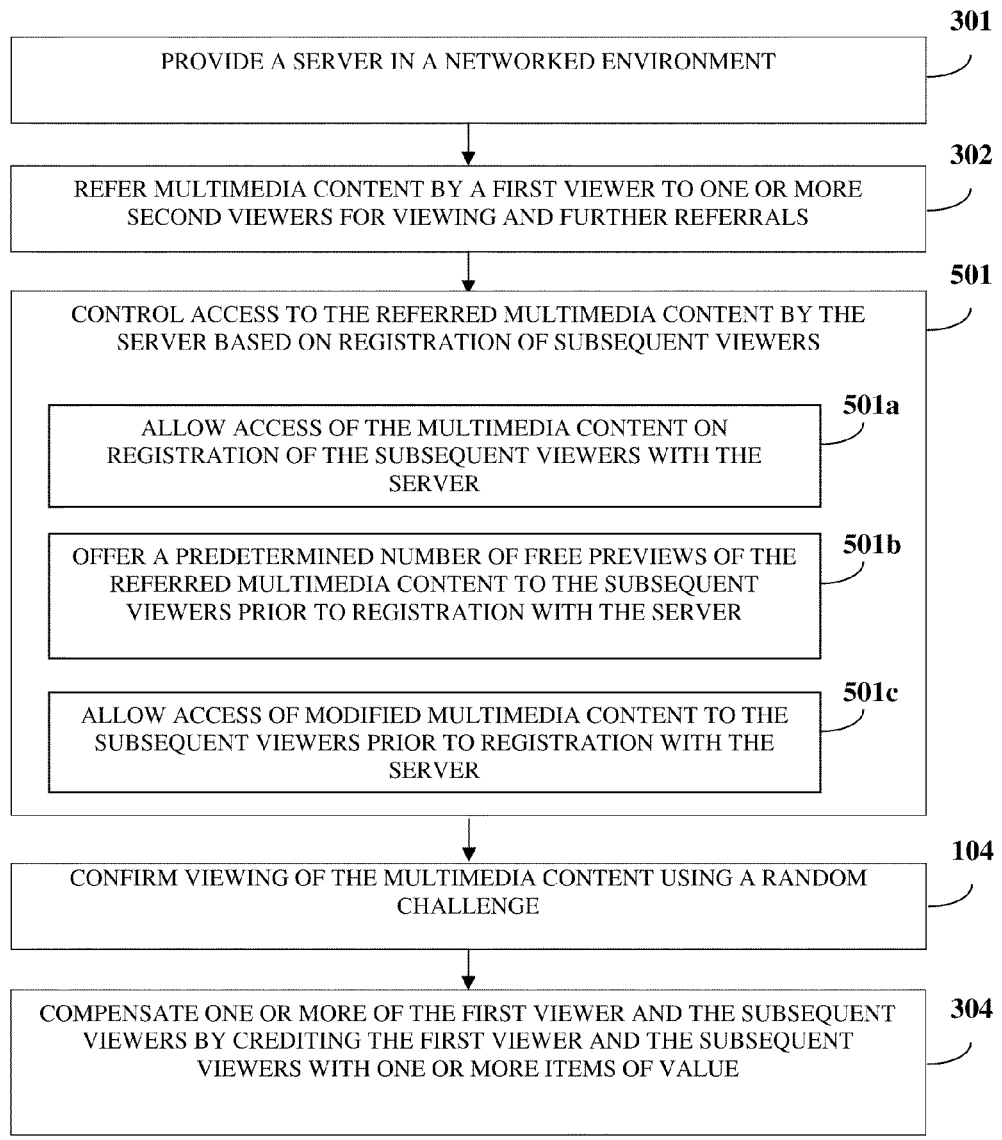
FIG. 5 illustrates an embodiment of the computer implemented method for creating a virtual community network for incentivized viewing of multimedia content by cascading referrals for the incentivized viewing of the multimedia content.

FIG. 5 illustrates an embodiment of the computer implemented method for creating a virtual community network for incentivized viewing of multimedia content by cascading referrals for the incentivized viewing of the multimedia content. The computer implemented method disclosed herein provides 301 the server 602 in the networked environment. A first viewer receives the multimedia content on a client device 601 from the server 602 on registering with the server 602. The first viewer refers 302 multimedia content to one or more second viewers in the networked environment for viewing and further referrals as disclosed in the detailed description of FIG. 3. The server 602 controls 501 access to the referred multimedia content based on registration of subsequent viewers with the server 602.

The server 602 controls the access to the multimedia content by, for example, allowing access 501*a* of the multimedia content on registration of the subsequent viewers with the server 602, offering 501*b* a predetermined number of free previews of the referred multimedia content to the subsequent viewers prior to the registration with the server 602, allowing access 501*c* of modified multimedia content to the subsequent viewers prior to the registration with the server 602, etc. Consider an example where the server 602 modifies the multimedia content for presenting the modified multimedia content to non-members of the created virtual community network. In this example, the server 602 modifies the multimedia content by, for example, diminishing the quality of the multimedia content, applying a watermark to the multimedia content, altering the audio content of the multimedia content, appending or prepending additional content such as an advertisement into the multimedia content, etc., to encourage or promote registration of the non-members into the created virtual community network for accessing the complete unaltered multimedia content. As used herein, the term "complete unaltered multimedia content" refers to the multimedia content on the server 602 as uploaded or referenced by, for example, the multimedia content owner.

Viewing of the multimedia content is confirmed 104 using the random challenge as disclosed in the detailed description of FIGS. 1-2. The server 602 compensates 304 one or more of the first viewer and the subsequent viewers by crediting the first viewer and the subsequent viewers respectively with one or more items of value based on, for example, referring of the multimedia content, confirmation of viewing of the multimedia content, and registration of the subsequent viewers with the server 602.

The server 602 promotes registration of non-members into the virtual community network by, for example, allowing access of the multimedia content to only the members of the virtual community network, offering a predetermined number of free previews of the referred multimedia content, allowing access of complete multimedia content to the members of the created virtual community network, etc. The server 602 credits the first viewer and the subsequent viewers with one or more items of value if the non-members register into the virtual community network. The server 602 therefore acquires new registrations or subscriptions via activities of existing members.

In another embodiment, the server 602 enables the first viewer and one or more subsequent viewers to register their client devices 601 for periodically receiving reports on the multimedia content from the server 602. In another embodiment, the server 602 tracks viewing activities of the first viewer and the subsequent viewers for determining compensation and for controlling levels of referrals of the multimedia content.

Consider an example, wherein a non-member receives a referral of an advertisement video related to the IPhone® of Apple Inc. from a viewer that is a member of the virtual community network administered by the server 602. The non-member views the advertisement video related to the IPhone® on the display screen 601a of the client device 601 of the non-member. The server 602 performs the challenge-response interaction with the non-member and confirms the viewing of the advertisement video by the non-member. Furthermore, the server 602 prompts the non-member to register into the virtual community network for crediting the non-member with items of value for the viewing confirmation. The server 602 credits the member for viewing and referring the advertisement video to the non-member and for registering the non-member into the virtual community network. When the non-member registers into the virtual community network to become a member, the server 602 enables the member to refer the advertisement video to other subsequent viewers, for example, non-members, other members of the virtual community network, and to receive items of value.

Consider another example where the first viewer refers the multimedia content by sending and/or posting referrals, for example, text-based updates, the multimedia content, etc., on a social networking platform, for example, http://twitter.com of Twitter® Inc, http://www.facebook.com of Facebook, Inc. The text-based updates may be displayed on a webpage associated with a viewer account of the first viewer on the social networking platform. These text-based updates are also automatically delivered to the subsequent viewers, who have subscribed to follow the viewing activities of the first viewer or to receive the text-based updates of the first viewer. The text-based updates are received by the subsequent viewers. The subsequent viewers may be for example, friends of the first viewer on the social networking platform, viewers subscribed to receive multimedia content from the first viewer, non-members following the activities of the first viewer, etc. These text-based updates posted by the first viewer are delivered to the subsequent viewers by, for example, electronic mail (email) messages, short message service (SMS) messages, etc. The first viewer may, for example, restrict the delivery of text-based updates and other referrals to a limited number of the subsequent viewers or allow open access to the multimedia content. In an embodiment, the first viewer may also post a link to the multimedia content on a social networking platform such as http://twitter.com of Twitter® Inc., for referring the multimedia content to one or more subsequent viewers. In this example, the subsequent viewers may click on the link to view the multimedia content. In this example, the first viewer is credited with one or more items of value based on the viewing and the referring of the multimedia content by the subsequent viewers.

Referring the multimedia content to subsequent viewers by posting text based updates and/or the multimedia content to be viewed by the subsequent viewers is referred to as "microblogging" or "zagging". In conjunction with the text-based updates, the first viewer, with the role of a member of the created virtual community network, may also prompt the non-members in the networked environment to join the created virtual community network by registering with or subscribing to the server 602 via the social networking platform or website. The non-members registering with the server 602 are converted to new members of the virtual community network, and may set preferences to receive multimedia content from the server 602 directly. In an embodiment, the first viewer is credited with items of value for converting non-members to new members of the virtual community network. The first viewer is also credited with items of value when the new members referred by the first viewer, refer the multimedia content to other non-members or when the new members that are referred by the first viewer, prompt non-members to join the created virtual community network. The first viewer derives exponential compensation by expanding the created virtual community network. The multi-level referral system of the created virtual community network for viewing multimedia content adopts a multi-level marketing mechanism for crediting the members of the created virtual community network. The multi-level marketing mechanism represents a compensation model, wherein the members are credited with items of value for enrolling other members into the multi-level referral system of the created virtual community network. The multi-level marketing mechanism credits the members for referring multimedia content to the subsequent viewers, members and non-members of the created virtual community network alike. The multi-level marketing mechanism implemented by the server 602 comprises, for example, a pyramid selling scheme, referral marketing, network marketing, direct selling, etc.

In an embodiment, an administrator or a media service provider administering the server 602 controls permitted levels of referrals for the first viewer in the multi-level referral system. The administrator controls the number of levels, for example, 1 to n of the multi-level referral system. For example, the administrator may permit only a fixed number of levels for each member of the multi-level referral system of the created virtual community network. Consider an example where a simple eight ball model is implemented to control the referrals in the multi-level referral system within sustainable levels. The eight ball model is a pyramid based model where one viewer refers two other viewers, who refer two other viewers, each of whom refer two other viewers into the created virtual community network. Consider an example, where the first viewer with a role of a member of the virtual community network refers the multimedia content to two non-members for viewing, and also prompt the two non-members to join the virtual community network by registering with the server 602. The non-members join the virtual community network as new members and represent the first level of viewers, who follow the viewing activities of the first viewer. Each of the first level of viewers may in turn refer two other non-members, who join the created virtual community network and represent the second level of viewers in the eight ball model. Each of the second level of viewers again refers two other non-members to introduce the third level of viewers into multi-level referral system of the created virtual community network within the eight ball model.

Viewers at each level of the multi-level referral system are credited with items of value for viewing the multimedia content. The viewers are credited with additional items of value for referring other viewers in the multi-level referral system, which is predetermined by the administrator and changeable at any time. In the multi-level marketing mechanism disclosed herein, the crediting of items of value is distributed upstream based on whether the multimedia is viewed by the members in the multi-level referral system.

Each social networking platform links to a corresponding social networking website, wherein the viewers create the virtual community network for viewing the multimedia content using a network relationship with the server 602. The server 602 delivers referrals, for example, the text-based updates posted by the first viewer to the subsequent viewers by, for example, electronic mail messages, instant messages, multimedia message service (MMS) messages, short message service (SMS) messages, etc. The server 602 further delivers the prompts to join the created virtual community network posted by the first viewer to the subsequent viewers.

Consider an example, where a first viewer Steve registers on the server 602 and subscribes to receive multimedia content from the server 602. Steve views the multimedia content on, for example, his mobile phone. Steve then posts a referral, for example, a text-based update on a social networking website to refer the multimedia content for viewing. The social networking website where Steve posts his updates is, for example, http://twitter.com of Twitter® Inc. Bob, a second viewer who has subscribed to follow Steve's viewing activities on Twitter®, receives a delivery of Steve's text-based update as an SMS message on his mobile phone from the server 602. Bob then registers with the server 602 and receives the multimedia content from the server 602 for viewing. When Steve enters a response for the challenge presented to confirm viewing of the multimedia content, Steve is credited with an item of value. When Bob enters a response for the challenge presented to confirm viewing of the multimedia content, both Bob and Steve are credited with items of value. After viewing the multimedia content, Bob may then refer the multimedia content to Alice and Harry by posting his text-based update or by forwarding Steve's text-based update. Alice and Harry register with the server 602 and hence create a virtual community network for incentivized viewing of multimedia content via the multi-level referral system.

FIG. 6 illustrates a computer implemented system 600 for creating a virtual community network for incentivized viewing of multimedia content by cascading referrals for the incentivized viewing of the multimedia content. The computer implemented system 600 comprises a server 602 and a client device 601 connected via a network 603. In an embodiment, the server 602 is, for example, a single server 602, a hierarchy of servers, a network of servers, etc. The client device 601 of each of the cascading viewers, that is, the first viewer, the second viewers, the third viewers, and so on to the nth viewers, is, for example, a desktop computer, a notebook computer, a tablet computer such as an IPhone® or an IPad® of Apple Inc., a mobile phone device, a personal digital assistant, etc. The client device 601 comprises a display screen 601a, an input means (not shown) or input devices, a transceiver 604, and a timer 601f. The server 602 comprises an upload module 602a, a report receiving module 602i, a tracking module 602e, a random generator 602b, a payment module 602c, a content management module 602f, a database 602g, an aggregator 602h, a registration module 602j, and a referral management module 602d. The computer implemented system 600 disclosed herein further comprises a view confirmation module 601b provided on the client device 601 and/or the server 602. The server 602 transmits the multimedia content to the cascading viewers for viewing.

The upload module 602a enables one or more multimedia content owners to upload the multimedia content on the server 602. The client device 601 connects to the server 602 via the network 603 for receiving the multimedia content from the server 602. The multimedia content is played on the display screen 601a of the client device 601.

The referral management module 602d enables a first viewer to refer the multimedia content to one or more second viewers in the networked environment for viewing and further referrals. The referral management module 602d further enables one or more of the second viewers to refer the multimedia content to one or more third viewers in the networked environment, and so on to one or more nth viewers. Furthermore, the referral management module 602d enables the first viewer and the subsequent viewers to post one or more referrals of the multimedia content on the server 602 and/or one or more social networking platforms for referring the multimedia content to other members of the created virtual community network and non-members of the created virtual community network. The referral management module 602d posts, for example, prompts to join the created virtual community network. In an embodiment, the referral management module 602d controls levels of referring of the multimedia content by the first viewers and the subsequent viewers. Furthermore, the referral management module 602d generates a referral report comprising information on referrals of the multimedia content made by the first viewer to the subsequent viewers in the networked environment.

The view confirmation module 601b on the server 602 and/or the client device 601 confirms that the first viewer and the subsequent viewers, herein referred to as the "viewer", have viewed the multimedia content on the client device 601 using a random challenge. The view confirmation module 601b comprises a challenge generator 601c, a challenge-response module 601d, and a report generation module 601e. The challenge generator 601c generates a random challenge that is one or more of random in content, presented at random times during and/or after the play of the multimedia content, and presented at random physical locations on the multimedia content. The challenge generator 601c may also generate a pseudorandom challenge as disclosed in the detailed description of FIG. 1. In an embodiment, the challenge-response module 601d presents the generated random challenge to the viewer on the display screen 601a of the client device 601 by overlaying the generated random challenge on the multimedia content. In another embodiment, the challenge-response module 601d presents the generated random challenge to the viewer on the display screen 601a of the client device 601 by interrupting the play of the multimedia content and inserting the generated random challenge in and/or around the multimedia content. The challenge-response module 601d presents one or more random challenges at one or more times during and/or after the multimedia content is played. The timer 601f counts an interrupt time period for interrupting the play of the multimedia content and presenting the random challenge, wherein the interrupt time period is less than duration of the multimedia content. The random generator 602b generates the interrupt time period for interrupting the play of the multimedia content and presenting the random challenge.

The challenge-response module 601d invokes a response from the viewer for the presented random challenge. The viewer enters the response to the presented random challenge using the input means on the client device 601. The timer 601f ensures that the viewer provides the response to the random challenge within the response time-out period, after the random challenge is presented. The challenge-response module 601d determines if the viewer enters a response for the presented random challenge. The response confirms that the multimedia content has been viewed by the viewer. The challenge-response module 601d also determines if the response from the viewer to the presented random challenge is correct. A correct response confirms that the multimedia content has been viewed by the viewer. The report generation module 601e generates a response report for the viewer based on the response from the viewer. The response report may also be generated by the view confirmation module 601b on the server 602 in the online mode.

The payment module 602c compensates the viewer by crediting the viewer with one or more items of value based on viewing and referring of the multimedia content by the viewer. The payment module 602c credits the viewer with an item of value and debits a fee from the multimedia content owner, if the response report confirms that the viewer viewed the multimedia content. The payment module 602c also credits the first viewer with an item of value if the first viewer refers the multimedia content to, for example, one or more second viewers, members, and non-members of the created virtual community network. In an embodiment, the payment module 602c credits one or more of the first viewer and the subsequent viewers with one or more items of value based on, for example, referring of the multimedia content, accessing of the referred multimedia content, confirming of the viewing of the multimedia content, and registration into the created virtual community network. In an embodiment, the payment module 602c credits the viewer with an item of value and debits a fee from the multimedia content owner for each correct response that the viewer provides to one or more of the presented random challenges. In an embodiment, the payment module 602c credits the viewer by allowing premium multimedia content to play, if the response report confirms that the viewer viewed the multimedia content. In another embodiment, the payment module 602c distributes revenues generated from fees obtained from the multimedia content owners, registration fees, etc. to the cascading viewers as items of value. The payment module 602c in communication with the referral management module 602d credits the viewers for referring the multimedia content to other viewers based on the referral report generated by the referral management module 602d.

The server 602 transmits multimedia content to the viewer either on request or automatically. The tracking module 602e tracks viewing activities of the viewer for determining compensation and for controlling levels of referrals. The content management module 602f transmits multimedia content based on the viewing activities tracked by the tracking module 602e to, for example, the first viewer, the subsequent viewers, etc. Furthermore, the content management module 602f controls access to the referred multimedia content based on registration of the subsequent viewers with the server 602. In an embodiment, the content management module 602f transmits the multimedia content to a client device 601 of each the viewers for viewing based on, for example, viewing parameters requested by the viewers, etc. The viewing parameters are, for example, a schedule, an order of playing the list of multimedia content, etc. The server 602 also comprises media encoders for encoding the multimedia content for storing and on-demand streaming.

In an embodiment, the content management module 602f modifies the multimedia content available on the server 602 for presenting the modified multimedia content to, for example, non-members of the created virtual community network. For example, the content management module 602f diminishes the quality of the multimedia content for viewing by non-members of the created virtual community network to encourage the non-members to register into the created virtual community network to access the complete unaltered multimedia content.

The database 602g stores, for example, information of the viewer, the response reports, the referral reports, and the multimedia content. The database 602g stores several multimedia content files in different formats, and is updated after every cycle of production of the multimedia content. The multimedia content stored in the database 602g comprises audio, video, internet web pages, interactive games and applications, and other playable formats. The aggregator 602h queries the database 602g and prepares a list of multimedia content available for distribution over the network 603. A network interface 602k connects the server 602 to the network 603, for example, the internet, a wireless network, or a wired network.

The client device 601 comprises a transceiver 604 that connects the client device 601 to the server 602 via the network 603. In the case of a cellular client device, the transceiver 604 communicates with the server 602 via a cellular telephone network 605. The input means (not shown) accepts a selection of the multimedia content from the viewer. The client device 601 is capable of downloading, storing, and rendering multimedia content of one or more formats obtained from the server 602. The multimedia content, incorporating the challenge-response mechanism, may also be transmitted through the network 603 and rendered on a web browser in an internet enabled client device or mobile phone as streaming multimedia content. The multimedia content may also be distributed to televisions via integrated receivers/decoders or set top boxes and viewed through interactive television. In an example, the multimedia content is made available in an interactive group setting or multi-viewer environment such as a focus group for viewing the multimedia content, discussing, testing, or any other purposes.

The client device 601 may also download a client software module, for example, the view confirmation module 601b over the network 603 for making service requests to the server 602, while the server 602 addresses the service requests. The network 603 is, for example, the internet, a local area network, or any other network using available networking protocols.

The challenge-response module 601d in the view confirmation module 601b presents a random challenge by briefly overlaying the random challenge on the multimedia content being played. The challenge-response module 601d invokes a response from the viewer for the random challenge. In an embodiment, the server 602 comprises the view confirmation module 601b either in addition to or as a substitute for the challenge-response module 601d on the client device 601. The report receiving module 602i receives the response report transmitted by the client device 601. The payment module 602c in communication with the report receiving module 602i generates and maintains a monetary credit or compensation for the viewer based on the response report.

In an embodiment, the client device 601 downloads the multimedia content when the client device 601 is connected to the server 602. If eventually the viewer launches the view confirmation module 601b when the connection to the server 602 is inactive, the client device 601 renders the downloaded multimedia content in an off-line mode, performs a challenge-response interaction with the viewer, and generates and stores the response report. The off-line mode is triggered when the connection to the server 602 is inactive. When a connection to the server 602 is created via, for example, satellite, a wireless network, the network 603, etc., the response report is transmitted to the server 602 over the connection. In another embodiment, the client device 601 renders the multimedia content transmitted by the server 602 as streaming multimedia content. If the viewer launches the view confirmation module 601b when the connection to the server 602 is active, the client device 601 renders the multimedia content in an online mode. In an embodiment, the challenge-response interaction with the viewer is performed by the view confirmation module 601b on the server 602. The response report generated after completing the challenge-response interaction is transmitted to the server 602 over the active connection. The response report is also generated by the view confirmation module 601b on the server 602 in the online mode.

In an embodiment, the server 602 may periodically notify the viewer of the available multimedia content such as advertisements, including the amount payable to the viewer for viewing each advertisement. The server 602 also notifies the viewer of the available advertisements on receiving a request from the viewer. For example, the server 602 periodically transmits short message service (SMS) messages to the client device 601, for example, a cellular phone of the viewer. In another example, the server 602 may notify the viewer by broadcasting unstructured supplementary service data (USSD) messages. On receiving the request from the viewer, the server 602 may transmit an updated list of multimedia content to the client device 601 for selection and viewing by the viewer.

A potential viewer registers the client device 601 for the media service using the registration module 602j of the server 602. The registration module 602j creates a viewer account for, the first viewer, the subsequent viewers, the non-members of the created virtual community network, etc., on the server 602. The registration module 602j further associates an electronic wallet (e-wallet) with the viewer account. The server 602 accrues the items of value of the viewers in the e-wallet associated with the viewer account of the viewer. Furthermore, the registration module 602j enables the viewers to register each client device 601 of the viewers for periodically receiving reports on the multimedia content from the server 602. During the registration process, the viewer is requested to submit the unique identifier of the client device 601, an identity of the viewer, and optionally a password or a personal identification number (PIN) for authentication, and a credit account number. After completing the registration process, a user identifier (ID) and suitable software module, for example, the view confirmation module 601b is supplied to the client device 601 of the viewer. The view confirmation module 601b is executed for programming the client device 601 of the viewer, whereby the client device 601 is rendered capable of creating a client-server relationship with the server 602. In an embodiment, the payment module 602c in communication with the registration module 602j credits the viewers for referring the multimedia content to other viewers and registering new members into the created virtual community network.

In an example, the viewer requests the server 602 for access to the media service through the client device 601. The server 602 verifies whether the viewer is authenticated to access the media service by requesting the user identifier supplied during registration, and transmits multimedia content to the client device 601 for selection. If the server 602 fails to authenticate the viewer, the server 602 prompts the viewer to undergo the registration process. The viewer may choose to continue with the registration process or terminate the connection to the server 602. After the viewer is authenticated, the client device 601 of the viewer receives the multimedia content. The client device 601 launches the view confirmation module 601b and the display screen 601a presents a menu with options for displaying the list of multimedia content including the monetary amount payable to the viewer for viewing each multimedia content item in the list. The viewer selects a desired multimedia content item using the menu, and the selected multimedia content item is played to the viewer. The challenge-response module 601d presents the random challenge and invokes a response during or after the multimedia content is played.

The report generation module 601e generates a response report with report details based on the response received from the viewer. The client device 601 verifies whether the connection to the server 602 is active, and transmits the response report to the server 602. The report receiving module 602i receives the response report and instructs the payment module 602c to credit the e-wallet associated with the viewer's account with a designated amount of money, points or other items of value. If the connection to the server 602 is temporarily unavailable, the response report is temporarily stored in the client device 601, and transmitted to the server 602 when the connection is available again. The recently viewed multimedia content is deleted from the list, and the list of available multimedia content is updated and displayed again on the client device 601 for repeating the steps described above. Alternatively, the viewer may choose to terminate the view confirmation module 601b at this point by selecting an exit option from the menu.

Figure 7:
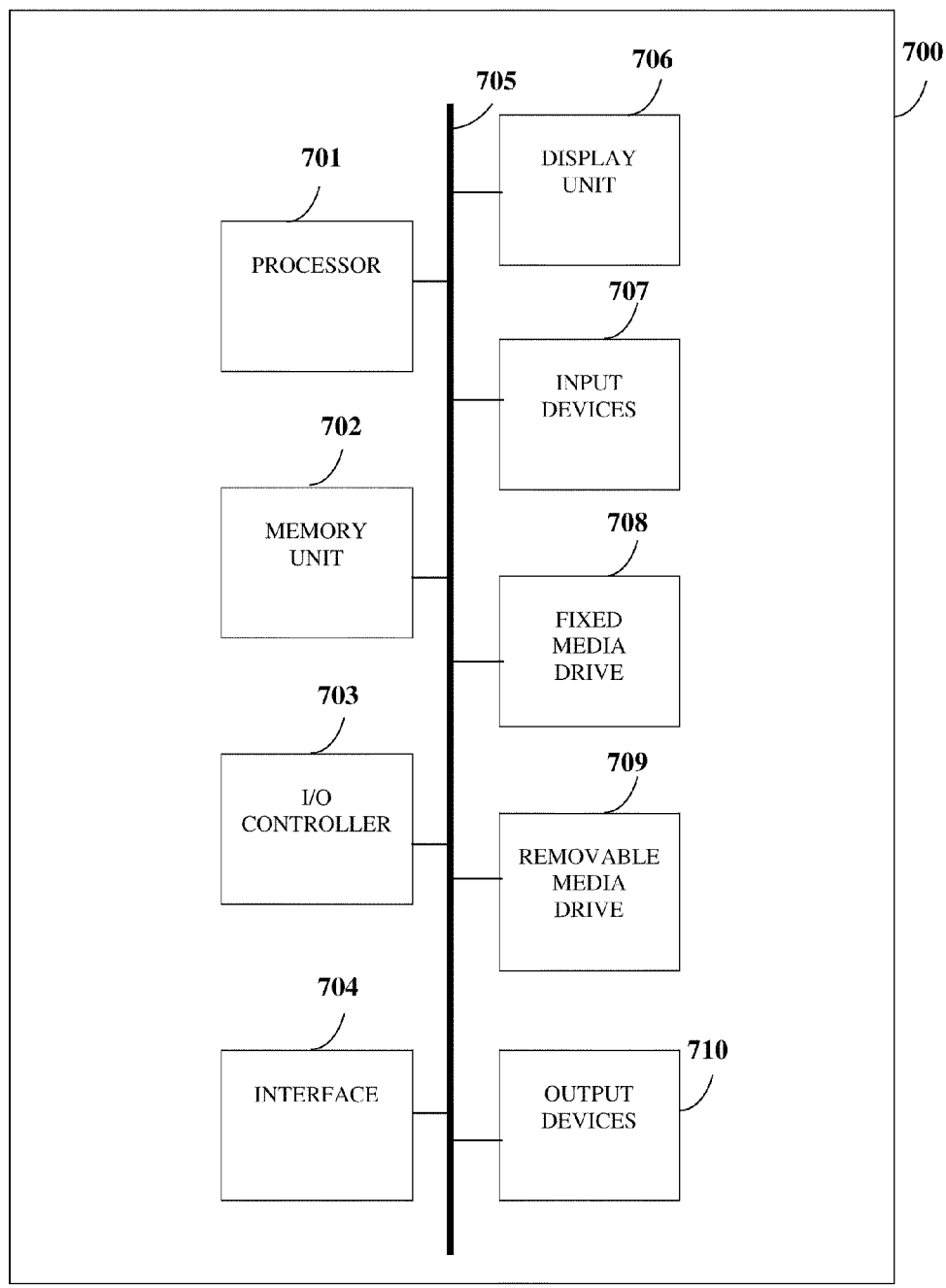
FIG. 7 exemplarily illustrates the architecture of a computer system employed on a client device and a server in a networked environment.
Figure 8A:
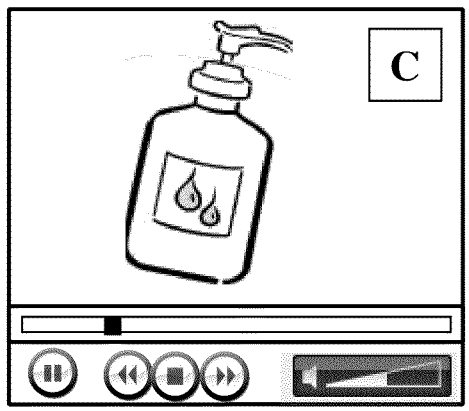
FIGS. 8A-8D exemplarily illustrate screenshots for a video advertisement campaign.
Figure 8B:
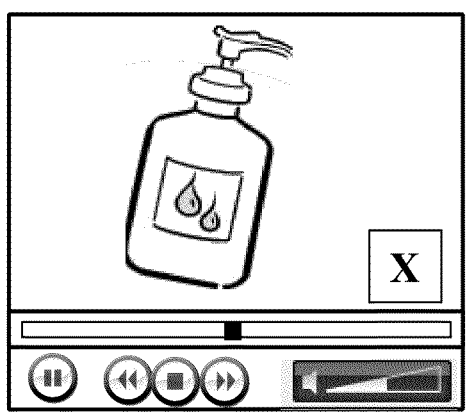
Figure 8C:
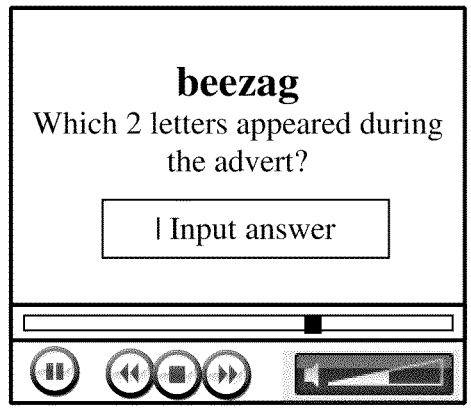
Figure 8D:
Figure 9A:
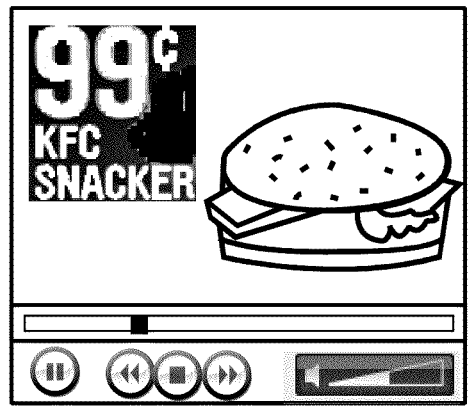
FIGS. 9A-9D exemplarily illustrate screenshots for a video advertisement campaign.
Figure 9B:
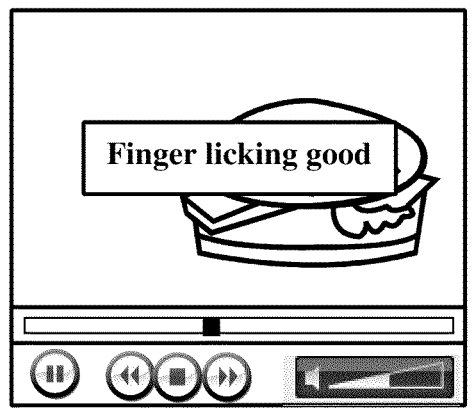
Figure 9C:
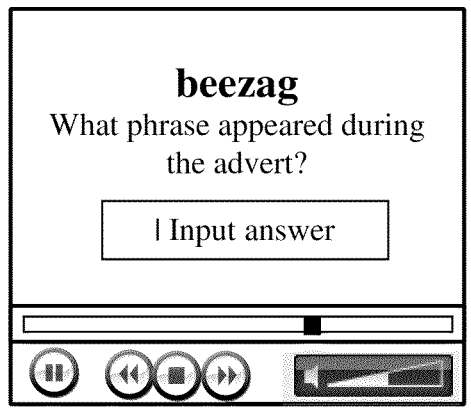
Figure 9D:
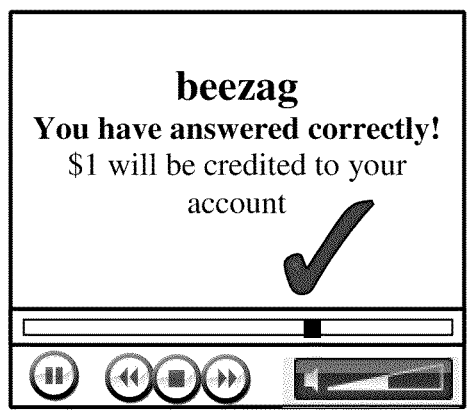
Figure 10A:
FIGS. 10A-10D exemplarily illustrate screenshots of a training video for managers.
Figure 10B:
Figure 10C:
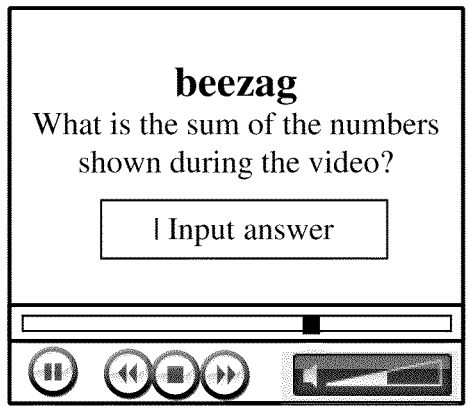
Figure 10D:
Figure 11A:
FIGS. 11A-11D exemplarily illustrate screenshots for an iPhone application and a coupon offer.
Figure 11B:
Figure 11C:
Figure 11D:
Figure 12A:
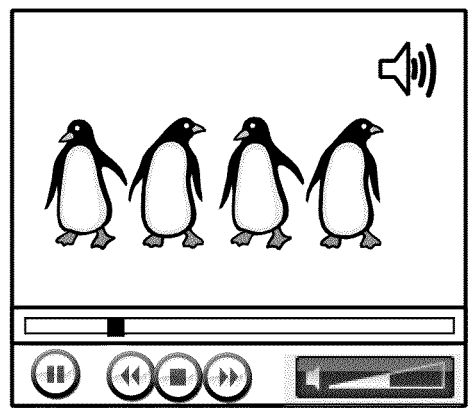
FIGS. 12A-12D exemplarily illustrate screenshots for a video advertisement campaign.
Figure 12B:
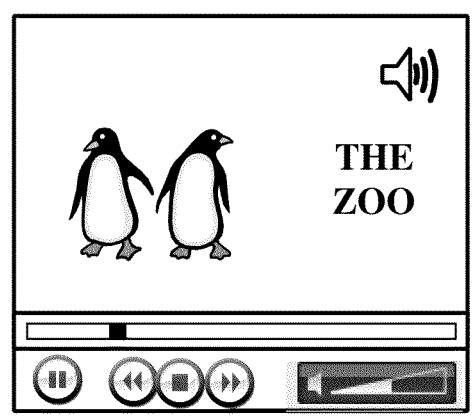
Figure 12C:
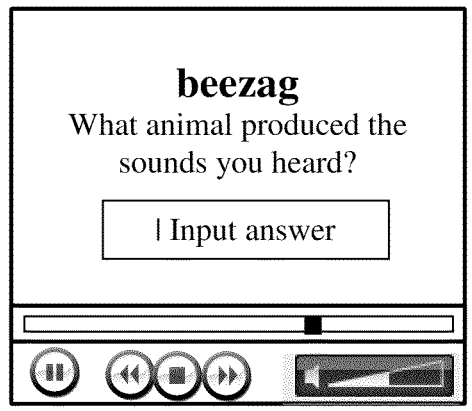
Figure 12D:
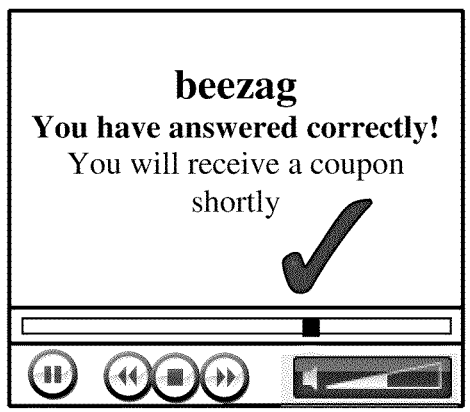

FIG. 7 exemplarily illustrates the architecture of a computer system 700 employed on the client device 601 and the server 602 in the networked environment. The computer system 700 executes the view confirmation module 601b. The computer system 700 comprises a processor 701, a memory unit 702 for storing programs and data, an input/output (I/O) controller 703, an interface 704, and a display unit 706 communicating via a data bus 705. The data bus 705 of the server 602 permits communication between the modules, for example, 601b, 602a, 602b, 602c, 602d, 602e, 602f, 602g, 602h, 602i, 602j and 602k of the server 602. The display unit 706 displays the list of multimedia content to the viewer on the client device 601. The data bus 705 of the client device 601 permits communication between the modules, for example, 601a, 601b, 601c, 601d, 601e, and 601f of the client device 601.

The memory unit 702 comprises a random access memory (RAM) and a read only memory (ROM). The computer system 700 further comprises one or more input devices 707, for example, a keyboard such as an alphanumeric keyboard, a mouse, a joystick, a touch-sensitive screen, a voice recognition system, etc. The input devices 707 are used for inputting data into the computer system 700. The I/O controller 703 controls the input and output actions performed by the viewer. The computer system 700 communicates with other computer systems through the interface 704, comprising, for example, a Bluetooth® interface, an infrared (IR) interface, a WiFi interface, a universal serial bus interface (USB), a local area network or wide area network (LAN or WAN) interface, etc.

The computer system 700 further comprises a fixed media drive 708 and a removable media drive 709 for receiving removable media. The computer system 700 further comprises output devices 710, for example, a printer for receiving and reading digital data on a compact disk, a digital video disk or other medium. Computer applications or programs are used for operating the computer system 700. The programs are loaded onto the fixed media drive 708 and into the memory unit 702 of the computer system 700 via the removable media drive 709. In an embodiment, the computer applications and programs may be loaded directly through the network 603. Applications are executed by double clicking a related icon or menu displayed on the display unit 706 using the input devices 707.

The computer system 700 of the client device 601 and the server 602 employ an operating system for performing multiple tasks. The operating system is responsible for the management and coordination of activities and the sharing of the resources of the computer system 700. The operating system further manages security of the computer system 700, peripheral devices connected to the computer system 700, and network connections. The operating system recognizes keyboard inputs and pointing device inputs of a viewer, output display, files and directories stored locally on the fixed media drive 708. Different programs, for example, web browser, electronic mail (email) application, etc. initiated by the viewer are executed by the operating system with the help of the processor 701, for example, a central processing unit (CPU). The operating system monitors the use of the processor 701. The operating system on the computer system 700 of the client device 601 and the server 602 executes different modules initiated by the client device 601 and the server 602 respectively using the processor 701. The location of the instructions in the program memory is determined by a program counter (PC).

The instructions fetched by the processor 701 from the program memory after being processed are decoded. After processing and decoding, the processor 701 executes the instructions. For example, the upload module 602a defines instructions for enabling the multimedia content owners to upload the multimedia content on the server 602. The aggregator 602h defines instructions for querying the database 602g and preparing a list of multimedia content available for distribution over the network 603. The referral management module 602d defines instructions for enabling the viewers to refer the multimedia content to other viewers in the networked environment for viewing and further referrals. The referral management module 602d defines instructions for enabling the viewers to post one or more referrals of the multimedia content on the server 602 and/or the social networking platforms for referring the multimedia content to other members of the created virtual community network and non-members of the created virtual community network. The referral management module 602d further defines instructions for generating a referral report comprising information on referrals of the multimedia content made by the viewers in the networked environment. Furthermore, the referral management module 602d defines instructions for controlling levels of referrals of the multimedia content. The content management module 602f defines instructions for controlling access to the referred multimedia content based on registration of the viewers with the server 602.

The view confirmation module 601b defines instructions for the challenge generator 601c, the challenge-response module 601d, and the report generation module 601e. The challenge generator 601c defines instructions for generating a random challenge that is one or more of random in content, presented at random times during and/or after the play of the selected multimedia content, and presented at random physical locations on the selected multimedia content. The random generator 602b defines instructions for generating the interrupt time period for interrupting the playing of the selected multimedia content and presenting the random challenge. The challenge-response module 601d defines instructions for presenting the generated random challenge to the viewers on the display screen 601a of each client device 601 by overlaying the generated random challenge on the multimedia content or inserting the generated random challenge on interruption of play of the multimedia content. The challenge-response module 601d further defines instructions for invoking a response from the viewers for the presented random challenge. Furthermore, the challenge-response module 601d defines instructions for determining whether the viewers enter the response for the presented random challenge to confirm that the viewers viewed the multimedia content. The report generation module 601e defines instructions for generating a response report for each of the viewers based on the response from the viewers. The report generation module 601e defines instructions for transmitting the response report to the server 602. The report receiving module 602i defines instructions for receiving the response report transmitted by the client device 601.

The payment module 602c defines instructions for compensating one or more of the viewers by crediting the viewers with one or more items of value based on the viewing and the referring of the multimedia content by the viewers. The payment module 602c further defines instructions for crediting the viewers with items of value based on referring of the multimedia content, accessing of the referred multimedia content, confirming viewing of the multimedia content, and registration into the created virtual community network.

The registration module 602j defines instructions for creating a viewer account for each of the viewers and for registering non-members into the created virtual community network. The registration module 602j further defines instructions for associating an electronic wallet (e-wallet) with the viewer account. The registration module 602j defines instructions for enabling the viewers to register each of the client device 601 of the viewers for periodically receiving reports on the multimedia content from the server 602. The tracking module 602e defines instructions for tracking viewing activities of the viewers for determining compensation and controlling the levels of referrals. The database 602g defines instructions for storing information on the viewers, response reports, referral reports, and the multimedia content.

The defined instructions are stored in the program memory or received from a remote server. The processor 701 of the server 602 retrieves instructions defined by the upload module 602a, the aggregator 602h, the random generator 602b, the view confirmation module 601b, the payment module 602c, the referral management module 602d, the tracking module 602e, the content management module 602f, the report receiving module 602i, the registration module 602j, and the database 602g, and executes the instructions. The processor 701 of the client device 601 retrieves instructions defined by the view confirmation module 601b and executes the instructions.

The instructions from the view confirmation module 601b are stored in the memory unit 702. The multimedia content is transferred from the database 602g to the view confirmation module 601b through the interface 704 and via the network 603. A viewer initiates the execution of the view confirmation module 601b by double clicking on the icon for the view confirmation module 601b on the display unit 706 or the execution of the view confirmation module 601b is automatically initiated on transmitting multimedia content to the client device 601. The processor 701 retrieves instructions for executing the view confirmation module 601b from various modules, for example, the challenge generator 601c, the challenge-response module 601d, and the report generation module 601e in the view confirmation module 601b. The locations of the instructions in the modules 601c, 601d, and 601e are determined by a program counter (PC). The program counter stores a number that identifies the current position in the program of the view confirmation module 601b. The instructions fetched by the processor 701 from the program memory after being processed are decoded. The instructions are placed in an instruction register (IR) in the processor 701. After processing and decoding, the processor 701 executes the instructions. The instructions comprise, for example, rendering the multimedia content selected by the viewer, presenting a random challenge by overlaying the random challenge on the multimedia content, generating a response report for the viewer, etc. At the time of execution, the instructions stored in the instruction register are examined to determine the operations to be performed. The specified operation is then performed by the processor 701. The operations include arithmetic and logic operations.

The operating system performs multiple routines for performing a number of tasks required to assign input devices 707, output devices 710, and memory for execution of the view confirmation module 601b. The tasks performed by the operating system comprise assigning memory to the view confirmation module 601b and data, moving data between memory and disk units and handling input/output operations. The operating system performs the tasks on request by the operations and after performing the tasks, the operating system transfers the execution control back to the processor 701. The processor 701 continues the execution to obtain one or more outputs. The outputs of the execution of the view confirmation module 601b are displayed to the viewer on the display unit 706.

For purposes of illustration, the detailed description refers to the server 602 being run locally on a computer system 700; however the scope of the computer implemented method and system 600 disclosed herein is not limited to the server 602 being run locally on a computer system 700 via the operating system and the processor 701 but may be extended to run remotely over the network 603 by employing a web browser and a remote server, a mobile phone, or other electronic devices.

A server setup as illustrated in FIG. 6 comprises a database 602g for storing multimedia content of commercial, educational, and entertaining in nature. For example, multimedia content such as advertisement media clips are obtained in suitable formats from advertisement agencies or media representatives of product and service companies, and uploaded to the database 602g. In another example, the advertisement agencies or the media representatives undertaking extensive campaigning may add new advertisement media clips, and update or modify existing advertisement media clips by accessing the database 602g. The aggregator 602h recognizes changes made to the contents of the database 602g, including metadata changes, for example, changes in the duration of the advertisement media clips, the names of the advertisement media clips, etc., and prepares and updates the list of multimedia content.

The server 602 may allow controlled access to the server 602 and the resources therein, such as the database 602g, through a web front-end. An example of such a web front-end is a website, for example, http://www.beezag.com. The advertisement agencies or the media representatives are required to setup an account for themselves by registering as an approved advertiser through the web front-end before submitting their advertisement clips. The approval workflow for registering advertiser accounts and uploading advertisement clips may be assigned to process owners or administrators on a regional basis. Furthermore, the approval workflow may include different stages of approval such as account-level approval, financial approval, and publishing approval. After the advertiser registers an account, the advertiser may upload advertisement clips and other multimedia content into the database 602g for distribution to targeted viewers. The advertiser may be charged designated amounts for each confirmed view and non-confirmed view response report received by the server 602.

The advertisement multimedia clips comprise, for example, audio clips, video clips, animations, still images, text attachments, or suitable combinations of these. The advertisement clips also comprise promotional segments such as universal resource locators (URLs) directing viewers to the web front-end or other proprietary websites of the product and service companies. The promotional segments may also comprise digital coupons or vouchers redeemable for special discounts on advertised products and services, questionnaires for sharing additional information, etc. The coupons and vouchers may also be distributed to targeted viewers via SMS messages.

In an embodiment, the viewer is prompted to share the viewed multimedia content, such as advertisement clips through the view confirmation module 601b on the client device 601 or the server 602. The viewers may share the advertisement clips by syndicating or micro-blogging the advertisement clips on social networking websites such as Twitter™ of Twitter, Inc., Facebook® of Facebook, Inc., Myspace™, etc., or by forwarding the advertising clips through email services and SMS.

Enumerated herein are examples of the computer implemented method and system 600 disclosed herein, categorized by the challenge content and the invoked response. In an example, the challenge content and the invoked response comprise visual and mentally-solvable challenge-responses. Consider an example where the company Pfizer Inc. creates a video advertisement for Purell® hand sanitizer targeted for mothers of children between the ages of 5 to 21. A video advertisement campaign is created and uploaded into the database 602g using the upload module 602a, via the web front-end of the media service provider, for delivery to the target demographic membership selected in the web front-end. FIGS. 8A-8D exemplarily illustrate screenshots for a video advertisement campaign for the hand sanitizer. An alphanumeric-based challenge comprising random letters is presented to the viewer during the play of the video advertisement. A first letter "C" occurs at 10 seconds into the video advertisement and is placed at the top right corner of the display screen 601a as exemplarily illustrated in FIG. 8A. A second letter "X" occurs 5 seconds before the end of the video advertisement and is placed at the bottom right corner of the display screen 601a as exemplarily illustrated in FIG. 8B. When the video advertisement ends, the viewer is presented with a question, for example, "Which two letters appeared during the advert?" as exemplarily illustrated in FIG. 8C. If the viewer answers the question correctly, viewing of the video advertisement by the viewer is confirmed. The view confirmation module 601b sends a message, for example, "You have answered correctly!" as exemplarily illustrated in FIG. 8D and instructs the payment module 602c to credit an item of value, for example, $1, to the viewer's account or the viewer's e-wallet. The view confirmation module 601b enables control of random challenge variables, for example, the number of alphanumeric characters presented during the advertisement play, the timing of the appearance and disappearance of the alphanumeric characters, a threshold accuracy of the viewer's response to the challenge to register a positive response, the time-out period for the response, etc.

In another example, Kentucky Fried Chicken (KFC®) Corporation creates a video advertisement for their new chicken snacker targeted for men and women between the ages 18 to 55 in northeast United States. A video advertisement campaign is created and uploaded into the web front-end for delivery to the target demographics. FIGS. 9A-9D exemplarily illustrate screenshots for a video advertisement campaign for KFC's chicken snacker. A keywords and phrases based challenge comprising a random word or phrase is presented to the viewer during the play of the video advertisement. During the play of the video advertisement as exemplarily illustrated in FIG. 9A, the phrase "Finger Licking Good!" is presented in a child window as exemplarily illustrated in FIG. 9B. When the video advertisement ends, the viewer is presented with a question about the words or phrases presented during the video advertisement as exemplarily illustrated in FIG. 9C. If the viewer answers the question correctly, the viewer confirms viewing of the video advertisement as exemplarily illustrated in FIG. 9D. The view confirmation module 601b instructs the payment module 602c to credit an item of value, for example, $1, to the viewer's account or the viewer's e-wallet on confirming that the viewer viewed the video advertisement. Among the random challenge variables, a variable in this example is the description of the keywords and phrases in a predefined set for random selection. The phrases in the predefined set comprise, for example, "Think KFC", "Finger Licking Good", "We do chicken right", "There's Fast Food, Then There's KFC", etc.

In another example, a human resource consultancy creates a sexual harassment training video for managers of employees in the state of California. The video is delivered online in discreet video chapters. FIGS. 10A-10D exemplarily illustrate screenshots of a training video for managers. A mathematical equation based challenge is selected by the consultancy, comprising a random equation, for example, 3+4=?, or random numbers such as "6" and "2" as exemplarily illustrated in FIGS. 10A-10B. This mathematical equation based challenge is presented to the viewer during the video chapter. When the video chapter ends, the viewer is presented with an opportunity to submit a solution to the mathematical equation, such as, "What is the sum of the numbers shown during the video?" as exemplarily illustrated in FIG. 10C. If the viewer answers the question correctly, the viewer confirms viewing of the video chapter as exemplarily illustrated in FIG. 10D. The view confirmation module 601b instructs the payment module 602c to credit an item of value, for example, $1, to the viewer's account or the viewer's e-wallet on confirming that the viewer viewed the video advertisement. Among the random challenge variables, a variable in this example is the degree of difficulty of the random equations depending on the operators in the equation.

In another example category, the challenge content and the invoked response comprise visual and motor based challenge-responses. Johnson & Son, Inc. creates an IPhone® application and a coupon offer for Off!® Insect Repellants targeted for IPhone® users herein referred to as "viewers". FIGS. 11A-11D exemplarily illustrate screenshots for an IPhone® application and a coupon offer. The IPhone® application randomly overlays and removes images of mosquitoes and other bugs during the play of a video advertisement, as exemplarily illustrated in FIG. 11B-11C, and requests the viewer to, for example, "Squash all the insects while viewing the advertisement" as exemplarily illustrated in FIG. 11A. In responding to the challenge in real time, the viewer touches the iPhone screen for simulating squashing of the random bugs that appear during the video. When the video ends, the viewer is presented with a score reflecting the viewer's performance. If the score is sufficient, the viewer is presented with a digital coupon as exemplarily illustrated in FIG. 11D. If the score is insufficient, the viewer has the opportunity to replay. The random challenge variables, for example, the number of bug images presented during the video play, the timing of the appearance and disappearance of the bug images, a threshold score for earning a coupon, etc., is implemented in the iPhone application.

In another example, Johnson & Son, Inc. creates a web-based gaming application and a coupon offer for "Off! Insect Repellants" targeted for males and females of ages 18 to 55 and above in the southeast of the United States. The web-based gaming application randomly overlays and removes images of mosquitoes and other bugs during the play of a video. In responding to the challenge in real time, the viewer right-clicks over as many bug images as possible on a computer monitor screen, for simulating squashing of the random bugs, before the video ends. When the video ends, the viewer is presented with a score reflecting the viewer's performance. If the score is sufficient, the viewer is presented with a digital coupon to print or forward to a mobile client device. If the score is insufficient, the viewer has the opportunity to replay.

In another example, the challenge content and the invoked response comprise audio based challenge-responses. For example, the San Diego zoo creates a video advertisement for the summer season targeting mothers in southern California. A video advertisement campaign is created and uploaded into the web front-end for delivery to the target demographics. FIGS. 12A-12D exemplarily illustrate screenshots for a video advertisement campaign. A hear and type challenge is presented to the viewer with a question about the audio elements randomly inserted and overlaid onto the audio content of the video advertisement as exemplarily illustrated in FIGS. 12A-12B. The random audio elements comprise, for example, animal sounds, bird sounds, etc. The question is, for example, "What animal produced the sounds you heard?" as exemplarily illustrated in FIG. 12C. If the viewer answers the question correctly, the viewer confirms viewing of the video advertisement as exemplarily illustrated in FIG. 12D and provides the viewer with a coupon. Among the random challenge variables, a variable in this example is the type of audio elements in the predefined set for random selection and overlaying.

In another example, the San Diego zoo creates a mobile phone based marketing campaign for the summer season targeted at mothers in southern California. The marketing campaign involves a chance to win a 10% discount on adult entry ticket prices. The mobile phone based marketing campaign is created for delivery to the target demographics, and a hear and speak challenge-response is selected by the advertiser. A mobile phone user is notified of the marketing campaign through print advertisements or USSD broadcast messages directing the mobile phone user to call a phone number, listen to the summer events at the zoo, and win a 10% discount on the entry ticket price. When the mobile phone user calls, the mobile phone user is greeted with a recorded voice that lists the upcoming zoo events and attractions. The recorded voice is randomly interrupted, for example, by the sounds of animals and birds, etc. At the end of the call, the recorded voice presents the mobile phone user with a question about the audio elements randomly inserted and overlaid onto the recorded voice. The mobile phone user is then prompted to answer with a voice prompt, for example, "Speak your answer at the tone". The speech or voice recognition software in the mobile phone or the server 602 processes the speech utterance representing the answer from the mobile phone user. If the mobile phone user answers the question correctly, the mobile phone user confirms that the mobile phone user has listened to the voice recording, and obtains a coupon by, for example, an SMS message. Among the random challenge variables, a variable in this example is the accuracy in recognizing the speech utterance that qualifies the mobile phone user to type in the answer using a keypad for a positive response.

Figure 14A:
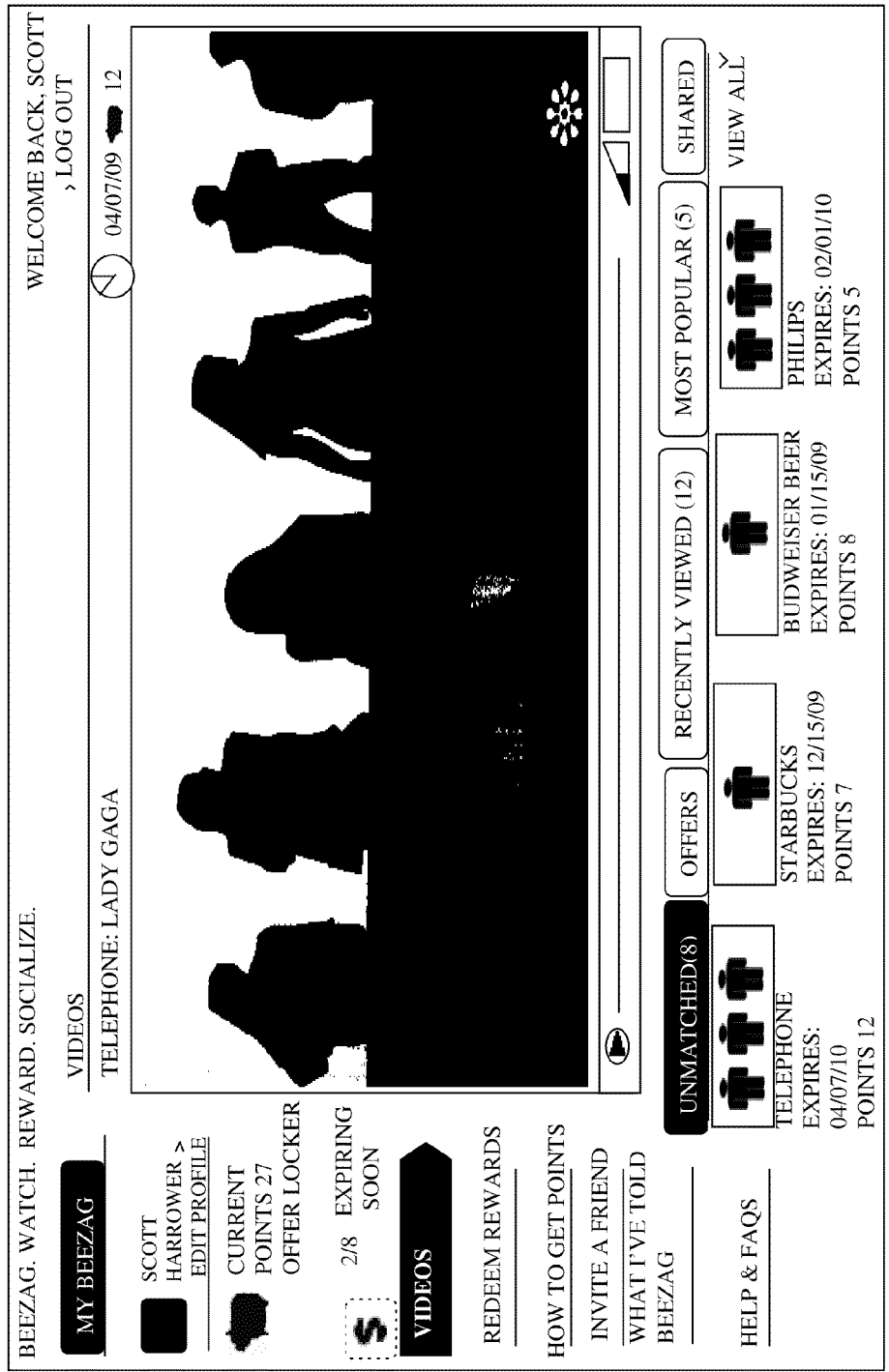
FIGS. 14A-14W exemplarily illustrate screenshots for creating a virtual community network for incentivized viewing of multimedia content.
Figure 14B:
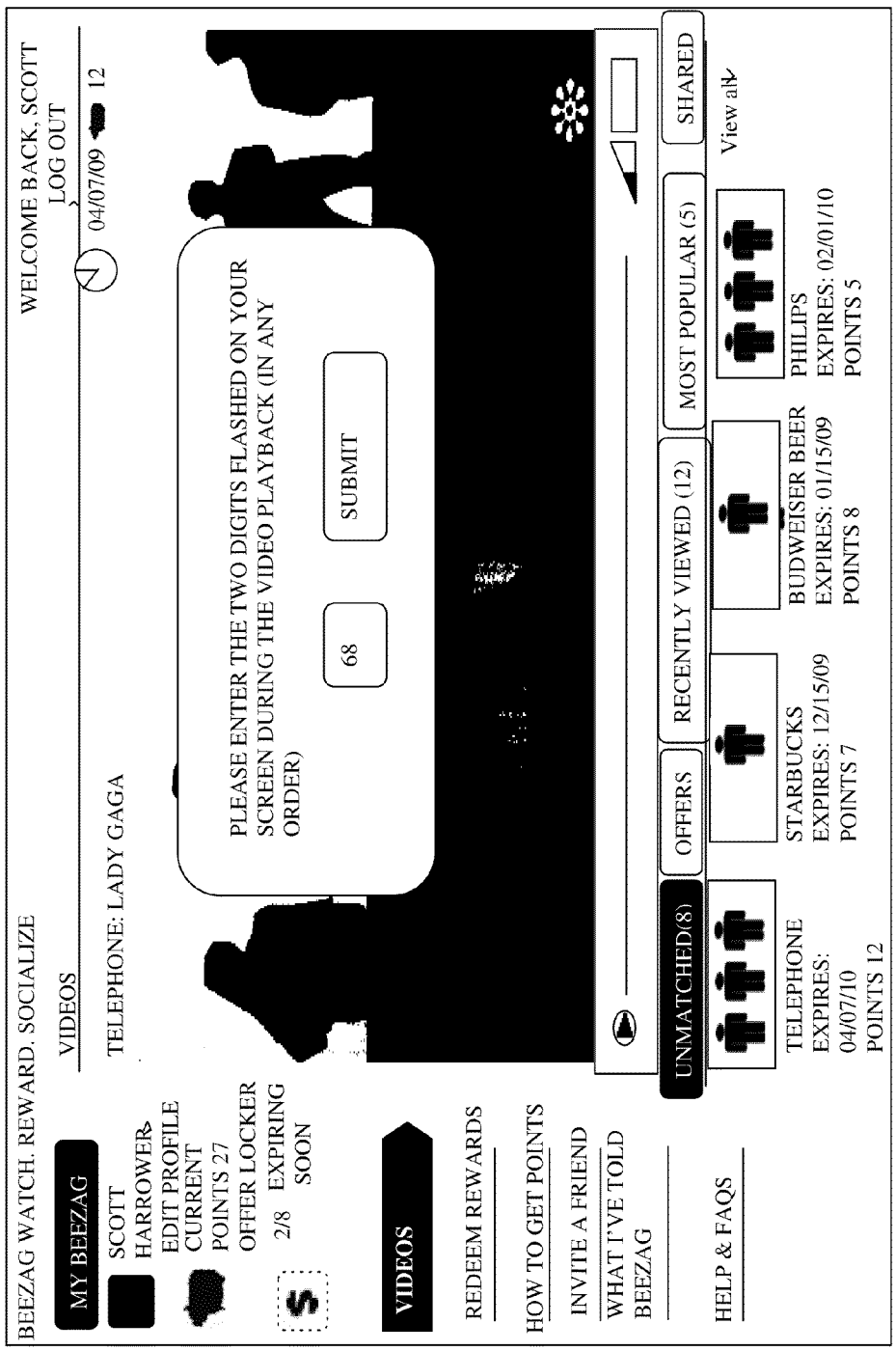
Figure 14C:
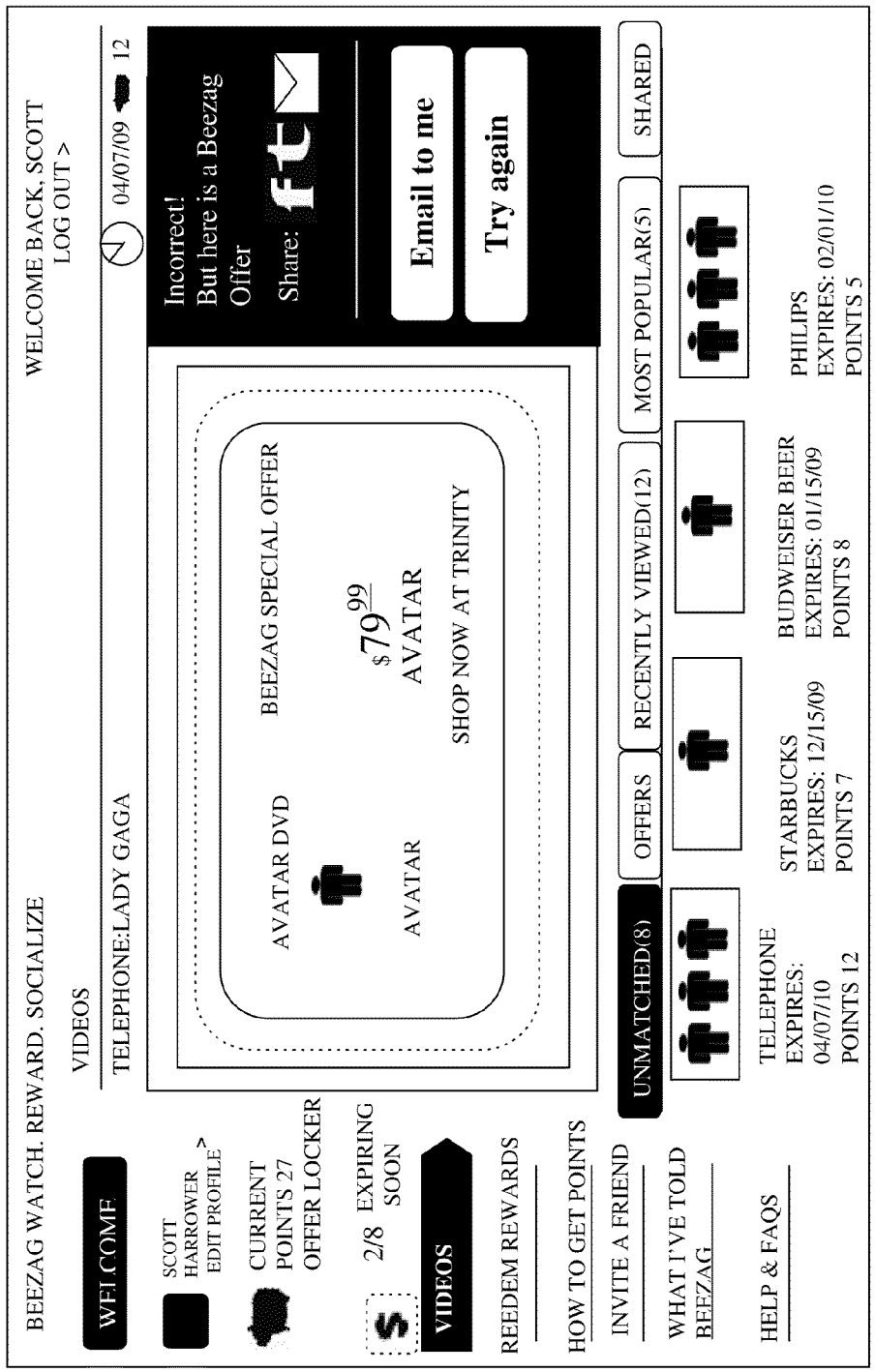
Figure 14D:
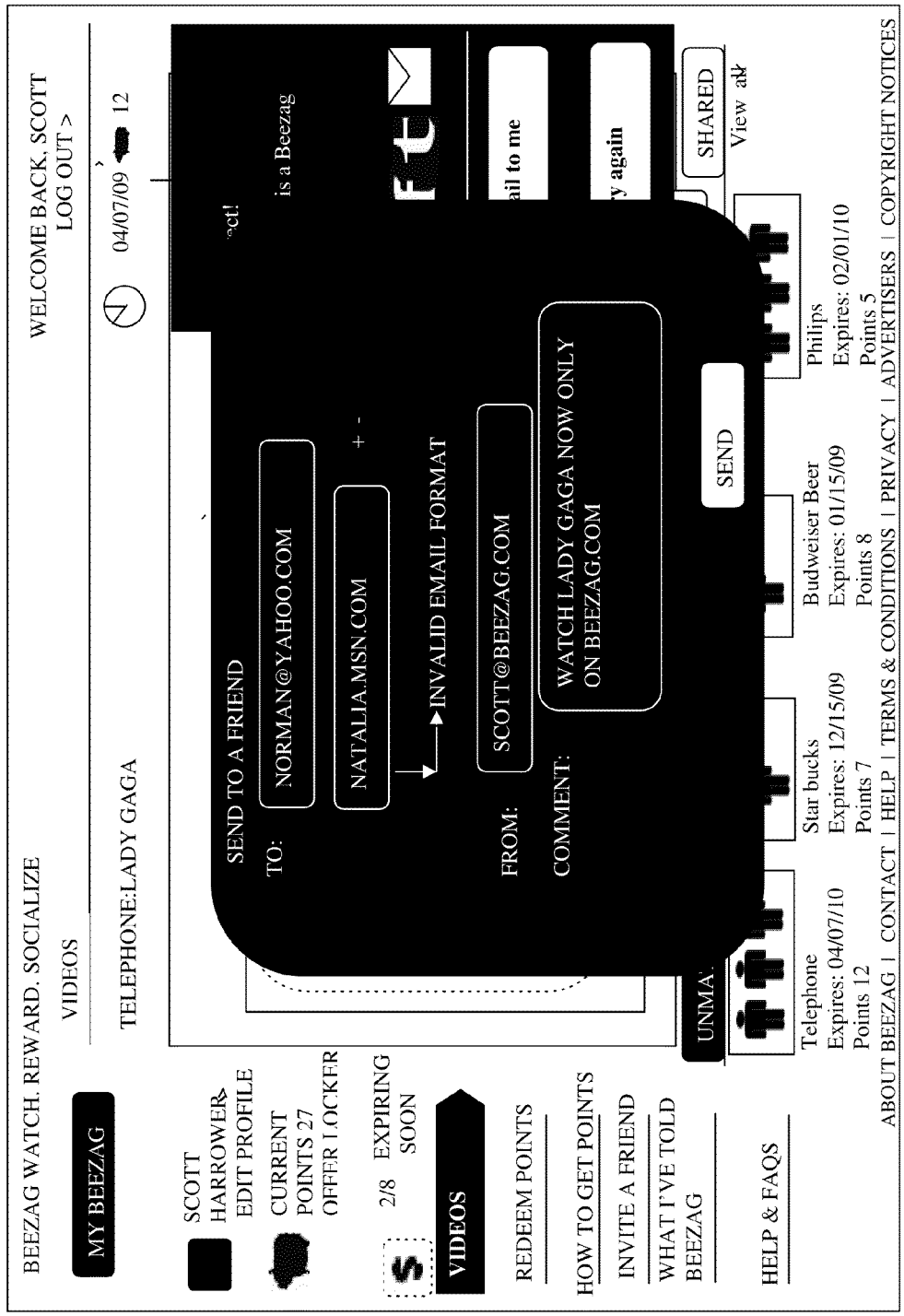
Figure 14E:
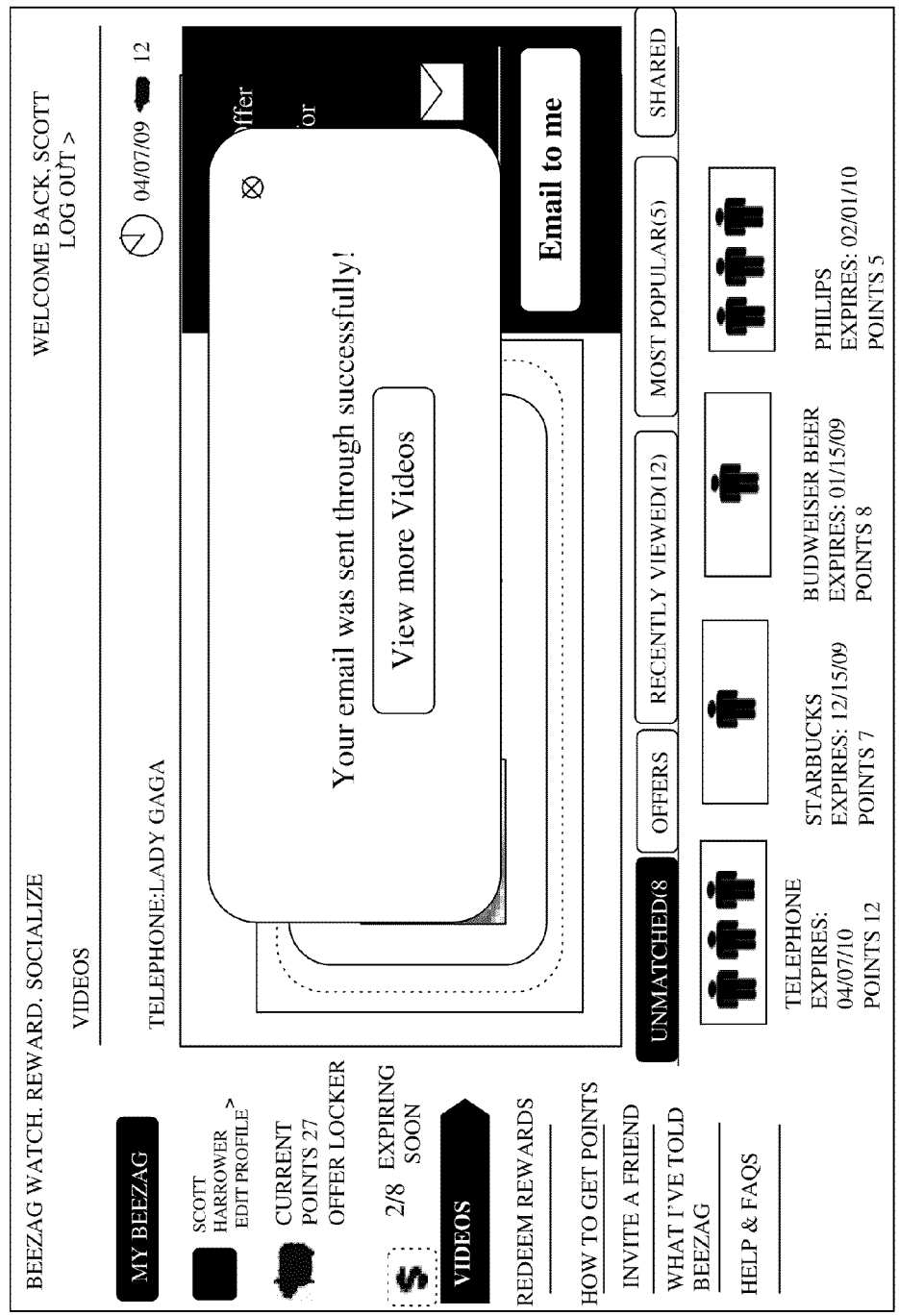
Figure 14F:
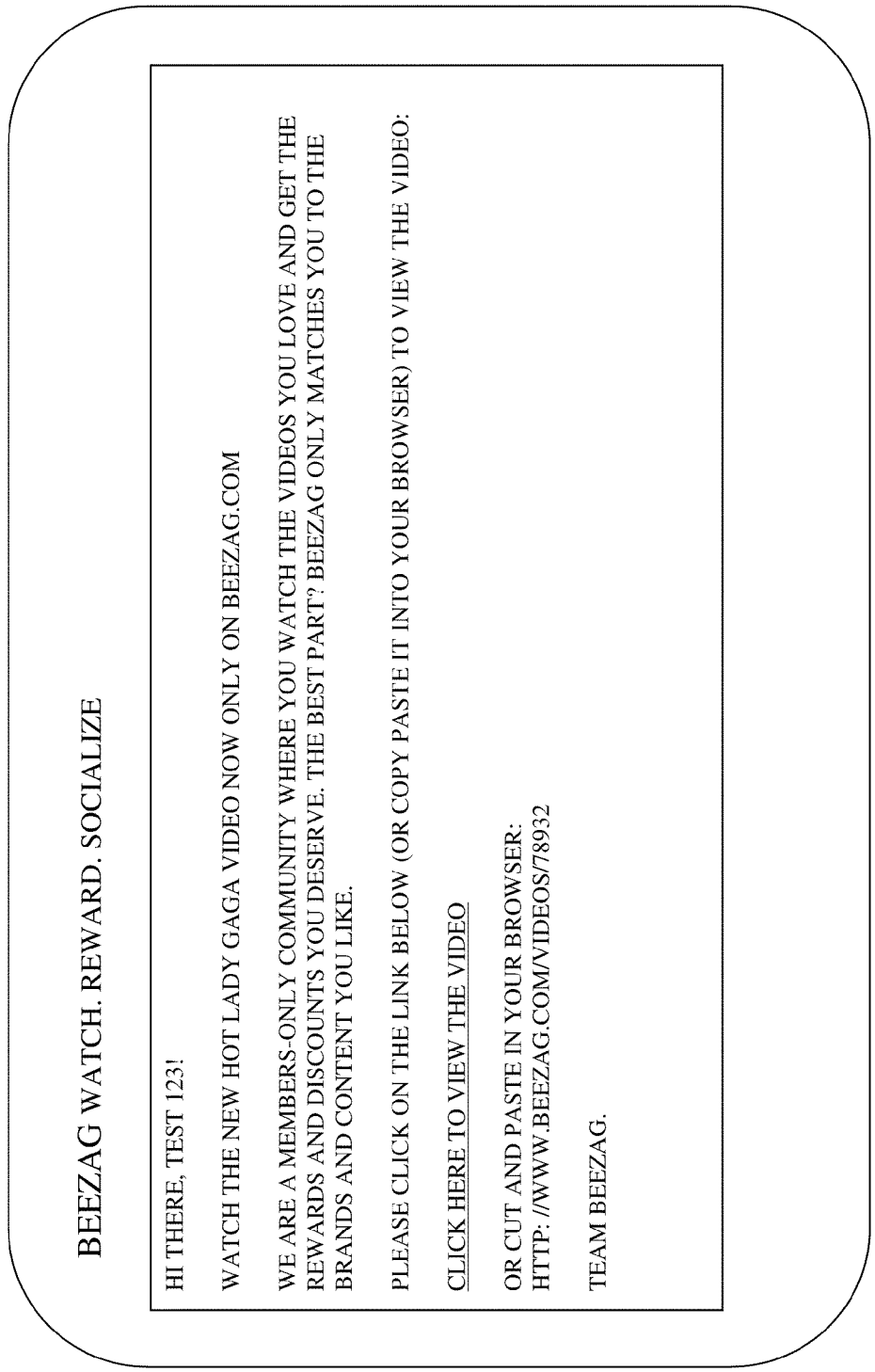
Figure 14G:
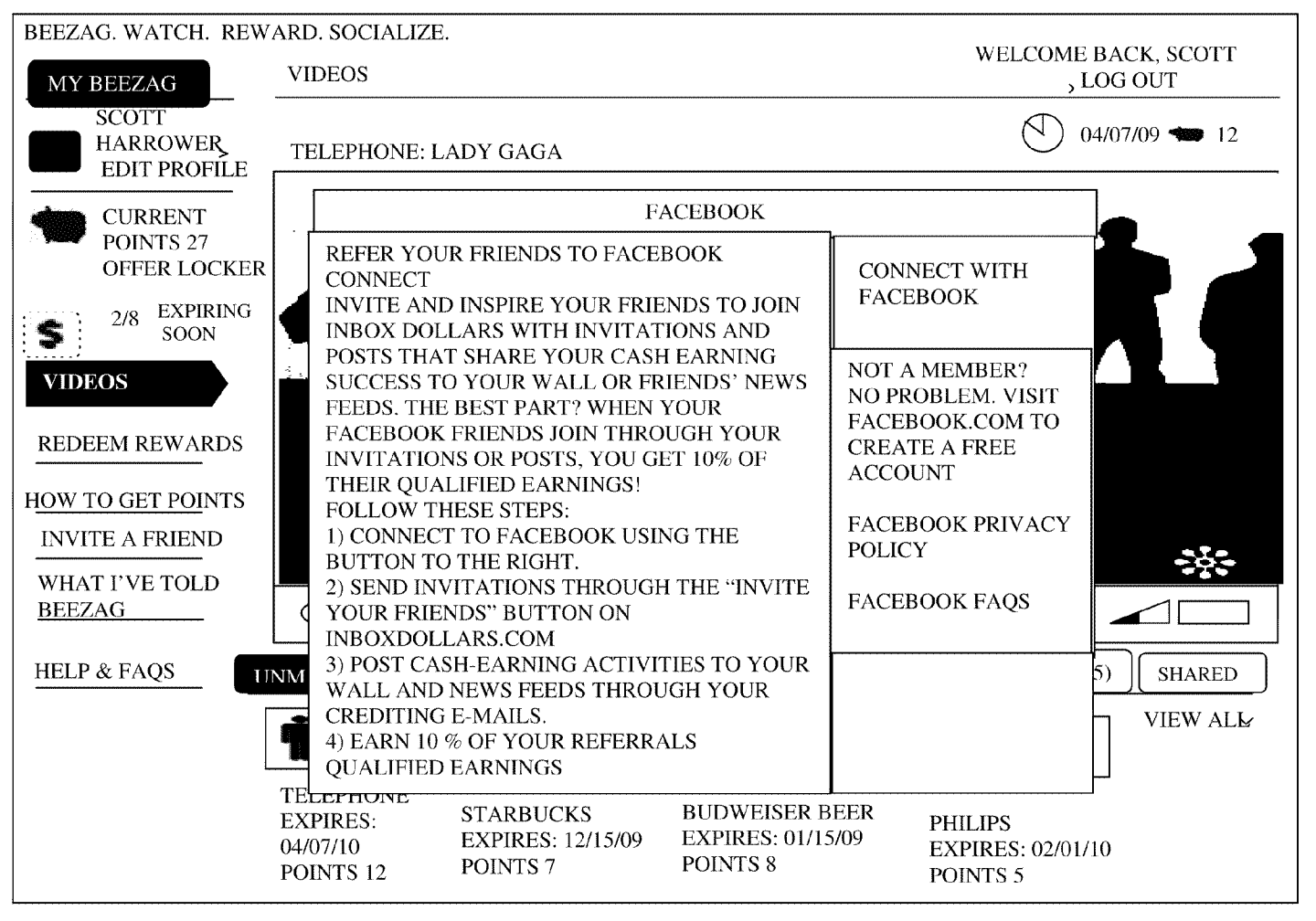
Figure 14H:
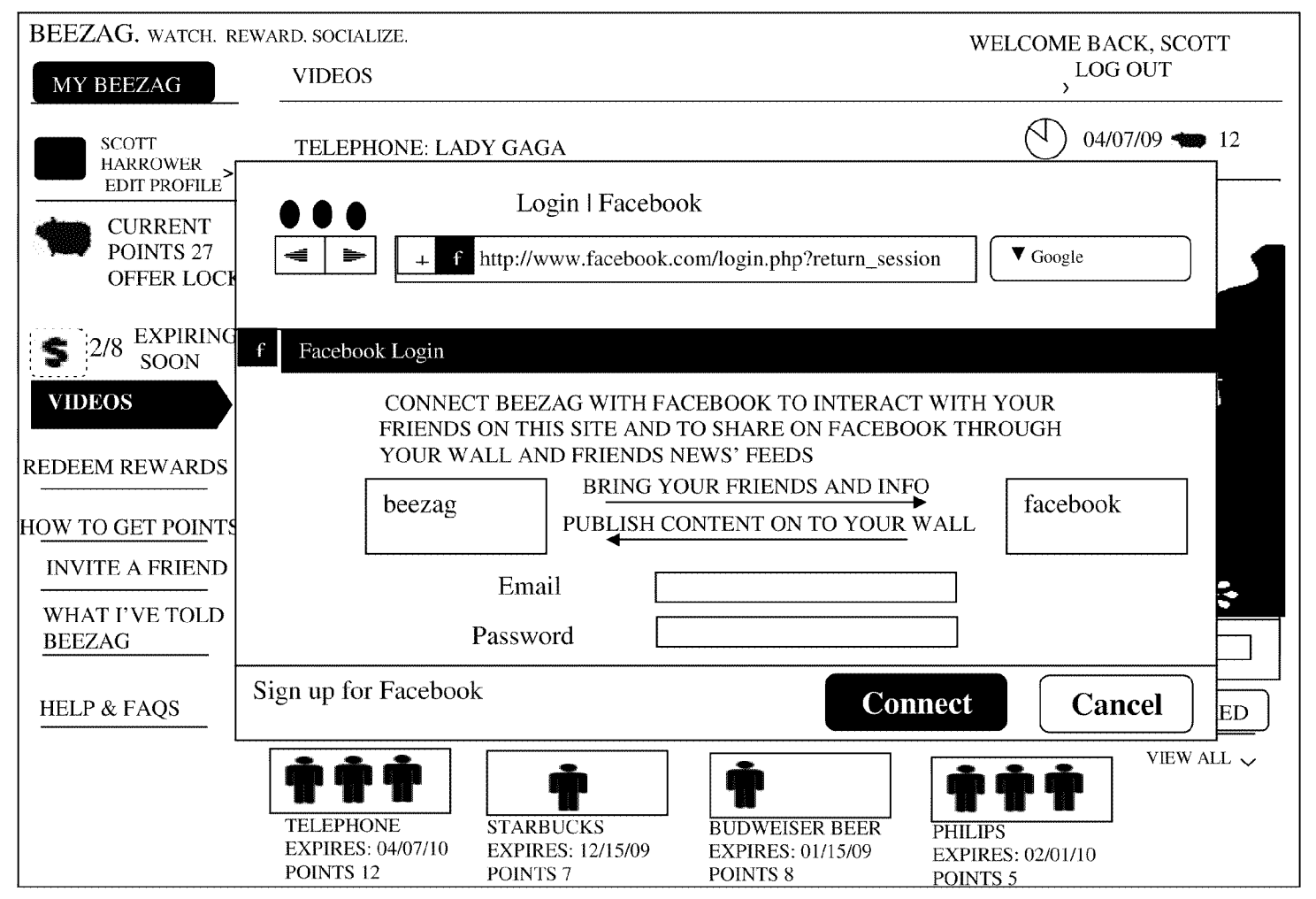
Figure 14J:
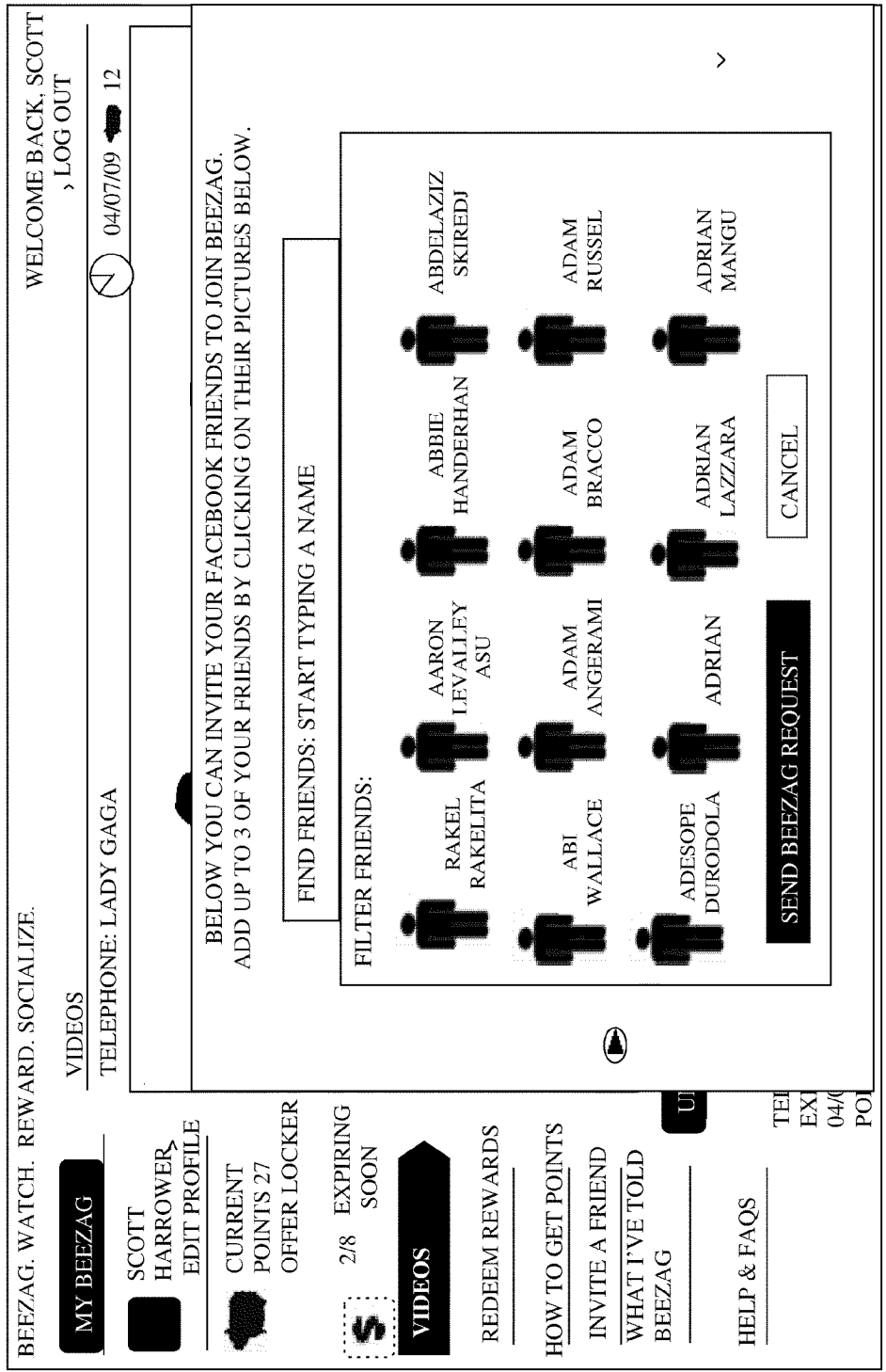
Figure 14K:
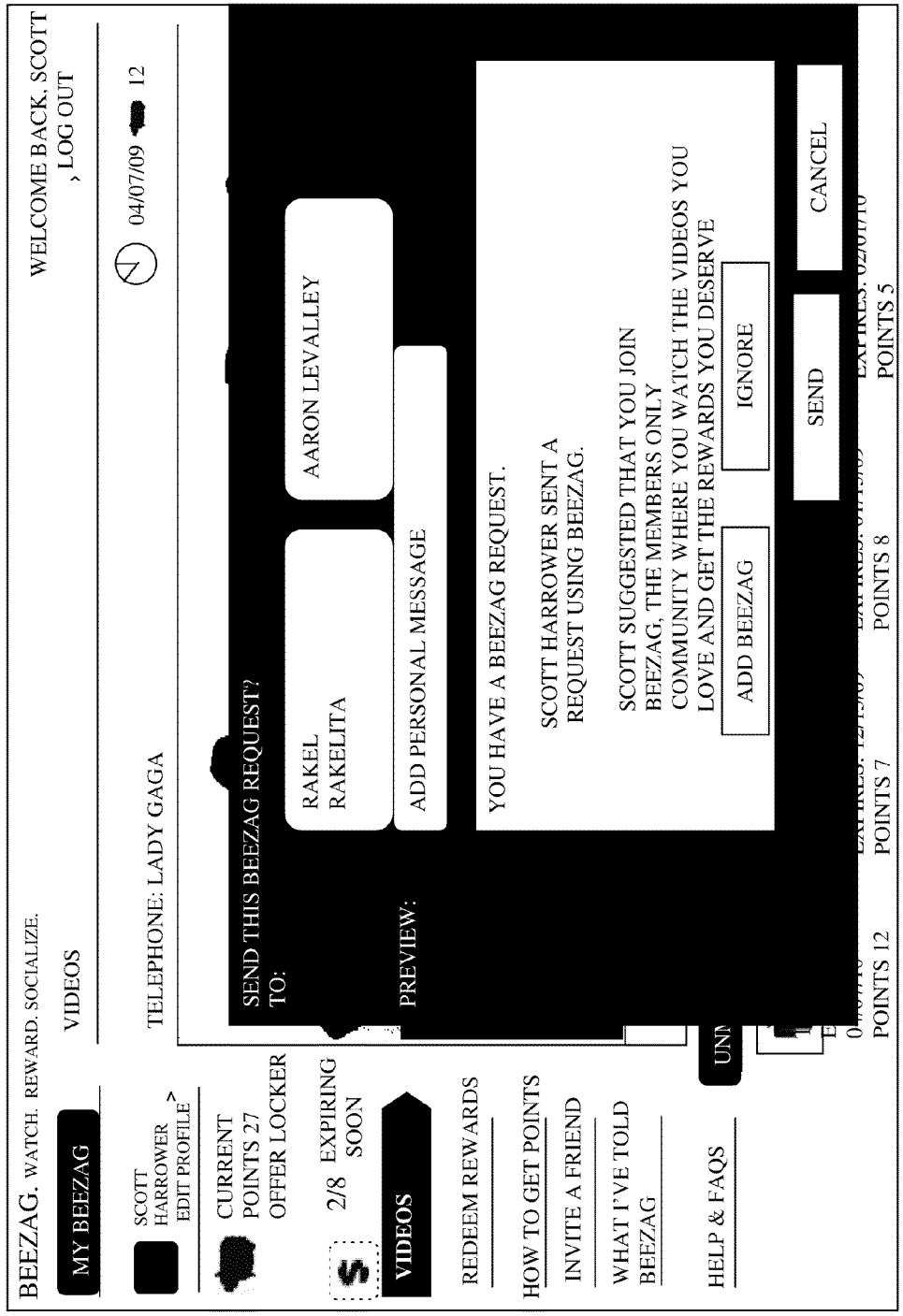
Figure 14L:
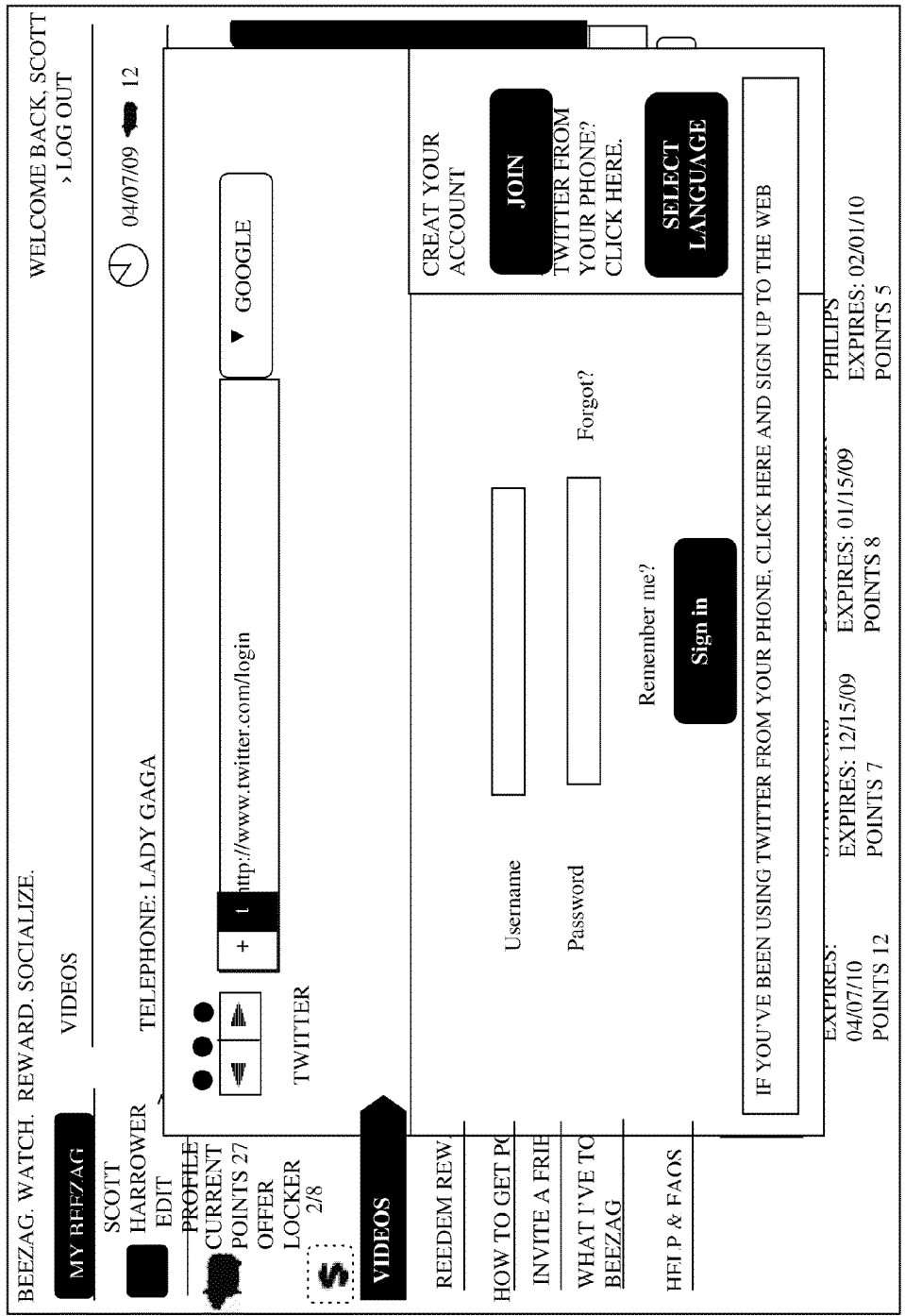
Figure 14N:
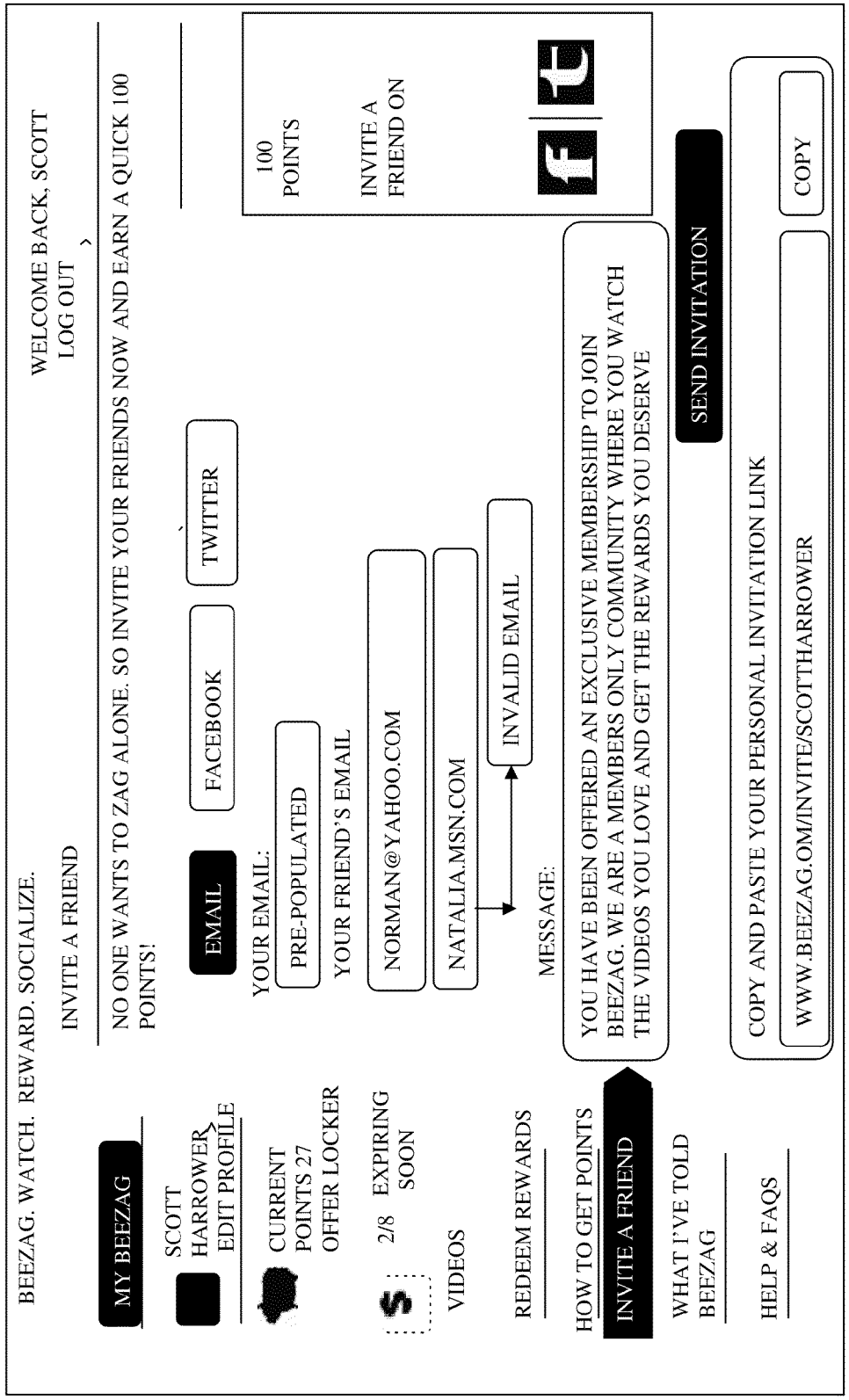
Figure 14O:
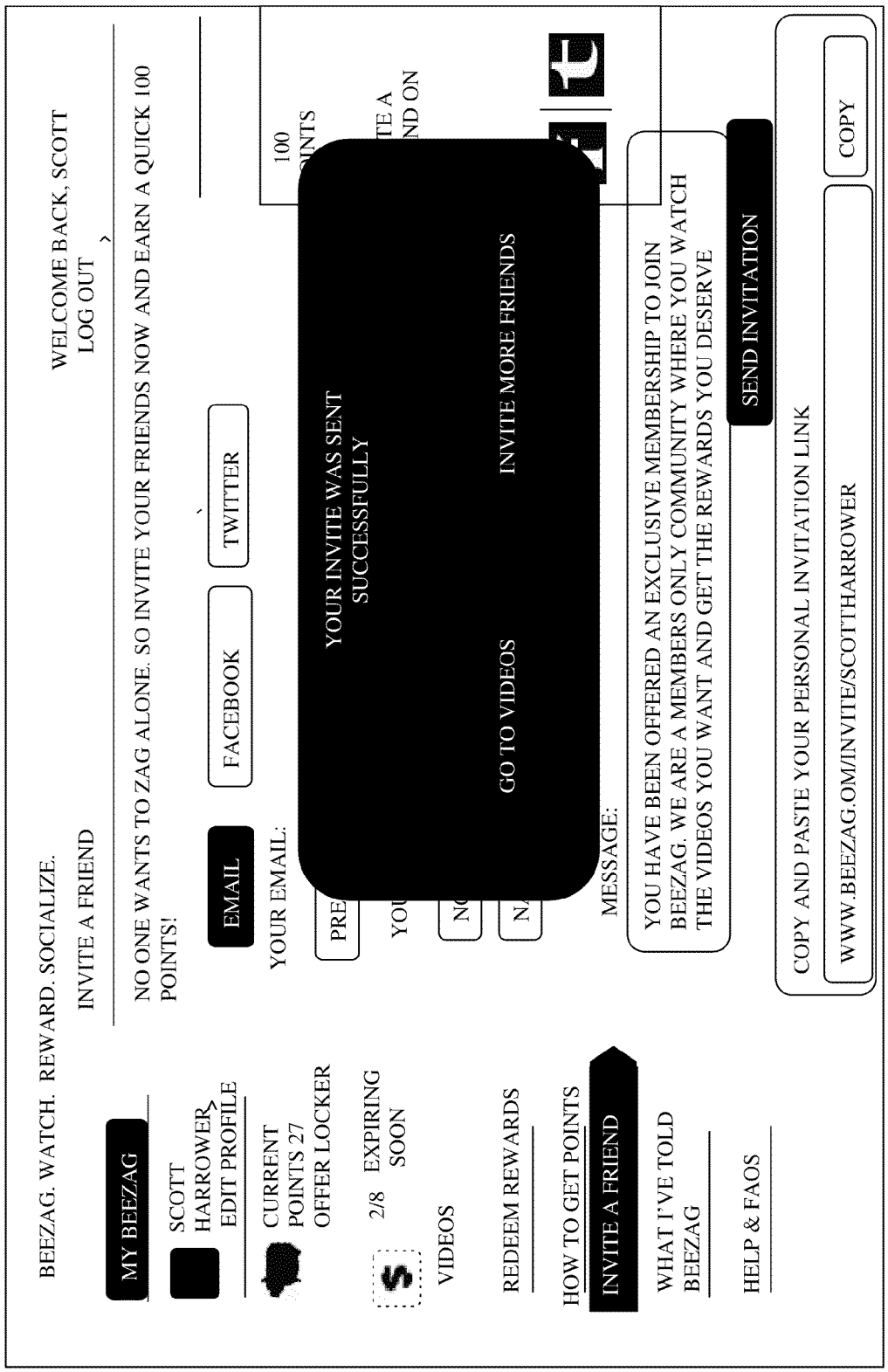
Figure 14P:
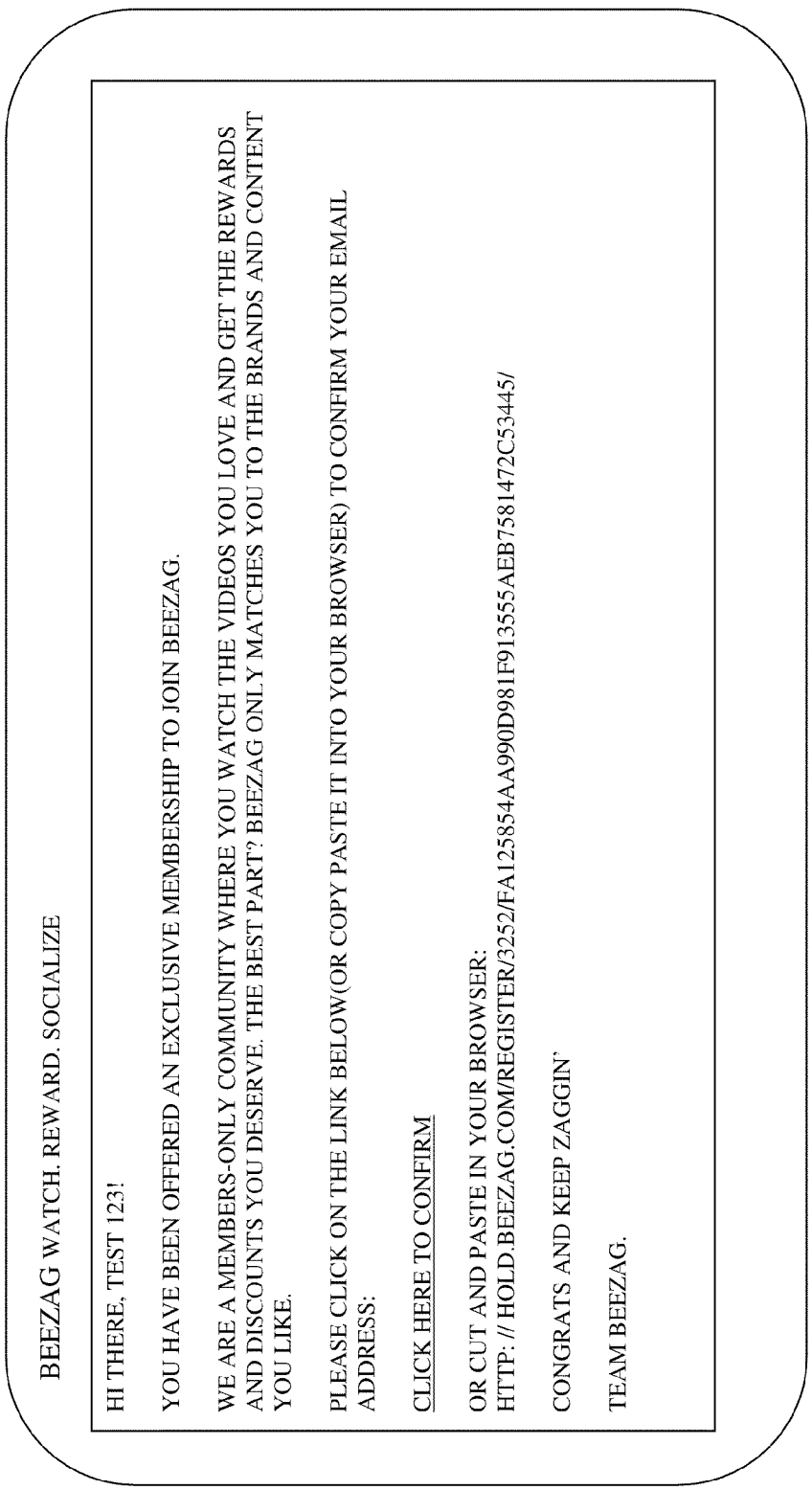
Figure 14Q:
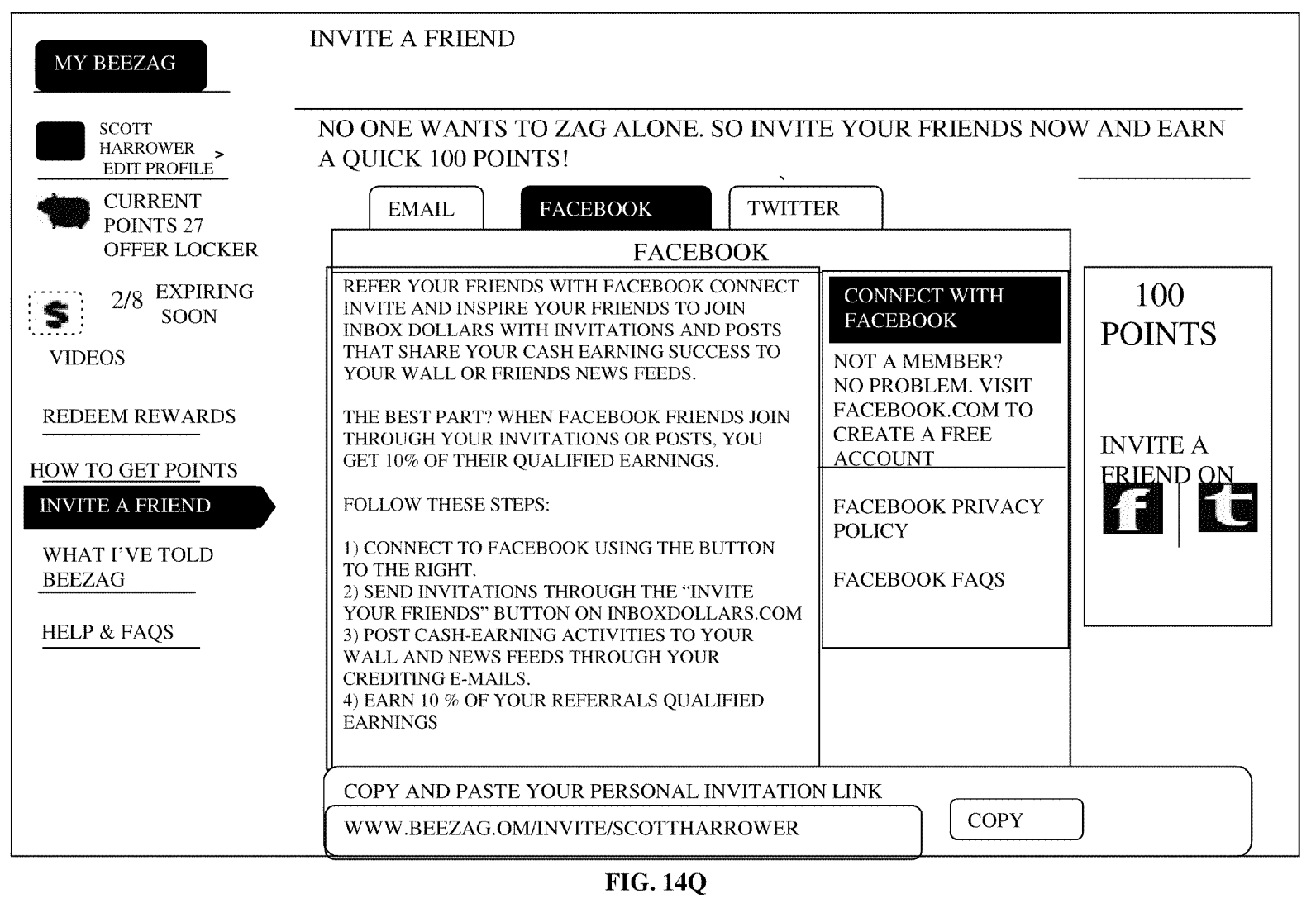
Figure 14R:
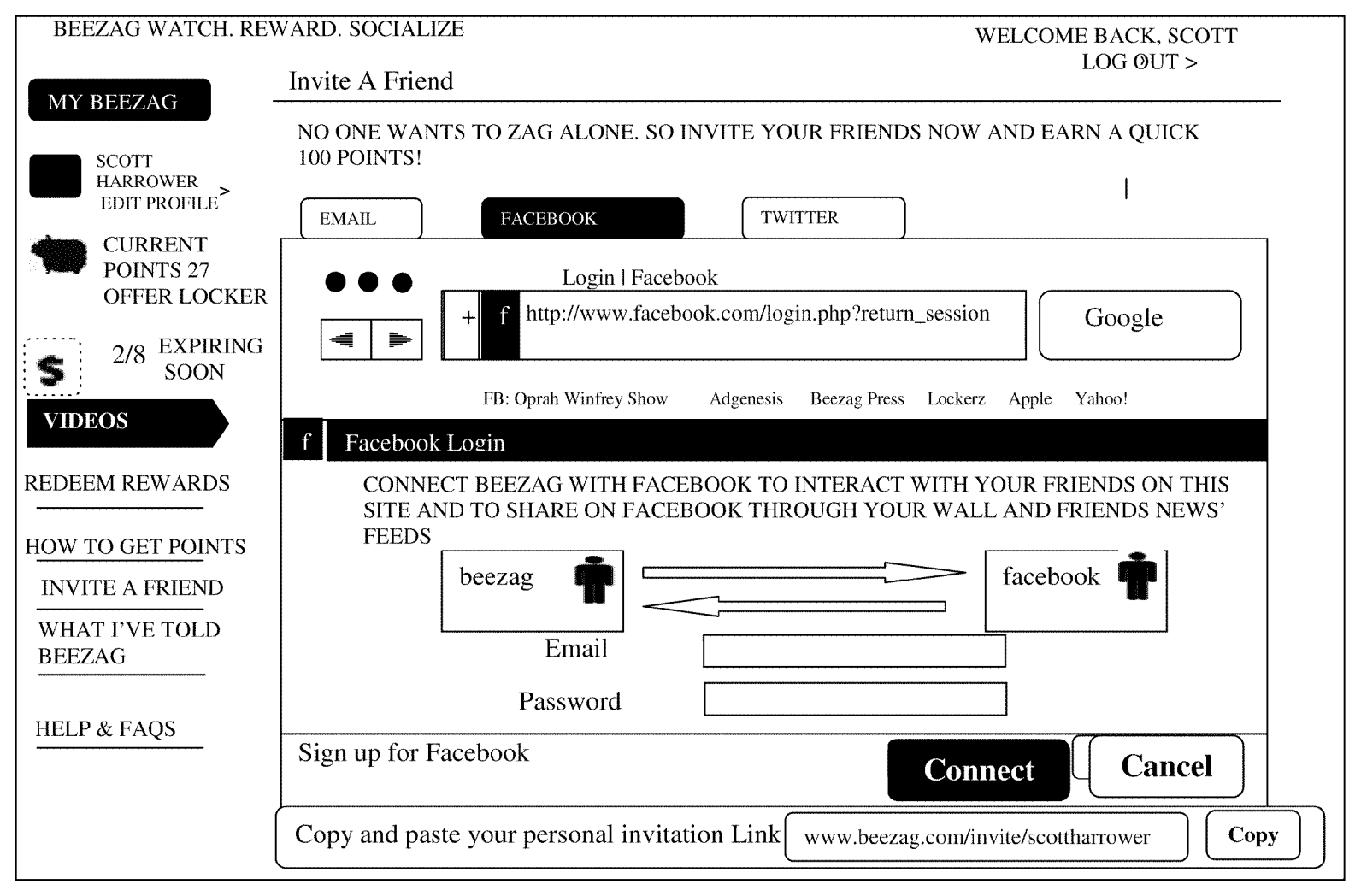
Figure 14S:
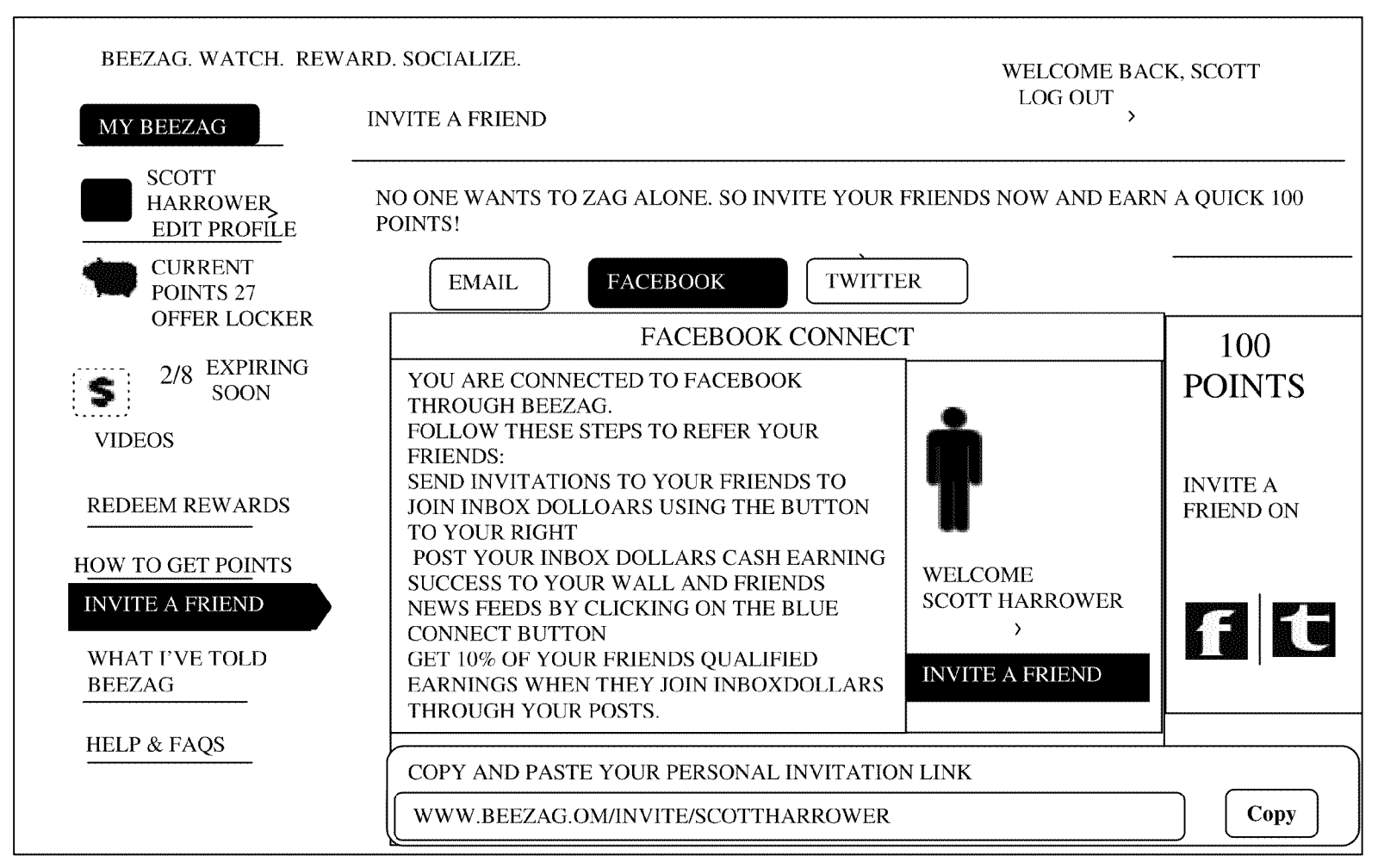
Figure 14T:
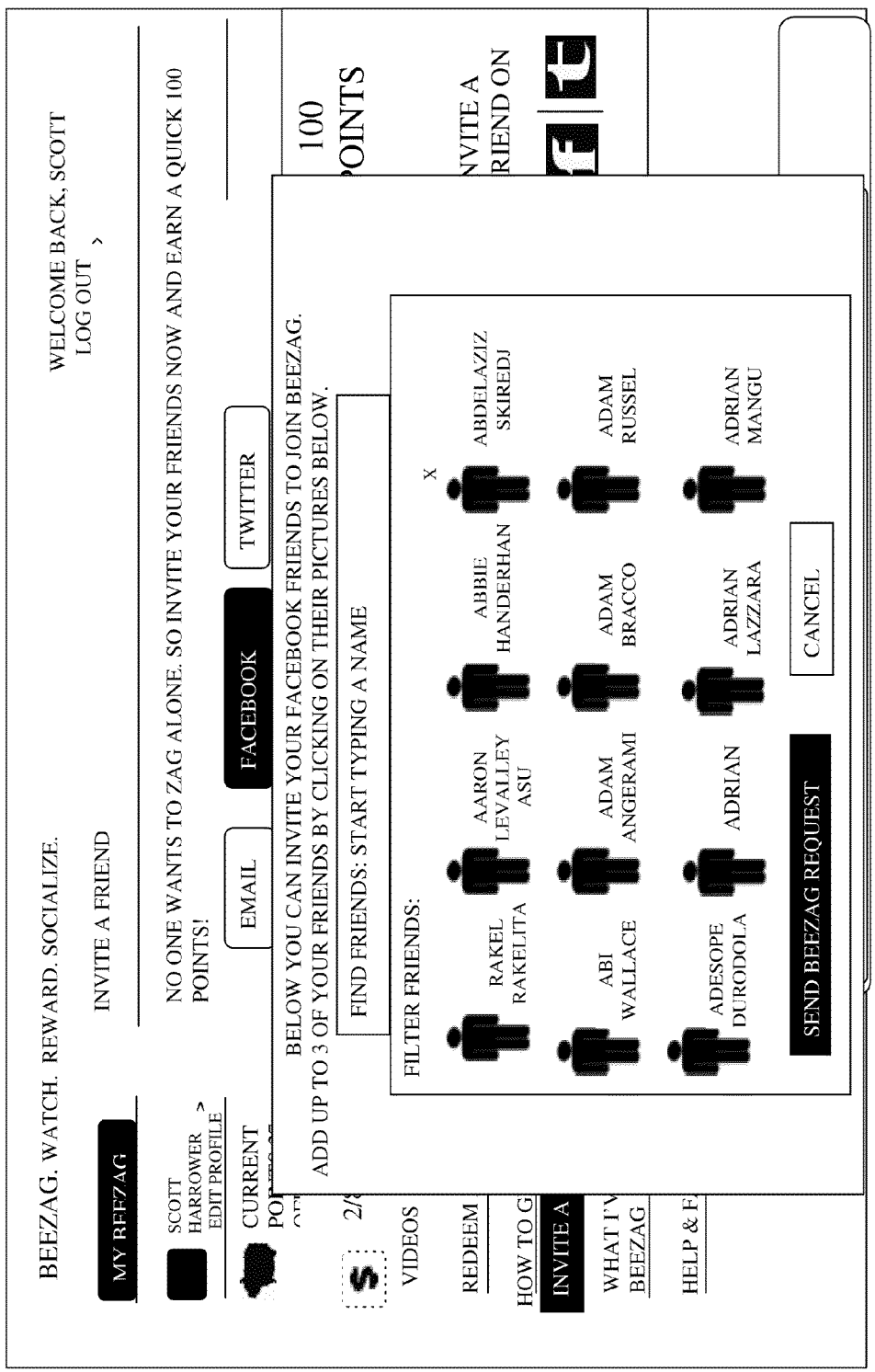
Figure 14U:
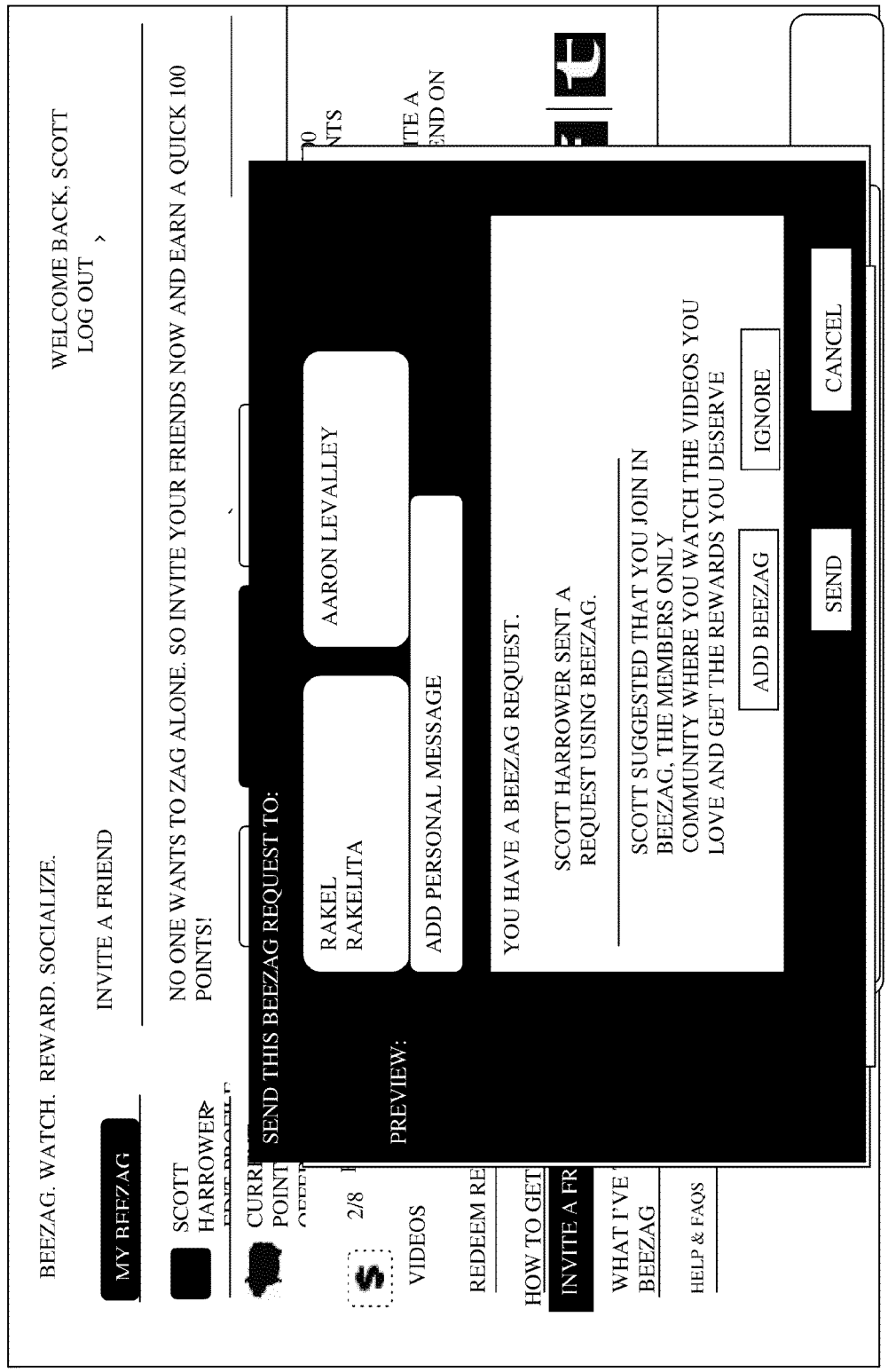
Figure 14V:
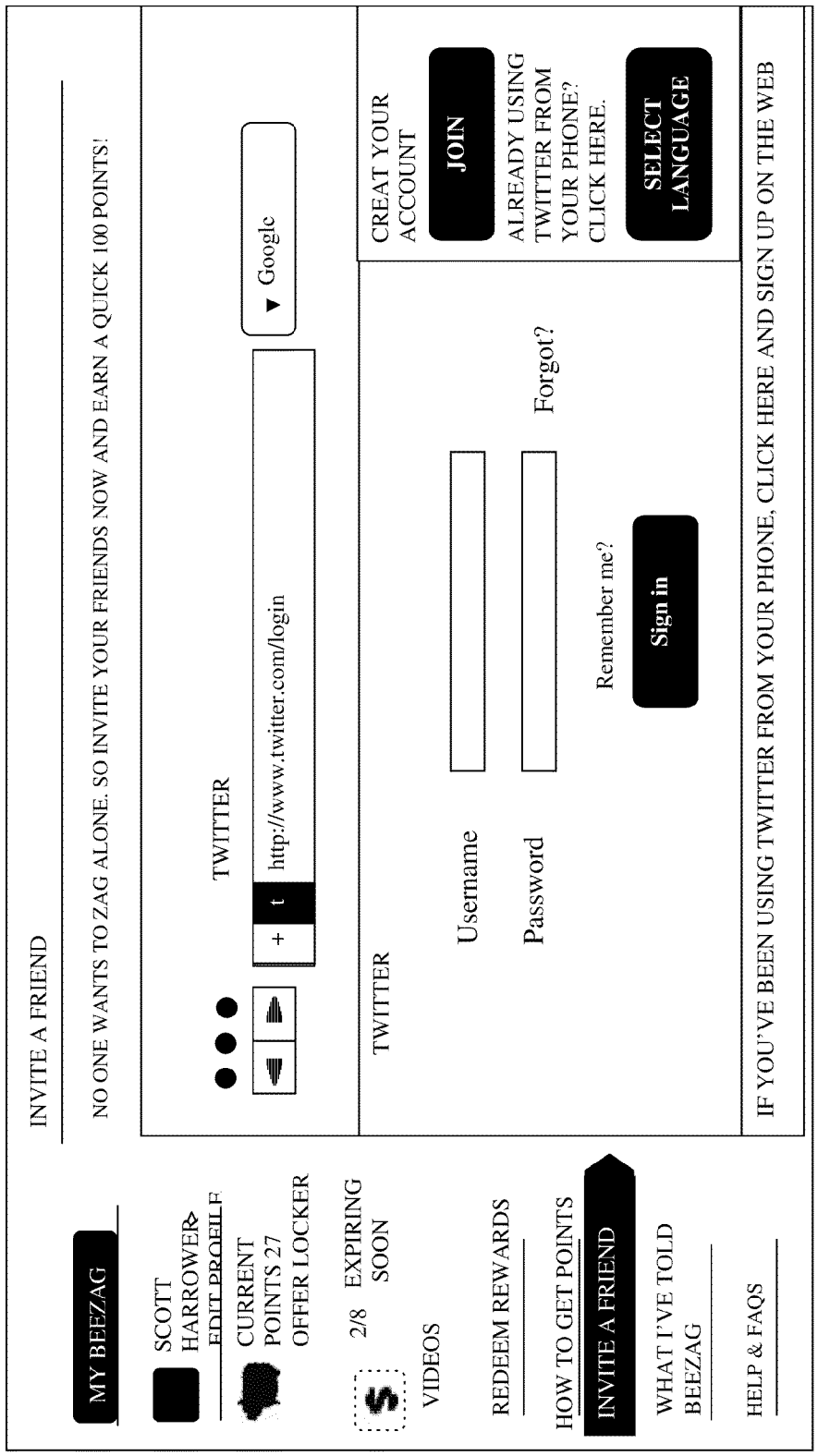
Figure 14W:
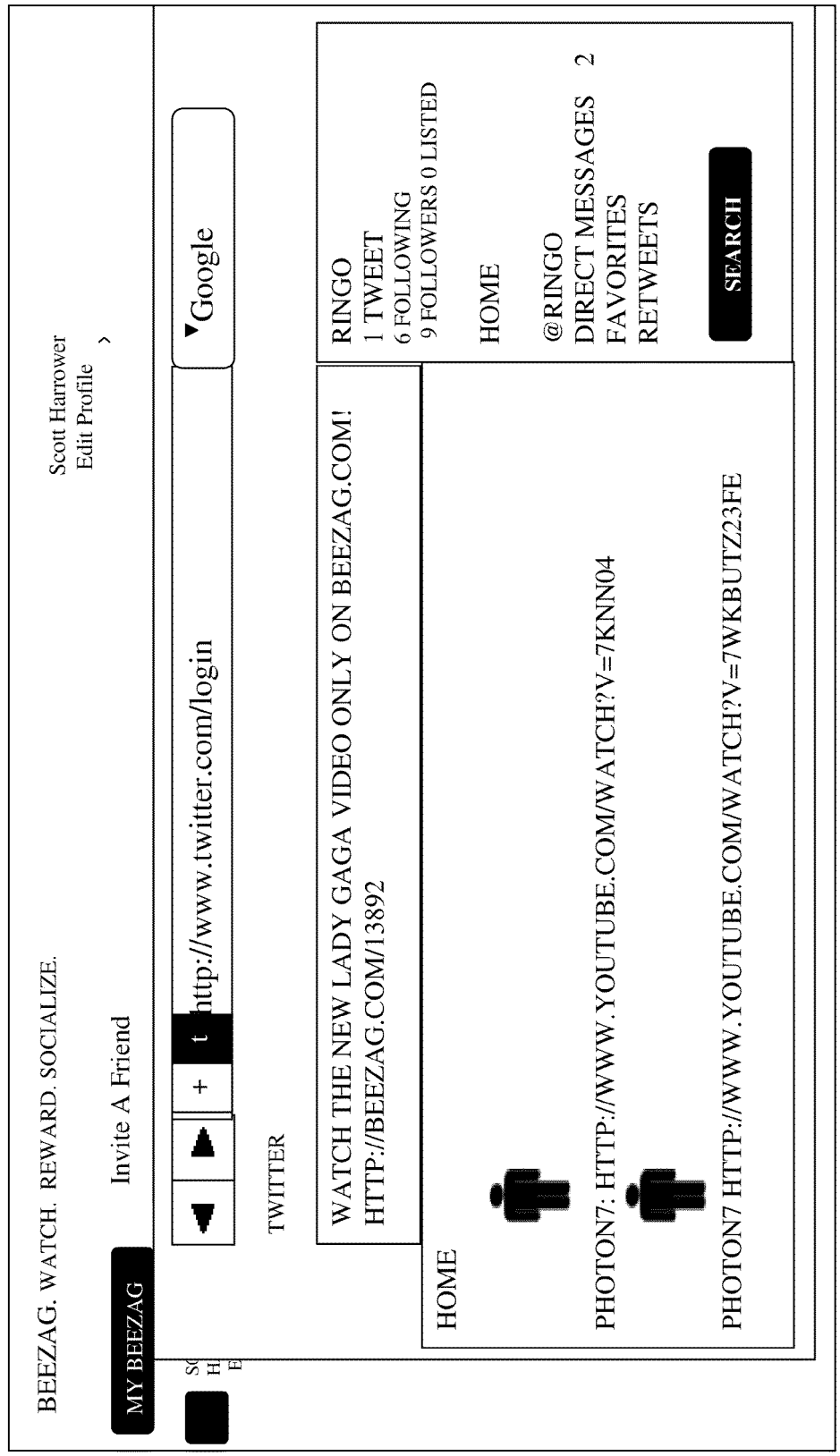

FIGS. 14A-14W exemplarily illustrate screenshots for creating a virtual community network for incentivized viewing of multimedia content. Consider an example where a first viewer logs into the server 602 for viewing the multimedia content. The first viewer may select the multimedia content, for example, a popular music video for viewing. The server 602 or the client device 601 plays the selected music video for viewing by the first viewer as exemplarily illustrated in FIG. 14A. The server 602 or the client device 601 interrupts the play of the selected music video for presenting a random challenge as exemplarily illustrated in FIG. 14B. In an embodiment, the view confirmation module 601b on the client device 601 or the server 602 overlays the random challenge on the selected music video. The server 602 invokes a response from the first viewer for confirming viewing of the selected music video and indicates the correctness of the response as exemplarily illustrated in FIG. 14C. When the first viewer clicks on the electronic mail (email) icon on the interface provided by the server 602 as exemplarily illustrated in FIG. 14C, the server 602 enables the first viewer to refer the music video to one or more second viewers via electronic mail as exemplarily illustrated in FIG. 14D. The server 602 confirms the referring of the music video to one or more second viewers as exemplarily illustrated in FIG. 14E. The second viewers receive a notification of the referred music video as exemplarily illustrated in FIG. 14F. When the first viewer clicks on a social network icon provided on the interface by the server 602 as exemplarily illustrated in FIG. 14C, the server 602 enables the first viewer to refer the music video to one or more second viewers via a social networking platform such as facebook of Facebook Inc. as exemplarily illustrated in FIG. 14G. The first viewer logs onto the social networking platform via the server 602 as exemplarily illustrated in FIG. 14H. After logging in, the first viewer can select second viewers to become members of the virtual community network and can refer the music video to the selected second viewers as exemplarily illustrated in FIGS. 14I-14K. In another example, the server 602 enables the first viewer to refer the music video to one or more second viewers by posting a link to the music video on a social networking platform. For example, the server 602 enables the first viewer to log into a social networking platform such as twitter of Twitter Inc. and post a link for referring the music video as exemplarily illustrated in FIGS. 14L-14M.

The server 602 also enables the first viewer to invite one or more second viewers such as friends of the first viewer to become members of the virtual community network for incentivized viewing of multimedia content. The server 602 enables the first viewer to invite the second viewers by supplying their email addresses on the interface provided by the server 602 as exemplarily illustrated in FIG. 14N. In this example, the server 602 confirms the transmission of the invitation to the second viewers as exemplarily illustrated in FIG. 14O. The second viewers receive a notification of the invitation as exemplarily illustrated in FIG. 14P. The server 602 also enables the members of the virtual community network to refer one or more second viewers that are non-members of the virtual community network to register with the server 602 via a social networking platform as exemplarily illustrated in FIG. 14Q-14U. The first viewer may also post a link for referring the second viewers to register with the server 602 by referring the music video on a social networking platform such as Twitter Inc, after logging into the social networking platform of Twitter Inc. as exemplarily illustrated in FIGS. 14V-14W.

Figure 15:
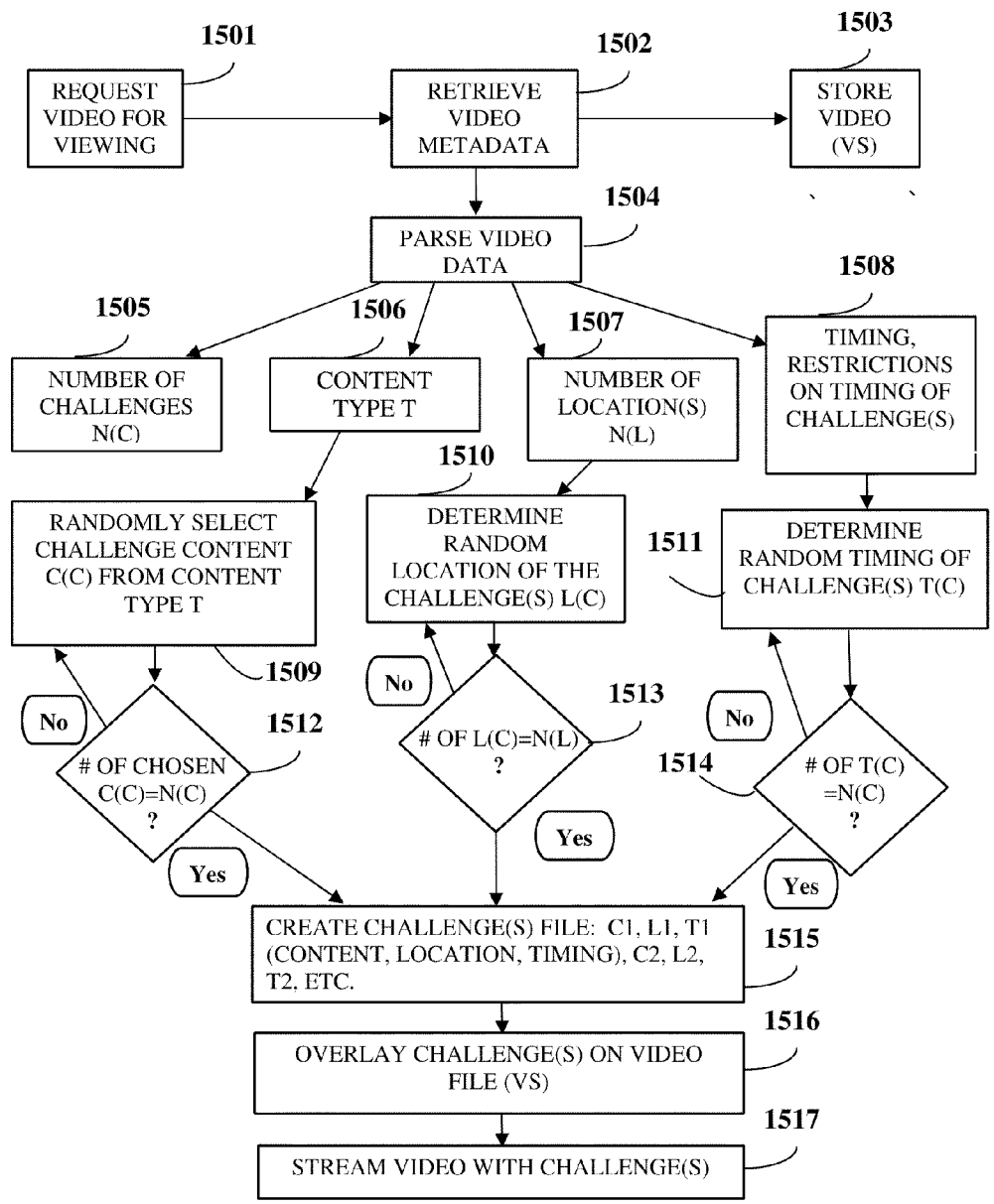
FIG. 15 exemplarily illustrates a flow diagram for generating and presenting random challenges on multimedia content.

FIG. 15 exemplarily illustrates a flow diagram for generating and presenting random challenges on multimedia content. The viewer requests 1501 a video for viewing from the server 602. The client device 601 receives the requested video and also retrieves 1502 the metadata associated with the video. The video is stored 1503 in the client device 601. The metadata of the video is parsed 1504 to determine, for example, the duration of the video. The challenge parameters, for example, the number of challenges 1505, the type of content 1506, the number of locations 1507 within predefined limits, the timing 1508 of the challenges including restrictions on the timing of the challenges are invoked based on the metadata of the video. One or more of the random challenge content is randomly selected 1509 from the available content types. The random locations and timing of the challenges are also determined 1510 and 1511. The selected content is verified to determine whether the challenge content is within the limits of the invoked parameters, such as the number of challenges 1512, number of locations 1513, timing restrictions 1514, etc. The challenge files are created 1515 with the selected challenge content, locations, and timing. The challenge content in the challenge files created are overlaid 1516 on the stored video. The video with the incorporated challenge content is streamed 1517 or played to the viewer.

FIGS. 16A-16G exemplarily illustrate a C++ implementation of the challenge generator 601c using Microsoft® Visual Studio® of Microsoft Inc. In the C++ code listing including the header files of FIGS. 16A-16G, two test cases are established for the challenge generator 601c. The two test cases are defined in the C++ code listing of FIG. 16A. The first test case generates a sequence of challenges for a 30 second video until the end of the video. The second test case generates a challenge within every 10 second segment of a video clip. The implementation exemplarily comprises two classes, namely, "Class bzChallengeGenerator" and "Class bzChallenge". The code for implementing the "Class bzChallengeGenerator" is exemplarily illustrated in FIGS. 16B-16C. The code for implementing the "Class bzChallenge" is exemplarily illustrated in FIG. 16F. FIGS. 16D-16E and FIG. 16G illustrate example header file definitions of "bzChallengeGenerator.h" and "bzChallenge.h". "Class bzChallengeGenerator" is used to specify the necessary parameters and generate a challenge within an optional sub-segment of the video. The static members of "Class bzChallengeGenerator" comprise the following:

"static const char* s_content[ ]" is an array of arrays of character instances comprising numbers, letters, or symbols. This implementation assumes that the challenge content data type is, for example, a single byte character, however the content's data type has alternate definitions in other implementations.

"static const unsigned int s_contentDuration" is the duration of the display of the content. For example, this value is kept constant at 3 seconds in this implementation, but may vary in other implementations.

Class bzChallengeGenerator also defines an enumerated data type as follows:

"enum ContentTypeEnum {NUMBERS=0, LETTERS=1, SYMBOLS=2}" identifies the character set to be used.

Class bzChallengeGenerator also defines the following data members:

"ContentTypeEnum m_contentType" defines the type of characters to be displayed in the video as a challenge.

"unsigned int m_contentDisplaySize" defines the size of the content's display area (square), in pixels, within a video display frame.

"unsigned int m_videoDisplayWidth" is the width of the video display frame, in pixels.

"unsigned int m_videoDisplayHeight" is the height of the video display frame, in pixels.

"unsigned int m_videoDuration" is the total play time of the video.

The following methods are defined in the Class bzChallengeGenerator:

"static int RangedRand(int from, int to)"—this class method returns a random integer in the closed interval [from, to].

"bzChallenge Generate(int begin=-1, int end=-1) const"—this method generates a random challenge with the specified properties. The caller optionally specifies the end points of a segment within the entire video in order to satisfy timing constraints of the application, for example, to ensure that a challenge is displayed in the last 20% or 10 seconds of the video's play time. An object of type bzChallenge is returned with the necessary attributes.

Class bzChallenge represents a result of the challenge generator 601c in the form of a challenge object. Class bzChallenge defines the following data members:

"char m_content"—selection of challenge content to display.

"unsigned int m_contentDisplaySize"—content display area in pixels (square).

"unsigned int m_offset"—offset in seconds from the beginning and the end of the video when the challenge content is displayed.

"unsigned int m_duration"—the duration of the display of challenge content.

"unsigned int m_xPosition"—the pixel position along the width of the display area where the challenge content is displayed.

"unsigned int m_yPosition"—the pixel position along the height of the display area where the challenge content is displayed.

This implementation randomly selects a position for the challenge content's display area within the specified dimensions of the video display frame. Alternatively, the implementation uses an external location map that defines discrete placements of the challenge content on the video display frame. In the alternative case, the challenge generator 601c randomly selects an index into the location map. FIG. 17 exemplarily illustrates sample output after executing the two test cases twice, referred to as "Run #1" and "Run #2". In an example of the first test case, the challenge generator 601c generates "3" as the challenge content that will be presented after 19 seconds from the start of the multimedia content for a duration of 3 seconds. The challenge generator 601c then generates "2" as the challenge content that will be presented after 26 seconds from the start of the multimedia content for a duration of 3 seconds. The challenge generator 601c also generates the coordinates (233, 8) and (29, 134) as the locations for presenting the challenge content "3" and "2" respectively, wherein the coordinates are selected within the video display frame. In an example of the second test case, the challenge generator 601c generates "7" as the challenge content that will be presented within the first 10 second segment, then generates "2" as the challenge content that will be presented within the second 10 second segment, and generates "9" as the challenge content that will be presented within the third 10 second segment. The challenge generator 601c also generates the coordinates (89, 16), (58, 171), and (151, 109) as the locations for presenting the challenge content "7", "2", and "9" respectively, wherein the coordinates are selected within the video display frame. Accordingly, the challenge generator 601c can generate a theoretically infinite number of new challenges, random in content, based on permutation and combination of the input to the challenge generator 601c and the challenge generation algorithm.

For the purposes of illustration, the detailed description refers to a single client device 601; however the scope of the computer implemented method and system 600 disclosed herein is not limited to the client device 601 but may be extended to include multiple client devices and multiple levels of client devices.

The server 602 for confirming viewing of multimedia content by the viewer may also be implemented on operating systems for mobile devices, for example, Windows Mobile®, Symbian, Google™ Android, or IPhone® of Apple Inc. Mobile implementation uses similar algorithms but may involve different hardware interfaces. For example, selection of the list of multimedia content and viewing parameters by the viewer may be performed via a touch screen or voice recognition, and messages may be created using an on-screen keypad or slide-out keyboard, communicating with client software on the mobile device or in a mobile browser. Message transmission then occurs using the mobile device's internet capabilities via a network 603, for example, a WiFi network, a satellite network, a cellular network, etc. The server 602 may also be implemented on two different devices, for example, a desktop and a mobile device, to facilitate communication between them.

It will be readily apparent that the various methods and algorithms described herein may be implemented in a computer readable medium appropriately programmed for general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for example, computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, Perl, Python, or JAVA. The software programs may be stored on or in one or more mediums as an object code. A computer program product comprising computer executable instructions embodied in a computer readable medium comprises computer parsable codes for the implementation of the processes of various embodiments.

Where databases are described such as the database 602g, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, for example, tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for creating a virtual community network for incentivized viewing of multimedia content by cascading referrals for said incentivized viewing of said multimedia content, comprising:

providing a networked environment comprising a server, said server configured to send said multimedia content to a client device of a first viewer through said networked environment for viewing;

said networked environment configured to allow said first viewer to refer said multimedia content to one or more second viewers in said networked environment for viewing and further referrals, wherein said networked environment is further configured to allow said one or more second viewers to perform said further referrals comprising referral of said multimedia content to one or more third viewers, and wherein said networked environment is further configured to allow said one or more third viewers to perform said referral of said multimedia content to one or more nth viewers;

configuring said server in said networked environment to confirm said multimedia content has been viewed on said client devices of one or more of said first viewer, said one or more second viewers, said one or more third viewers, and said one or more nth viewers by presenting a random challenge, wherein said server is configured to generate an infinite number of random challenges, and wherein each of said random challenge is:

random in content, and wherein content of each random challenge is new with respect to the content of any other random challenge generated and presented to said first viewer, said one or more second viewers, said one or more third viewers, and said one or more nth viewers;

unrelated to said multimedia content;

presented at random times during and/or after play of said multimedia content; and presented at random physical locations on said multimedia content;

generating a response report for each of said first viewer, said one or more second viewers, said one or more third viewers, and said one or more nth viewers based on said viewing of said multimedia content by said first viewer, said one or more second viewers, said one or more third viewers, and said one or more nth viewers respectively; and compensating one or more of said first viewer, said one or more second viewers, said one or more third viewers, and said one or more nth viewers by crediting said one or more of said first viewer, said one or more second viewers, said one or more third viewers, and said one or more nth viewers respectively, with one or more items of value, if said response report confirms said viewing of said multimedia content by said first viewer, said one or more second viewers, said one or more third viewers, and said one or more nth viewers;

whereby said referral of said multimedia content for said viewing, and said crediting said first viewer, said one or more second viewers, said one or more third viewers, and said one or more nth viewers, with said one or more items of value creates said virtual community network for said incentivized viewing of said multimedia content.

2. The computer implemented method of claim 1, wherein said crediting said one or more of said first viewer, said one or more second viewers, said one or more third viewers, and said one or more nth viewers comprises depositing said one or more items of value to accounts of said one or more of said first viewer, said one or more second viewers, said one or more third viewers, and said one or more nth viewers respectively, and debiting a fee from one or more multimedia content owners, if said response report confirms said viewing of said multimedia content by said first viewer, said one or more second viewers, said one or more third viewers, and said one or more nth viewers.

3. The computer implemented method of claim 1, wherein said one or more second viewers, said one or more third viewers, and said one or more nth viewers are one of members of said created virtual community network and non-members of said created virtual community network.

4. The computer implemented method of claim 1, wherein said first viewer, said one or more second viewers, said one or more third viewers, and said one or more nth viewers refer said multimedia content to one or more of members and non-members of said created virtual community network.

5. The computer implemented method of claim 1, further comprising posting one or more referrals of said multimedia content on one of said server and one or more social networking platforms by one or more of said first viewer, said one or more second viewers, said one or more third viewers, and said one or more nth viewers for referring said multimedia content to other members of said created virtual community network and non-members of said created virtual community network.

6. The computer implemented method of claim 5, wherein said referrals posted on one of said server and said one or more social networking platforms redirect said one or more second viewers, said one or more third viewers, said one or more nth viewers, and said other members and said non-members to said multimedia content for viewing.

7. The computer implemented method of claim 1, further comprising posting one or more referrals of said multimedia content on one of said server and one or more social networking platforms by one or more of said first viewer, said one or more second viewers, said one or more third viewers, and said one or more nth viewers for registering non-members into said created virtual community network.

8. The computer implemented method of claim 7, wherein said one or more of said first viewer, said one or more second viewers, said one or more third viewers, and said one or more nth viewers are credited with said one or more items of value if said non-members register into said created virtual community network.

9. The computer implemented method of claim 1, wherein said server promotes registration of non-members into said created virtual community network by one or more of allowing access of said multimedia content to only members, offering a predetermined number of free previews of said referred multimedia content, and allowing access of complete multimedia content to only members.

10. The computer implemented method of claim 1, further comprising providing said first viewer, said one or more second viewers, said one or more third viewers, and said one or more nth viewers with an option for triggering playback of premium multimedia content in exchange for said one or more items of value accrued by said first viewer, said one or more second viewers, said one or more third viewers, and said one or more nth viewers respectively, and allowing said premium multimedia content to play.

11. The computer implementer method of claim 1, wherein said referring of said multimedia content comprises forwarding said multimedia content by said first viewer, said one or more second viewers, said one or more third viewers, and said one or more nth viewers, to one or more of members of said created virtual community network and non-members of said created virtual community network via one of said server and one or more social networking platforms.

12. The computer implemented method of claim 1, wherein said confirming said viewing of said multimedia content comprises:

presenting said random challenges to said first viewer, said one or more second viewers, said one or more third viewers, and said one or more nth viewers by one of overlaying said random challenges on said multimedia content and inserting said random challenges on interruption of said play of said multimedia content; and invoking a response from said first viewer, said one or more second viewers, said one or more third viewers, and said one or more nth viewers for said presented random challenges, wherein said response determines whether said first viewer, said one or more second viewers, said one or more third viewers, and said one or more nth viewers viewed said multimedia content respectively.

13. The computer implemented method of claim 1, wherein said server credits said one or more of said first viewer, said one or more second viewers, said one or more third viewers, and said one or more nth viewers with said one or more items of value based on one or more of said referring of said multimedia content, accessing of said referred multimedia content, said confirming of said viewing of said multimedia content, and registration into said created virtual community network.

14. A computer implemented method for creating a virtual community network for incentivized viewing of multimedia content by cascading referrals for said incentivized viewing of said multimedia content, comprising:

providing a client device configured for receiving said multimedia content from a server in a networked environment, wherein said client device is configured to play said received multimedia content to a first viewer;

configuring said client device to allow said first viewer for referring said multimedia content to one or more second viewers in said networked environment for viewing and further referrals, wherein said further referrals comprise referral of said multimedia content by one or more of said second viewers to one or more third viewers, and referral of said multimedia content by one or more of said third viewers to one or more nth viewers;

configuring said client device to confirm viewing of said multimedia content by said first viewer, said one or more second viewers, said one or more third viewers, and said one or more nth viewers, comprising:

generating a plurality of random challenges in a random challenge generator residing in said client device, wherein said random challenge generator is configured to generate an infinite number of random challenges, wherein said random challenges are generated during playing of said selected multimedia content on said client device;

presenting said random challenges, wherein each of said random challenge is:
 random in content, wherein content of each random challenge is new with respect to the content of any other random challenge generated and presented to said first viewer, said one or more second viewers, said one or more third viewers, and said one or more nth viewer; and
 unrelated to said multimedia content;

configuring said client device to allow said first viewer, said one or more second viewers, said one or more third viewers, and said one or more nth viewers to enter a response for said presented challenges;

checking for correctness of said viewer's response by said client device using a challenge-response module in said client device; and compensating one or more of said first viewer, said one or more second viewers, said one or more third viewers, and said one or more nth viewers with one or more items of value, based on one or more of:
 said referring of said multimedia content;
 accessing of said referred multimedia content;
 said confirming of said viewing of said multimedia content; and
 registration of said one or more second viewers, said one or more third viewers, and said one or more nth viewers, and non-members into said virtual community network.

15. A computer implemented method for creating a virtual community network for incentivized viewing of multimedia content by cascading referrals for said incentivized viewing of said multimedia content, comprising:

providing a networked environment comprising a server, said server configured to send said multimedia content to a client device of a first viewer through said networked environment, on registering with said server;

said networked environment configured to allow said first viewer to refer said multimedia content to one or more second viewers in said networked environment for viewing and further referrals, wherein said networked environment further configured to allow said one or more second viewers to perform said further referrals comprising referral of said multimedia content to one or more third viewers, and wherein said networked environment is further configured to allow said one or more third viewers to perform said referral of said multimedia content to one or more nth viewers;

configuring said server to provide controlled access to said referred multimedia content based on registration of said one or more second viewers, said one or more third viewers, and said one or more nth viewers with said server;

configuring said server in said networked environment to confirm said multimedia content has been viewed on said client devices of one or more of said first viewer, said one or more second viewers, said one or more third viewers, and said one or more nth viewers by presenting a plurality of random challenges, wherein said server is configured to present an infinite number of random challenges, wherein each of said random challenge is:
 random in content, wherein content of each random challenge is new with respect to the content of any other random challenge presented to said first viewer, said one or more second viewers, said one or more third viewers, and said one or more nth viewer;
 unrelated to said multimedia content;
 presented at random times during and/or after play of said multimedia content; and
 presented at random physical locations on said multimedia content; and compensating one or more of said first viewer, said one or more second viewers, said one or more third viewers, and said one or more nth viewers, by crediting said one or more of said first viewer, said one or more second viewers, said one or more third viewers, and said one or more nth viewers respectively with one or more items of value, based on one or more of said referring of said multimedia content, said accessing of said referred multimedia content, said confirming of said viewing of said multimedia content, and registration of said one or more second viewers, said one or more third viewers, and said one or more nth viewers with said server.

16. The computer implemented method of claim 15, wherein said control of said access to said referred multimedia content comprises one of:

allowing access of said multimedia content on said registration of said one or more second viewers, said one or more third viewers, and said one or more nth viewers with said server; offering a predetermined number of free previews of said referred multimedia content to said one or more second viewers, said one or more third viewers, and said one or more nth viewers prior to said registration with said server; and allowing access of modified multimedia content to said one or more second viewers, said one or more third viewers, and said one or more nth viewers prior to said registration with said server.

17. A computer implemented system for creating a virtual community network for incentivized viewing of multimedia content by cascading referrals for said incentivized viewing of said multimedia content, comprising:

a server in a networked environment, wherein said server transmits said multimedia content to one or more of a first viewer, one or more second viewers, one or more third viewers, and one or more nth viewers for viewing, wherein said server comprises:

a referral management module that enables said first viewer to refer said multimedia content to said one or more second viewers in said networked environment for viewing and further referrals, wherein said further referrals comprise referral of said multimedia content by one or more of said second viewers to said one or more third viewers, and referral of said multimedia content by one or more of said third viewers to said one or more nth viewers; and a payment module that compensates one or more of said first viewer, said one or more second viewers, said one or more third viewers, and said one or more nth viewers by crediting said one or more of said first viewer, said one or more second viewers, said one or more third viewers, and said one or more nth viewers respectively, with one or more items of value, based on said viewing and said referring of said multimedia content by said first viewer, said one or more second viewers, said one or more third viewers, and said one or more nth viewers;

a client device connected to said server in said networked environment, wherein said client device receives said multimedia content from said server and plays said multimedia content on a display screen of said client device; and a view confirmation module on one or more of said server and said client device, wherein said view confirmation module confirms viewing of said multimedia content by said first viewer, said one or more second viewers, said one or more third viewers, and said one or more nth viewers by presenting a plurality of random challenges on said client device;

said view confirmation module comprising a challenge generator that generates an infinite number of random challenges, wherein each of said random challenge is:
random in content, wherein content of each random challenge is new with respect to the content of any other random challenge generated and presented to said first viewer, said one or more second viewers, said one or more third viewers, and said one or more nth viewer;
unrelated to said multimedia content;
presented at random times during and/or after said play of said selected multimedia content; and
presented at random physical locations on said selected multimedia content;

said view confirmation module generating a response report for each of said first viewer, said one or more second viewers, said one or more third viewers, and said one or more nth viewers, based on said viewing of said multimedia content by said first viewer, said one or more second viewers, said one or more third viewers, and said one or more nth viewers respectively.

18. The computer implemented system of claim 17, wherein said server further comprises a registration module that creates a viewer account for one or more of said first viewer, said one or more second viewers, said one or more third viewers, and said one or more nth viewers, and that registers non-members into said created virtual community network.

19. The computer implemented system of claim 17, wherein said referral management module enables said first viewer, said one or more second viewers, said one or more third viewers, and said one or more nth viewers, to post one or more referrals of said multimedia content on one of said server and one or more social networking platforms for referring said multimedia content to other members of said created virtual community network and non-members of said created virtual community network.

20. The computer implemented system of claim 17, wherein said server further comprises a tracking module that tracks viewing activities of said first viewer, said one or more second viewers, said one or more third viewers, and said one or more nth viewers by said server for determining compensation and for controlling levels of said referring of said multimedia content.

21. The computer implemented system of claim 17, wherein said payment module credits said one or more of said first viewer, said one or more second viewers, said one or more third viewers, and said one or more nth viewers with said one or more items of value, based on one or more of said referring of said multimedia content, accessing of said referred multimedia content, said confirming of said viewing of said multimedia content, and registration into said created virtual community network.

22. The computer implemented system of claim 17, wherein said server further comprises a content management module that controls access to said referred multimedia content by said server based on registration of said one or more second viewers, said one or more third viewers, and said one or more nth viewers with said server.

23. The computer implemented system of claim 17, wherein said server further comprises a database that stores information on said first viewer, said one or more second viewers, said one or more third viewers, and said one or more nth viewers, response reports, referral reports comprising information on referrals of said multimedia content, and said multimedia content, wherein said database stores said multimedia content in a plurality of formats.

24. The computer implemented system of claim 17, wherein said view confirmation module comprises:
a challenge-response module that presents said generated random challenges to said first viewer, said one or more second viewers, said one or more third viewers, and said one or more nth viewers, on said display screen of said client device by one of overlaying said generated random challenges on said multimedia content and inserting said generated random challenges on interruption of said play of said multimedia content, wherein said challenge-response module invokes a response from said first viewer, said one or more second viewers, said one or more third viewers, and said one or more nth viewers for said presented random challenges;
said challenge-response module that determines whether said first viewer, said one or more second viewers, said one or more third viewers, and said one or more nth viewers have entered said response for said presented random challenges to confirm said multimedia content has been viewed by said first viewer, said one or more second viewers, said one or more third viewers, and said one or more nth viewers respectively; and
a report generation module that generates a response report for each of said first viewer, said one or more second viewers, said one or more third viewers, and said one or more nth viewers by said server based on said response from said first viewer, said one or more second viewers, said one or more third viewers, and said one or more nth viewers respectively.

25. A computer program product comprising computer executable instructions embodied in a non-transitory computer readable storage medium, wherein said computer program product comprises:
a first computer parsable program code for enabling a first viewer to refer multimedia content to one or more second viewers in a networked environment for viewing and further referrals, wherein said further referrals comprise referral of said multimedia content by one or more of said second viewers to one or more third viewers, and referral of said multimedia content by one or more of said third viewers to one or more nth viewers, and wherein said first viewer, said one or more second viewers, said one or more third viewers, and said one or more nth viewers receive said multimedia content on a client device from a server in said networked environment;
a second computer parsable program code for controlling access to said referred multimedia content by said server based on registration of said one or more second viewers, said one or more third viewers, and said one or more nth viewers with said server;
a third computer parsable program code for confirming viewing of said multimedia content by said first viewer, said one or more second viewers, said one or more third viewers, and said one or more nth viewers by presenting a plurality of random challenges from a random challenge generator, said random challenge generator configured to generate an infinite number of random challenges on said client device, wherein each of said random challenge is:
- new with respect to the content of any other random challenge generated and presented to said first viewer, said one or more second viewers, said one or more third viewers, and said one or more nth viewer;
- random in content;
- unrelated to said multimedia content;
- presented at random times during and/or after play of said multimedia content; and
- presented at random physical locations on said multimedia content; and a fourth computer parsable program code for compensating one or more of said first viewer, said one or more second viewers, said one or more third viewers, and said one or more nth viewers, by crediting said one or more of said first viewer, said one or more second viewers, said one or more third viewers, and said one or more nth viewers respectively with one or more items of value, based on one or more of said referring of said multimedia content, said accessing of said referred multimedia content, said confirming of said viewing of said multimedia content, and registration of said one or more second viewers, said one or more third viewers, and said one or more nth viewers with said server.

26. A computer implemented method for creating a virtual community network for incentivized viewing of multimedia content by cascading referrals for said incentivized viewing of said multimedia content, comprising:
- receiving, by said viewer, said multimedia content on a client device from a server in a networked environment;
- viewing, by said viewer, said multimedia content played on said client device;
- referring said multimedia content by said viewer to one or more second viewers in for viewing and further referrals, wherein said further referrals comprise referral of said multimedia content by one or more of said second viewers to one or more third viewers, and referral of said multimedia content by one or more of said third viewers to one or more nth viewers;
- confirming viewing said multimedia content by said first viewer, said one or more second viewers, said one or more third viewers, and said one or more nth viewers, comprising:
  - receiving by said first viewer, said one or more second viewers, said one or more third viewers, and said one or more nth viewers, a plurality of random challenges generated in a random challenge generator residing in said client device, wherein said random challenge generator is configured to generate an infinite number of random challenges, wherein said random challenges are generated during playing of said selected multimedia content on said client device, wherein each of said random challenge is:
    - random in content, wherein content of each random challenge is new with respect to the content of any other random challenge generated and presented to said first viewer, said one or more second viewers, said one or more third viewers, and said one or more nth viewer;
    - unrelated to said multimedia content;
    - presented at random times during and/or after play of said multimedia content; and
    - presented at random physical locations on said multimedia content; and
  - entering a response for said presented random challenges into said client device by said first viewer, said one or more second viewers, said one or more third viewers, and said one or more nth viewers;
- receiving a compensation by one or more of said first viewer, said one or more second viewers, said one or more third viewers, and said one or more nth viewers with one or more items of value, based on one or more of:
  - said referring of said multimedia content;
  - accessing of said referred multimedia content;
  - said confirming of said viewing of said multimedia content; and
  - registration of said one or more second viewers, said one or more third viewers, and said one or more nth viewers, and non-members into said virtual community network.

* * * * *